US012639799B2

(12) United States Patent
Jung

(10) Patent No.: US 12,639,799 B2
(45) Date of Patent: May 26, 2026

(54) FLIPPER APPARATUS AND OBJECT INSPECTION METHOD USING SAME

(71) Applicant: KOH YOUNG TECHNOLOGY INC., Seoul (KR)

(72) Inventor: Choung Min Jung, Siheung-si (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 722 days.

(21) Appl. No.: 17/256,490

(22) PCT Filed: Apr. 16, 2019

(86) PCT No.: PCT/KR2019/004554
§ 371 (c)(1),
(2) Date: Dec. 28, 2020

(87) PCT Pub. No.: WO2020/004791
PCT Pub. Date: Jan. 2, 2020

(65) Prior Publication Data
US 2021/0278338 A1 Sep. 9, 2021

Related U.S. Application Data

(60) Provisional application No. 62/692,079, filed on Jun. 29, 2018.

(51) Int. Cl.
*G06T 7/00* (2017.01)
*G01N 21/01* (2006.01)
(Continued)

(52) U.S. Cl.
CPC ........... *G06T 7/0004* (2013.01); *G01N 21/01* (2013.01); *G01N 21/88* (2013.01); *G06T 7/40* (2013.01);
(Continued)

(58) Field of Classification Search
CPC ..................... G06T 7/0004; G06T 7/40; G06T 2207/30108; H04N 23/695; G01N 21/01;
(Continued)

(56) References Cited

U.S. PATENT DOCUMENTS

| | | | |
|---|---|---|---|
| 4,679,075 A | 7/1987 | Williams et al. | |
| 5,249,912 A | 10/1993 | Warga, III | |

(Continued)

FOREIGN PATENT DOCUMENTS

| | | |
|---|---|---|
| CN | 102333617 | 1/2012 |
| CN | 103100793 | 5/2013 |

(Continued)

OTHER PUBLICATIONS

Office Action for U.S. Appl. No. 17/256,497, dated Apr. 28, 2023.
(Continued)

*Primary Examiner* — Joseph L Greene
(74) *Attorney, Agent, or Firm* — KILE PARK REED & HOUTTEMAN PLLC

(57) ABSTRACT

A flipper apparatus according to an embodiment disclosed herein includes: a Y-axis flipper unit configured to hold an object in a Y-axis direction and rotate the object about a Y-axis; an X-axis flipper unit configured to hold the object in an X-axis direction and rotate the object about an X-axis; and a Z-axis elevation unit supporting the Y-axis flipper unit and the X-axis flipper unit and configured to move the Y-axis flipper unit and the X-axis flipper unit up and down in a Z-axis direction.

12 Claims, 38 Drawing Sheets

(51) Int. Cl.
| | |
|---|---|
| *G01N 21/88* | (2006.01) |
| *G06T 7/40* | (2017.01) |
| *H04N 23/695* | (2023.01) |

(52) U.S. Cl.
CPC ... *H04N 23/695* (2023.01); *G01N 2021/0106* (2013.01); *G01N 2021/0187* (2013.01); *G06T 2207/30108* (2013.01)

(58) Field of Classification Search
CPC .......... G01N 21/88; G01N 2021/0106; G01N 2021/0187
See application file for complete search history.

(56) References Cited

U.S. PATENT DOCUMENTS

| | | | |
|---|---|---|---|
| 5,828,500 A | 10/1998 | Kida et al. | |
| 6,199,679 B1 | 3/2001 | Heuft | |
| 10,121,238 B2 | 11/2018 | Krolczyk et al. | |
| 11,499,922 B2 | 11/2022 | Pearson et al. | |
| 11,533,441 B2 | 12/2022 | Edwards et al. | |
| 2002/0131166 A1* | 9/2002 | Woo | G02B 21/0016 |
| | | | 359/368 |
| 2002/0173229 A1 | 11/2002 | Kobayashi | |
| 2003/0052968 A1 | 3/2003 | Murakami | |
| 2003/0159528 A1 | 8/2003 | Kim et al. | |
| 2003/0206794 A1* | 11/2003 | Konig | H01L 21/68 |
| | | | 414/757 |
| 2007/0222976 A1 | 9/2007 | Hashimoto | |
| 2011/0081223 A1 | 4/2011 | Medel et al. | |
| 2011/0311344 A1 | 12/2011 | Yamane | |
| 2012/0033209 A1* | 2/2012 | Osterkamp | G01N 29/075 |
| | | | 356/244 |
| 2012/0210554 A1 | 8/2012 | Han | |
| 2013/0279655 A1 | 10/2013 | Ookawa | |
| 2014/0010604 A1* | 1/2014 | Cohen | B65G 47/46 |
| | | | 406/108 |
| 2014/0268541 A1* | 9/2014 | Coombs | A61B 1/00066 |
| | | | 361/679.41 |
| 2014/0334605 A1 | 11/2014 | Ookawa | |
| 2015/0204801 A1 | 7/2015 | Itou | |
| 2015/0362310 A1* | 12/2015 | Taniguchi | G01B 11/24 |
| | | | 356/4.01 |
| 2016/0011123 A1* | 1/2016 | Shibata | G06T 7/32 |
| | | | 356/237.5 |
| 2016/0238373 A1 | 8/2016 | Featherstone | |
| 2017/0255037 A1 | 9/2017 | Ma et al. | |
| 2018/0297784 A1 | 10/2018 | Park et al. | |
| 2019/0073760 A1 | 3/2019 | Wang et al. | |
| 2019/0272628 A1* | 9/2019 | Tsou | G06T 7/0004 |
| 2020/0057428 A1* | 2/2020 | Gridish | G01N 23/223 |

FOREIGN PATENT DOCUMENTS

| | | |
|---|---|---|
| CN | 204301711 | 4/2015 |
| CN | 204731344 | 10/2015 |
| CN | 105910566 | 8/2016 |
| CN | 106044135 | 10/2016 |
| CN | 206235296 | 6/2017 |
| EP | 3 369 683 | 9/2018 |
| JP | 11-108650 | 4/1999 |
| JP | 2002-267620 | 9/2002 |
| JP | 2004-149320 | 5/2004 |
| JP | 2006-220495 | 8/2006 |
| JP | 2013-51333 | 3/2013 |
| JP | 2013-142677 | 7/2013 |
| JP | 2013-142678 | 7/2013 |
| JP | 2013-224857 | 10/2013 |
| JP | 2015-55631 | 3/2015 |
| KR | 20-0394150 | 8/2005 |
| KR | 10-2006-0066248 | 6/2006 |
| KR | 10-0783618 | 12/2007 |
| KR | 10-2012-0026745 | 3/2012 |
| KR | 10-2012-0096727 | 8/2012 |
| KR | 10-2013-0034920 | 4/2013 |
| KR | 10-2014-0007509 | 1/2014 |
| KR | 10-2017-0050580 | 5/2017 |
| KR | 10-2017-0051375 | 5/2017 |
| KR | 10-1736269 | 5/2017 |
| WO | 2008/136778 | 11/2008 |
| WO | 2017074075 | 5/2017 |

OTHER PUBLICATIONS

Korean Office Action with English translation for Korean Patent Application No. 10-2020-7037616, dated Sep. 6, 2022.
Korean Office Action with English translation for Korean Patent Application No. 10-2020-7037620, dated Sep. 13, 2022.
Korean Office Action with English translation for Korean Patent Application No. 10-2020-7037623, dated Sep. 13, 2022.
International Search Report, with English translation, for International Application No. PCT/KR2019/004554, dated Jul. 19, 2019.
Written Opinion, with English translation, for International Application No. PCT/KR2019/004554, dated Jul. 19, 2019.
International Search Report, with English translation, corresponding to International Application No. PCT/KR2019/004555, dated Jul. 19, 2019.
Written Opinion, with English translation, corresponding to International Application No. PCT/KR2019/004555, dated Jul. 19, 2019.
International Search Report, with English translation, corresponding to International Application No. PCT/KR2019/004557, dated Jul. 16, 2019.
Written Opinion, with English translation, corresponding to International Application No. PCT/KR2019/004557, dated Jul. 16, 2019.
Korean Office Action with English translation for Korean Patent Application No. 10-2020-7037616, dated Dec. 28. 2020.
Korean Office Action with English translation for Korean Patent Application No. 10-2020-7037620, dated Dec. 18. 2020.
Korean Office Action with English translation for Korean Patent Application No. 10-2020-7037623, dated Dec. 28. 2020.
European Office Action for European Application No./Patent No. 19826924.3; dated Aug. 16, 2021.
European Office Action for European Application No./Patent No. 19825087.0; dated Jul. 21, 2021.
Chinese Office Action, with English Translation, for Chinese Application No. 201980044162.6, dated Dec. 21, 2023.
Chinese Office Action, with English Translation, for Chinese Application No. 201980044259.7, dated Dec. 28, 2023.
Chinese Office Action with English translation for Chinese Patent Application No. 201980044259.7, dated Jul. 26, 2024.
European Office Action for European Patent Application No. 19 826 924.3, dated Jul. 10, 2024.
Chinese Office Action with English translation for Chinese Patent Application No. 201980044259.7, dated Feb. 17, 2025.
Chinese Office Action with English translation for Chinese Patent Application or Patent No. 201980044259.7, dated Nov. 6, 2024.
Japanese Office Action, with English translation, for Japanese Patent Application No. 2020-573205, dated Feb. 22, 2022.
Japanese Office Action, with English translation, for Japanese Patent Application No. 2020-573209, dated Jan. 18, 2022.

* cited by examiner

FLIPPER APPARATUS AND OBJECT INSPECTION METHOD USING SAME

TECHNICAL FIELD

The present disclosure relates to a flipper apparatus for holding and rotating an object and a method for inspecting an object using the flipper apparatus.

BACKGROUND

In the case of manufacturing and distributing various articles as they are or assembling the articles with other articles, performing an inspection of the manufactured state or assembled state of the articles (objects) is an essential process to increase the reliability of products. Conventionally, articles have been visually inspected, but a technique for improving precision and increasing working speed has been developed using inspection equipment.

With the introduction of process automation, such inspection process has adopted a method of automatically transferring the inspection objects. The most common method is to use a conveyor belt to transfer the articles. In the case of inspecting an article that has been automatically transferred with inspection equipment, in order to inspect the bottom surface of the article after inspecting the top surface of the article, it is necessary to turn the article upside down. The work of turning the article upside down is usually done by hand or by providing a separate turn-over apparatus (a flipper apparatus).

SUMMARY

Conventionally, in order to inspect the top and side surfaces of an object while transferring the object using a transfer rail, a camera device is required for each of the top and side surfaces of the object, and there is a problem in that the cost of the inspection apparatus is substantial because camera devices are very expensive. In addition, conventionally, there is a problem in that it is inconvenient to inspect not only the top and side surfaces of an object, but also the front and rear surfaces parallel to the transfer direction. Embodiments of the present disclosure solve the problems of the prior art described above.

Conventionally, in the case of using an apparatus that turns over an object moving along a transfer rail, there is a problem in that space efficiency decreases and a time required to inspect the object becomes longer. Embodiments of the present disclosure solve the problem of the prior art described above.

An aspect of the present disclosure provides embodiments of a flipper apparatus. A flipper apparatus according to a representative embodiment includes: a Y-axis flipper unit configured to hold an object in a Y-axis direction and rotate the object about a Y-axis; an X-axis flipper unit configured to hold the object in an X-axis direction and rotate the object about an X-axis; and a Z-axis elevation unit supporting the Y-axis flipper unit and the X-axis flipper unit and configured to move the Y-axis flipper unit and the X-axis flipper unit up and down in a Z-axis direction.

Another aspect of the present disclosure provides embodiments of an object inspection method. An object inspection method according to a representative embodiment uses a flipper apparatus configured to hold and rotate an object and a camera device configured to inspect an object surface, which faces a +Z-axis direction, of the object. The inspection method includes: an initial inspection step in which a Y-axis holder of the flipper apparatus holds the object in a Y-axis direction and the camera device inspects an object surface A of the object; a first middle inspection step in which the Y-axis holder rotates the object about a Y-axis and the camera device inspects an object surface B1, which is perpendicular to the object surface A, and an object surface B2, which is opposite to the object surface B1; a second middle inspection step in which an X-axis holder holds the object in an X-axis direction and rotates the object about an X-axis and the camera device inspects an object surface B3, which is perpendicular to the object surface A, and an object surface B4, which is opposite to the object surface B3; and a last inspection step in which the Y-axis holder holds the object in the Y-axis direction and the camera device inspects an object surface C, which is opposite to the object surface A of the object.

According to embodiments of the present disclosure, it is possible to inspect surfaces of multiple angles of an object using a single camera device.

According to embodiments of the present disclosure, it is possible to efficiently utilize a space and to shorten the inspection time of an object while rotating an object at various angles.

According to embodiments of the present disclosure, it is possible to accurately set an inspection position of an object.

According to embodiments of the present disclosure, it is easy to attach/detach and maintain each component of the flipper apparatus.

BRIEF DESCRIPTION OF DRAWINGS

FIG. 14A is a partial cross-sectional view of the flipper apparatus 10 taken along line S1-S1' in FIG. 8.

FIGS. 26 to 29 are perspective views sequentially illustrating a process of operating the flipper apparatus 10 according to an embodiment after the state of FIG. 24.

DETAILED DESCRIPTION

Figure 1:
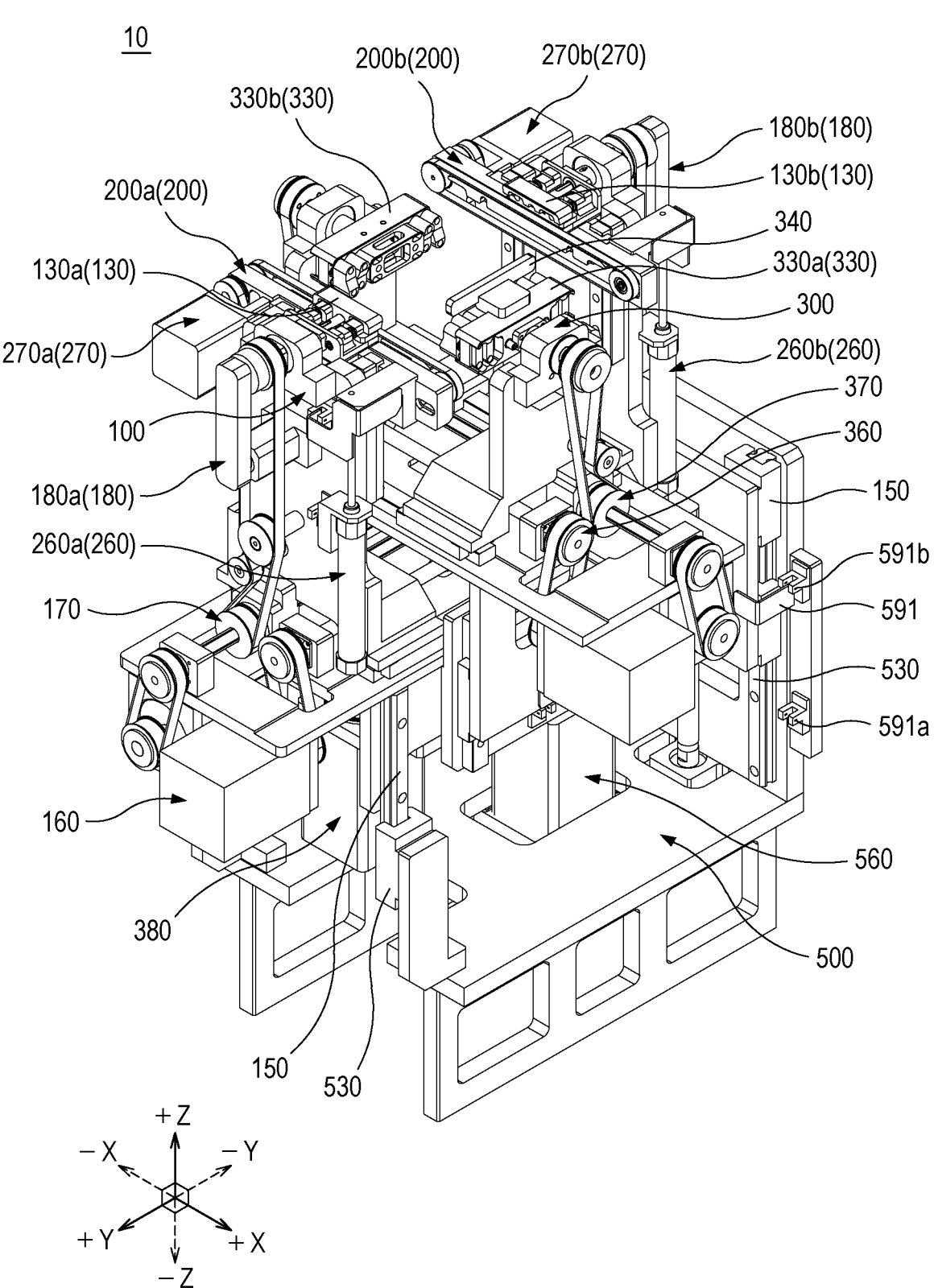
FIG. 1 is a perspective view illustrating a flipper apparatus 10 according to an embodiment of the present disclosure.

Embodiments of the present disclosure are illustrated for describing the technical concept of the present disclosure. The scope of the claims according to the present disclosure is not limited to the embodiments described below or to the detailed descriptions of these embodiments.

All technical or scientific terms used herein have meanings that are generally understood by a person having ordinary knowledge in the art to which the present disclosure pertains, unless otherwise specified. The terms used herein are selected only for more clear illustration of the present disclosure, and are not intended to limit the scope of the claims in accordance with the present disclosure.

The expressions "include," "provided with," "have" and the like used herein should be understood as open-ended terms connoting the possibility of inclusion of other embodiments, unless otherwise mentioned in a phrase or sentence including the expressions.

A singular expression can include meanings of plurality, unless otherwise mentioned, and the same is applicable for a singular expression stated in the claims.

The terms "first," "second," etc. used herein are used to distinguish a plurality of components from one another, and are not intended to limit the order or importance of the relevant components.

When a certain component is described as "coupled to" or "connected to" another component, this should be understood as meaning that the certain component may be coupled or connected directly to the other component or that the certain component may be coupled or connected to the other component via a new intervening component.

In order to describe the present disclosure with reference to the drawings, the description will be made on the basis of a space orthogonal coordinate system based on the X-axis, the Y-axis, and the Z-axis orthogonal to one another. That is, each configuration of the embodiments may be described on the XYZ orthogonal coordinates. Each axis direction (the X-axis direction, Y-axis direction, or Z-axis direction) refers to both directions in which each axis extends. The plus (+) sign in front of each axis (+X-axis direction, +Y-axis direction, or +Z-axis direction) refers to the positive direction, which is one of two directions in which each axis extends. The minus (−) sign in front of each axis (−X-axis direction, −Y-axis direction, or −Z-axis direction) refers to the negative direction, which is the remaining one of the two directions in which each axis extends. This is merely a reference set for describing the present disclosure so that the present disclosure can be clearly understood, and it is needless to say that the directions may be defined differently depending on where the reference is placed.

Directional designators such as "upward" and "up" used in this disclosure refer to the +Z-axis direction, and directional designators such as "downward" and "down" refer to the −Z-axis direction. A flipper apparatus 10 illustrated in the accompanying drawings may be differently oriented, and the directional designators may be interpreted accordingly.

The term "object" used in the present disclosure means a thing to be inspected, and in the present disclosure, a mobile phone case is shown as an example of the object, but is not limited thereto. In the object, a surface facing one direction among outer surfaces to be inspected may be referred to as an "object surface." In the drawings of the present disclosure, an object M and object surfaces A, B1, B1*a*, B1*b*, B2, B3, B3*a*, B3*b*, B4, and C are shown.

Hereinafter, embodiments of the present disclosure will be described with reference to the accompanying drawings. In the accompanying drawings, like or corresponding components are indicated by like reference numerals. In the following description of embodiments, repeated descriptions of the identical or corresponding components will be omitted. However, even if a description of a component is omitted, such a component is not intended to be excluded in an embodiment.

FIG. 1 is a perspective view illustrating a flipper apparatus 10 according to an embodiment of the present disclosure. Referring to FIG. 1, the flipper apparatus 10 includes a Y-axis flipper unit 100 configured to hold an object (see M in FIG. 7) in the Y-axis direction and to rotate the object about the Y-axis. The flipper apparatus 10 includes a Z-axis elevation unit 500 supporting the Y-axis flipper unit 100 to move the Y-axis flipper unit 100 up and down in the Z-axis direction. The flipper apparatus 10 may include an X-axis flipper unit 300 configured to hold the object in the X-axis direction and to rotate the object about the X-axis. The flipper apparatus 10 may include a transfer unit 200 configured to transfer the object in the X-axis direction.

The Z-axis elevation unit 500 may support the X-axis flipper unit 300. The Z-axis elevation unit 500 may be configured to move the X-axis flipper unit 300 up and down in the Z-axis direction. When a first component "supports" a second component, this covers not only the case where the second component is in direct contact with the first component and is supported on the first component, but also the case where the first component supports the second component via a third component interposed between the first component and the second component.

In the present embodiment, the Z-axis elevation unit 500 supports the Y-axis flipper unit 100 and the X-axis flipper unit 300, and is configured to move the Y-axis flipper unit 100 and the X-axis flipper unit 300 up and down in the Z-axis direction. In the present embodiment, the flipper apparatus 10 includes the Y-axis flipper unit 100 and the X-axis flipper unit 300. However, in another embodiment (not illustrated), the flipper apparatus 10 includes the Y-axis flipper unit 100, but may not include the X-axis flipper unit 300.

A camera device (not illustrated) for inspecting an object surface of the object facing the +Z-axis direction may be provided above the flipper apparatus 10. The camera device may inspect the object surface while facing the −Z-axis direction. The camera device may be provided to be movable in the X-axis direction and/or the Y-axis direction.

A conveyor belt device (not illustrated) configured to move the object to the flipper apparatus 10 may be provided. The conveyor belt device may be provided so that the object can be moved from one of the conveyor belt device and the transfer unit 200 to the other.

Figure 2:
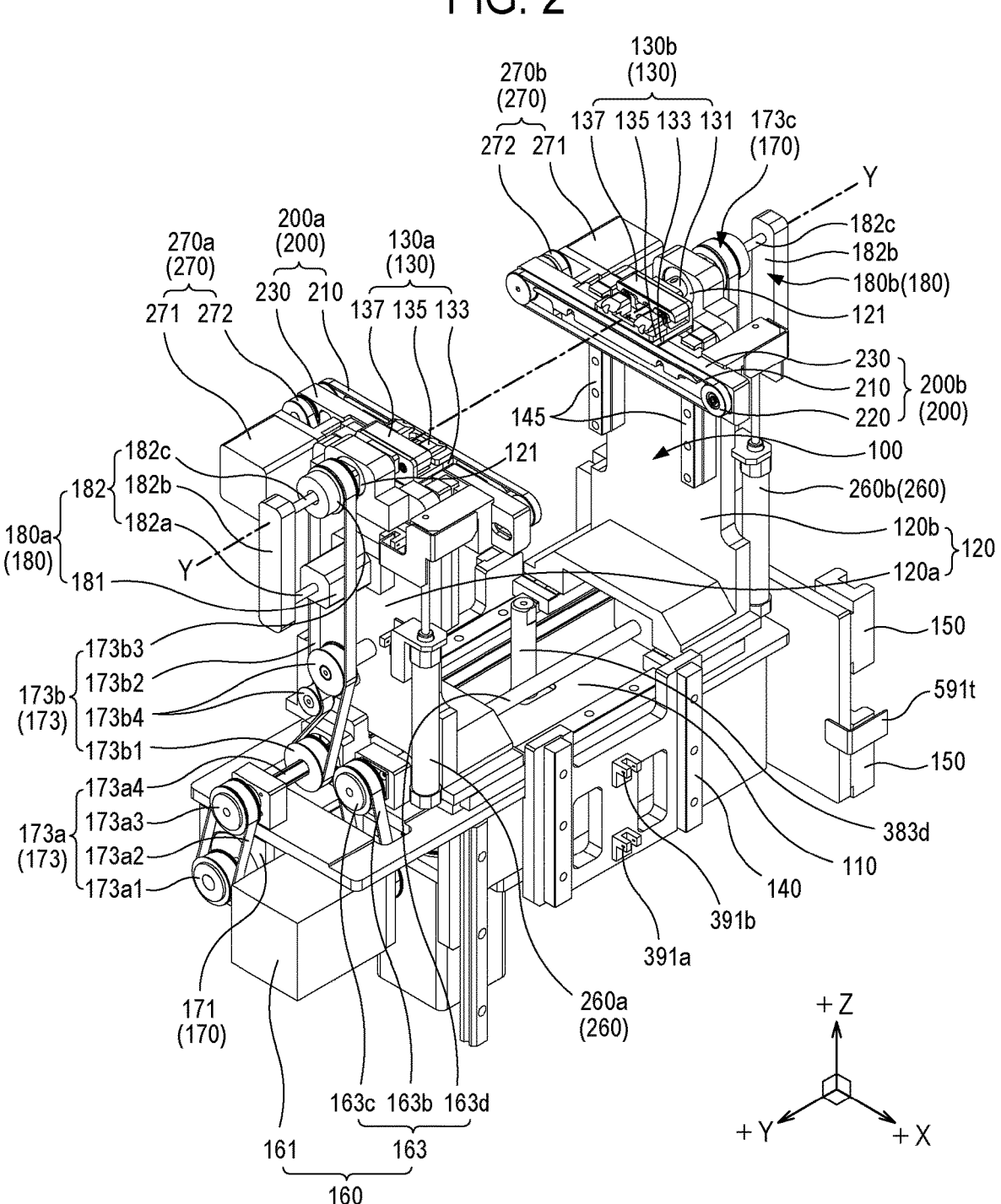
FIGS. 2 and 3 are perspective views illustrating a Y-axis flipper unit 100, a transfer unit 200, and drivers 160, 170, 180, 260, 270, and 380 of FIG. 1.
Figure 3:
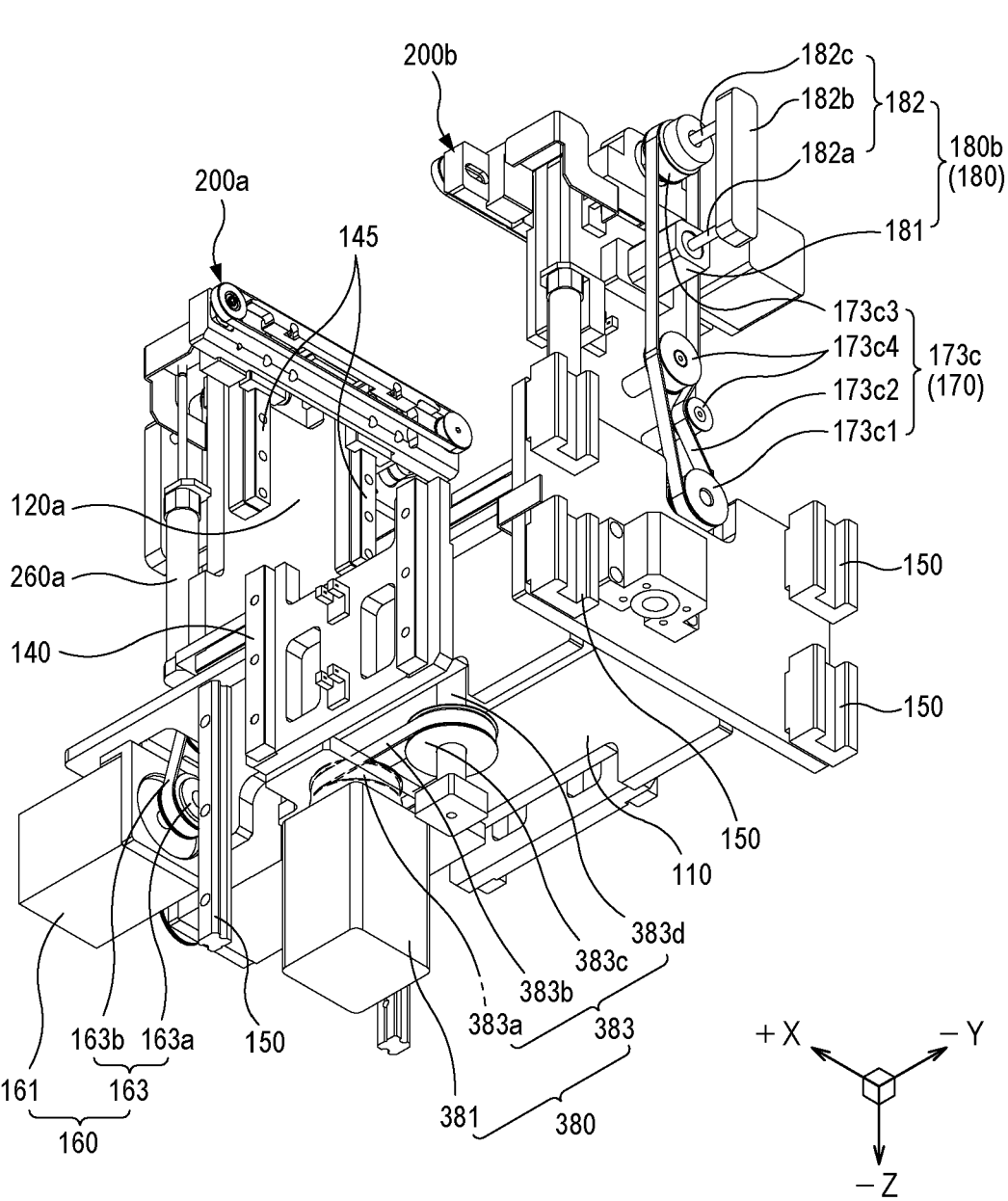

FIGS. 2 and 3 are perspective views of the Y-axis flipper unit 100, the transfer unit 200, and drivers 160, 170, 180, 260, 270, and 380 of FIG. 1. FIG. 2 illustrates the Y-axis Y, which is the rotational axis of Y-axis holders 130. An assembly of the Y-axis flipper unit 100 and the transfer unit 200 may be referred to as a "Y-axis flipper assembly (100, 200)." The Y-axis flipper assembly (100, 200) may include one or more drivers 160, 170, 180, 260, and 270.

Referring to FIGS. 2 and 3, the Y-axis flipper unit 100 is supported on the Z-axis elevation unit 500 so as to be movable in the Z-axis direction with respect to the Z-axis elevation unit 500. The Y-axis flipper unit 100 is configured to rotate the object about the Y-axis. The Y-axis flipper unit 100 is configured to narrow or widen the space between a pair of Y-axis holders 130a and 130b in the Y-axis direction. The Y-axis flipper unit 100 is configured to narrow or widen the space between a pair of Y-axis auxiliary grip parts 137 in the Y-axis direction.

The Y-axis flipper unit 100 includes a Y-axis flipper base 110 supported on the Z-axis elevation unit 500. The Y-axis flipper base 110 is disposed in the Z-axis elevation unit 500 to be movable in the Z-axis direction. The Y-axis flipper base 110 supports a pair of body frames 120a and 120b.

The Y-axis flipper unit 100 includes a body frame 120 supported on the Y-axis flipper base 110. The body frame 120 is supported on the Y-axis flipper base 110 to be movable in the Y-axis direction. The pair of body frames 120a and 120b are configured to operate so as to narrow or widen the space therebetween in the Y-axis direction. The pair of body frames 120a and 120b include a first body frame 120a disposed in the +Y-axis direction and a second body frame 120b disposed in the −Y-axis direction.

The Y-axis flipper unit 100 includes rotation joints 121 rotatably supporting the Y-axis holders 130. Y-axis shafts 131 of the Y-axis holders 130 may be supported by the rotation joints 121 to be rotatable about the Y-axis.

The Y-axis flipper unit 100 includes the Y-axis holders 130 configured to hold an object in the Y-axis direction of the object. The Y-axis flipper unit 100 includes a pair of Y-axis holders 130a and 130b supported on the pair of corresponding body frames 120a and 120b. The pair of Y-axis holders 130a and 130b include a first Y-axis holder 130a disposed in the +Y-axis direction and a second Y-axis holder 130b disposed in the −Y-axis direction.

The pair of Y-axis holders 130a and 130b are configured to rotate about the Y-axis with respect to the pair of body frames 120a and 120b. The pair of Y-axis holders 130a and 130b are configured to hold the object therebetween. The pair of Y-axis holders 130a and 130b are configured to hold the object in the Y-axis direction.

The Y-axis flipper unit 100 includes a Y-axis shaft 131 supported on the body frame 120 to be rotatable about the Y-axis. The Y-axis shaft 131 may be disposed to pass through the corresponding body frame 120 in the Y-axis direction. The Y-axis shaft 131 may be rotatably supported by the rotation joint 121 of the body frame 120.

The Y-axis flipper unit 100 may include an X-axis flipper guide 140 configured to guide the movement of the X-axis flipper unit 300 in the Z-axis direction. The X-axis flipper unit 300 may include a transfer unit guide 145 configured to guide the movement of the transfer unit 200 in the Z-axis direction. The Y-axis flipper unit 100 may include Z-axis sliders 150 configured to slide in the Z-axis direction along the Z-axis guides 530 of the Z-axis elevation unit 500.

The Y-axis flipper unit 100 may include a Y-axis rotation home sensor (not illustrated) configured to detect a position of a predetermined rotation angle of the Y-axis holders 130. The Y-axis flipper unit 100 may include an auxiliary grip part sensor (not illustrated) configured to generate a detection signal when the auxiliary grip parts 137 move to a predetermined position with respect to the support grip parts 133. The Y-axis flipper unit 100 may include a Y-axis movement sensor (not illustrated) configured to generate a detection signal when the body frame 120 moves to a predetermined position relative to the Y-axis flipper base 110. The Y-axis movement sensor may detect the state in which the space between the pair of body frames 120a and 120b is narrowed in the Y-axis direction and the state in which the space is widened in the Y-axis direction.

The Y-axis flipper unit 100 may include a Y-axis contactor sensor (not illustrated) configured to generate a detection signal when the object is brought into contact with a Y-axis contactor 135a, and the Y-axis contactor moves a predetermined distance in the Y-axis direction with respect to the support grip part 133. The Y-axis contactor sensor may detect a signal when the Y-axis contactor 135a compresses at least one elastic member 135b to be described later. A Y-axis movement driver 160 to be described later may be configured to stop providing a driving force when a signal is detected by the Y-axis contactor sensor while providing the driving force in a direction in which the pair of body frames 120a and 120b get closer to each other.

The transfer unit 200 is supported on the Y-axis flipper unit 100. The transfer unit 200 is configured to move in the Z-axis direction with respect to the Y-axis flipper unit 100. The transfer unit 200 is configured to operate the transfer belt 210 so as to transfer the object placed on the transfer belt 210 in the X-axis direction.

The transfer unit 200 may include a pair of transfer parts 200a and 200b. The pair of transfer parts 200a and 200b are supported on the corresponding pair of body frames. The pair of transfer parts 200a and 200b include a first transfer part 200a supported on the first body frame 120a and a second transfer part 200b supported on the second body frame 120b. The pair of transfer parts 200a and 200b are configured to transfer the object in the X-axis direction.

The transfer unit 200 includes a transfer belt 210 supporting the object and being configured to transfer the object in the X-axis direction. The transfer unit 200 includes a transfer pulley 220 configured to operate the transfer belt 210 by rotation. The transfer unit 200 includes a transfer frame 230 on which the transfer pulley 220 is disposed. The transfer frame 230 is supported on the body frame 120.

The Y-axis flipper assembly (100, 200) may include a transfer unit elevation sensor (not illustrated) configured to generate a detection signal when the transfer unit 200 moves to a predetermined position with respect to the Y-axis flipper unit 100. The transfer unit elevation sensor may detect the state in which the transfer unit 200 is raised in the Z-axis direction and the state in which the transfer unit 200 is lowered in the Z-axis direction. A pair of transfer unit lifting sensors corresponding to the pair of transfer parts 200*a* and 200*b* may be provided.

The flipper apparatus 10 includes a Y-axis movement driver 160 configured to provide a driving force for moving the pair of body frames 120*a* and 120*b* in the Y-axis direction with respect to the Y-axis flipper base 110. The Y-axis movement driver 160 is supported on the Y-axis flipper unit 100. The Y-axis movement driver 160 may include a motor 161 and a driving force transmission part 163 configured to transmit the driving force of the motor 161 to the pair of body frames 120*a* and 120*b*.

In an embodiment, the driving force transmission part 163 may include a pulley 163*a* fixed to the rotation shaft of the motor 161 to rotate, a belt 163*b* wound around the pulley 163*a* to receive a rotational force, and a pulley 163*c* engaged with the belt 163*b* to receive the rotational force. The driving force transmission part 163 may include a lead screw 163*d* coupled to the pulley 163*c* to rotate integrally with the pulley 163*c*. When the lead screw 163*d* rotates in one direction, the pair of body frames 120*a* and 120*b* may move along the lead screw 163*d* to narrow the space therebetween in the Y-axis direction, and when the lead screw 163*d* rotates in the other direction, the pair of body frames 120*a* and 120*b* may move along the lead screw 163*d* to be spaced apart from each other in the Y-axis direction.

The flipper apparatus 10 includes a Y-axis holder rotation driver 170 configured to provide a driving force for rotating the Y-axis holders 130 with respect to the body frame 120. The Y-axis holder rotation driver 170 may provide a driving force for rotating the Y-axis shafts 131. The Y-axis holder rotation driver 170 is supported on the Y-axis flipper unit 100. The Y-axis holder rotation driver 170 may include a motor 171 and driving force transmission parts 173*a*, 173*b*, and 173*c* configured to transmit the driving force of the motor 171 to the pair of Y-axis holders 130*a* and 130*b*.

The driving force transmission parts 173*a*, 173*b*, and 173*c* may include a basic driving force transmission part 173*a* configured to transmit the rotational force of the motor 171 to the first driving force transmission part 173*b* and the second driving force transmission part 173*c*. The driving force transmission parts 173*a*, 173*b*, and 173*c* may include a first driving force transmission part 173*b* configured to receive a rotational force from the basic driving force transmission part 173*a* and to transmit the rotational force to the first Y-axis holder 130*a*, and a second driving force transmission part 173*c* configured to receive a rotational force from the basic driving force transmission part 173*a* and to transmit the rotational force to the second Y-axis holder 130*b*.

In an embodiment, the basic driving force transmission part 173*a* may include a pulley 173*al* fixed to the rotation shaft of the motor 171 to rotate, a belt 173*a*2 wound around the pulley 173*al* to receive a rotational force, and a pulley 173*a*3 engaged with the belt 173*a*2 to receive the rotational force. The basic driving force transmission part 173*a* may include a serrated shaft 173*a*4 coupled to the pulley 173*a*3 to rotate integrally with the pulley 173*a*3. The motor 171 and the basic driving force transmission part 173*a* may be supported on the Y-axis flipper base 110.

In an embodiment, the first driving force transmission part 173*b* may include a pulley 173*b*1 coupled to the serrated shaft 173*a*4 to receive a rotational force and configured to be movable in the Y-axis direction along the serrated shaft 173*a*4. The first driving force transmission part 173*b* may include a belt 173*b*2 wound around the pulley 173*b*1 to receive a rotational force, and a pulley 173*b*3 engaged with the belt 173*b*2 to receive the rotational force and to rotate the first Y-axis holder 130*a*. The first driving force transmission part 173*b* may include a guide pulley 173*b*4 configured to come into contact with the belt 173*b*2 so as to guide the position of the belt 173*b*2. The first driving force transmission part 173*b* is supported on the first body frame 120*a*.

In an embodiment, the second driving force transmission part 173*c* may include a pulley 173*cl* coupled to the serrated shaft 173*a*4 to receive a rotational force and configured to be movable in the Y-axis direction along the serrated shaft 173*a*4. The second driving force transmission part 173*c* may include a belt 173*c*2 wound around the pulley 173*cl* to receive a rotational force, and a pulley 173*c*3 engaged with the belt 173*c*2 to receive the rotational force and to rotate the second Y-axis holder 130*b*. The second driving force transmission part 173*c* may include a guide pulley 173*c*4 configured to come into contact with the belt 173*c*2 so as to guide the position of the belt 173*c*2. The second driving force transmission part 173*c* is supported on the second body frame 120*b*.

The flipper apparatus 10 may include an auxiliary grip part driver 180 configured to provide a driving force for operating the auxiliary grip part 137. A pair of auxiliary grip part drivers 180*a* and 180*b* may be provided to provide a driving force for operating the pair of auxiliary grip parts, respectively. The auxiliary grip part driver 180 may be supported on the body frame 120.

The flipper apparatus 10 includes a transfer unit elevation driver 260 configured to provide a driving force for moving the transfer unit 200 in the Z-axis direction with respect to the Y-axis flipper unit 100. The transfer unit elevation driver 260 may be supported on the body frame 120. For example, the transfer unit elevation driver 260 may include a cylinder configured to drive a rod in the vertical direction.

The transfer unit elevation driver 260 includes a pair of transfer part elevation drivers 260*a* and 260*b* configured to operate the pair of transfer parts 200*a* and 200*b*, respectively. The transfer part elevation drivers 260*a* and 260*b* are supported on the body frame 120. The transfer part elevation drivers 260*a* and 260*b* provide a driving force for moving the transfer parts 200*a* and 200*b* in the Z-axis direction with respect to the body frame 120. A pair of transfer part elevation drivers 260*a* and 260*b* include a first transfer part elevation driver 260*a* configured to move the first transfer part 200*a* up and down, and a second transfer part elevation driver 260*b* configured to move the second transfer part 200*b* up and down.

The flipper apparatus 10 includes a belt driver 270 configured to provide a driving force for operating the transfer belt 210. The belt driver 270 may be supported on the transfer frame 230. For example, the belt driver 270 may include a motor 271 and a belt and pulley 272 configured to transmit the driving force of the motor 271 to the transfer belt 210.

The belt driver 270 includes a pair of belt drivers 270*a* and 270*b* configured to operate the transfer belts 210 of the pair of transfer parts 200*a* and 200*b*, respectively. The pair of belt drivers 270*a* and 270*b* include a first belt driver 270*a* configured to operate the transfer belt 210 of the first transfer part 200*a* and a second belt driver 270*b* configured to operate the transfer belt 210 of the second transfer part 200*b*.

The flipper apparatus 10 may include an X-axis flipper elevation driver 380 configured to provide a driving force for moving the X-axis flipper unit 300 in the Z-axis direction with respect to the Y-axis flipper unit 100. The X-axis flipper elevation driver 380 may be supported on the Y-axis flipper base 110. The X-axis flipper elevation driver 380 may include a motor 381 and a driving force transmission part 383 configured to transmit the driving force of the motor 381 to the X-axis flipper unit 300.

In an embodiment, the driving force transmission part 383 may include a pulley 383a fixed to the rotation shaft of the motor 381 to rotate, a belt 383b wound around the pulley 383a to receive a rotational force, and a pulley 383c engaged with the belt 383b to receive the rotational force. The driving force transmission part 383 may include a lead screw 383d coupled to the pulley 383c to rotate integrally with the pulley 383c. When the lead screw 383d rotates in one direction, the X-axis flipper base 310 moves in the +Z-axis direction along the lead screw 383d, and when the lead screw 383d rotates in the other direction, the X-axis flipper base 310 may move in the −Z-axis direction along the lead screw 383d.

Figure 4:
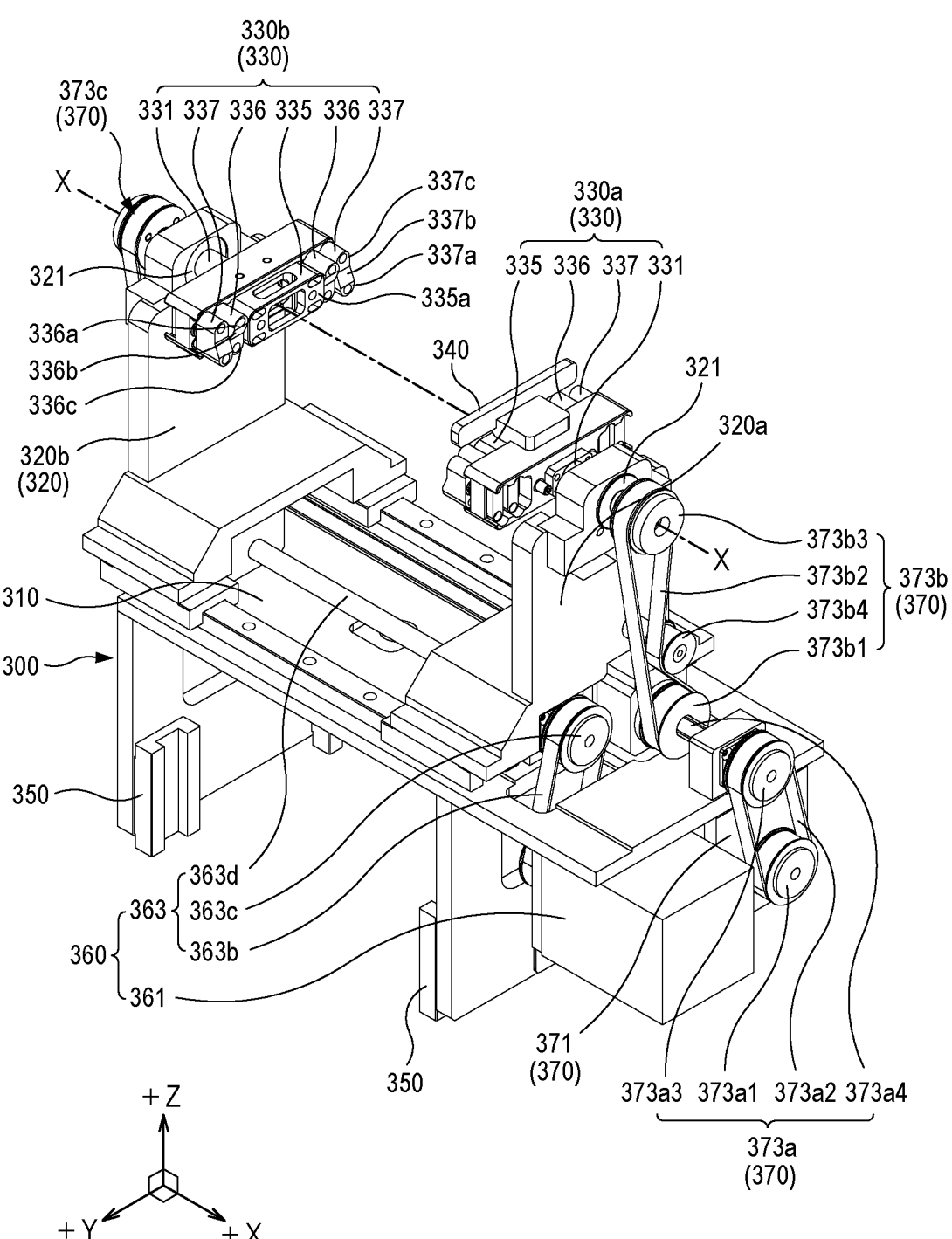
FIG. 4 is a perspective view illustrating an X-axis flipper unit 300 and drivers 360 and 370 of FIG. 1.

FIG. 4 is a perspective view illustrating an X-axis flipper unit 300 and drivers 360 and 370 in FIG. 1. FIG. 4 illustrates the X-axis X, which is the rotational axis of the X-axis holders 330.

Referring to FIG. 4, the X-axis flipper unit 300 may be supported on the Y-axis flipper unit 100 so as to be movable in the Z-axis direction with respect to the Y-axis flipper unit 100. The X-axis flipper unit 300 is configured to rotate the object about the X-axis. The X-axis flipper unit 300 is configured to narrow or widen the space between a pair of X-axis holders 330a and 330b in the X-axis direction. The X-axis flipper unit 300 is configured to be movable in the Z-axis direction with respect to the Y-axis flipper unit 100.

The X-axis flipper unit 300 includes an X-axis flipper base 310 supported on the Z-axis elevation unit 500. The X-axis flipper base 310 may be supported on the Z-axis elevation unit 500 via the Y-axis flipper unit 100. The X-axis flipper base 310 may be supported on the Y-axis flipper base 110. The X-axis flipper base 310 may be disposed to be movable in the Z-axis direction with respect to the Y-axis flipper unit 100.

The X-axis flipper unit 300 includes side frames 320 supported on the X-axis flipper base 310. The side frames 320 are supported on the X-axis flipper base 310 to be movable in the X-axis direction. A pair of side frames 320 are configured to operate so as to narrow or widen the space therebetween in the X-axis direction. The pair of side frames 320 include a first side frame 320a disposed in the +X-axis direction and a second side frame 320b disposed in the −X-axis direction.

The X-axis flipper unit 300 includes rotation joints 321 rotatably supporting the X-axis holders 330. X-axis shafts 331 of the X-axis holders 330 may be supported by the rotation joints 321 to be rotatable about the X-axis.

The X-axis flipper unit 300 includes the X-axis holders 330 configured to hold the object in the X-axis direction of the object. The X-axis flipper unit 300 includes a pair of X-axis holders 330a and 330b supported on the pair of corresponding side frames 320a and 320b. The pair of X-axis holders 330a and 330b include a first X-axis holder 330a disposed in the +X-axis direction and a second X-axis holder 330b disposed in the −X-axis direction.

The pair of X-axis holders 330a and 330b are configured to rotate about the X-axis with respect to the pair of side frames 320a and 320b. The pair of X-axis holders 330a and 330b are configured to hold the object therebetween.

The X-axis flipper unit 300 includes X-axis shafts 331 supported on the side frames 320 to be rotatable about the X-axis. The X-axis shafts 331 may be disposed to pass through the corresponding side frames 320 in the X-axis direction. The X-axis shafts 331 may be rotatably supported by the rotation joints 321 of the side frames 320.

The X-axis holders 330 are supported on the side frames 320 to be rotatable about the X-axis. Each X-axis holder 330 includes an X-axis contactor 335 having a contact surface 335a configured to come into contact with the object in the X-axis direction. The X-axis contactor 335 is supported on the X-axis shaft 331. The X-axis contactor 335 is disposed on the X-axis. The X-axis contactor 335 is disposed such that the X-axis passes through the X-axis contactor 335.

The X-axis holder 330 may include a first grip part 336 formed such that a +Z-axis direction portion protrudes in the X-axis direction compared to a−Z-axis direction portion. The first grip part 336 is supported on the X-axis shaft 331. The first grip part 336 is disposed on one side of the X-axis contactor 335. The first grip part 336 is disposed in a direction perpendicular to the X-axis with respect to the X-axis contactor 335.

The +Z-axis direction portion of the first grip part 336 protrudes in the X-axis direction so as to form a first protruding surface 336a, and the −Z-axis direction portion of the first grip part 336 is recessed in the X-axis direction so as to form a first recessed surface 336c. The first grip part 336 forms a first inclined surface 336b connecting the first protruding surface 336a and the first recessed surface 336c. A pair of first grip parts 336 may be provided on both sides of the X-axis contactor 335.

The X-axis holder 330 may include a second grip part 337 formed such that a−Z-axis direction portion protrudes in the X-axis direction compared to a +Z-axis direction portion. The second grip part 337 is supported on the X-axis shaft 331. The second grip part 337 is disposed on one side of the first grip part 336. The second grip part 337 is disposed in a direction perpendicular to the X-axis with respect to the first grip part 336.

The X-axis contactor 335, the first grip part 336, and the second grip part 337 may be arranged along any one direction perpendicular to the X-axis. The X-axis contactor 335, the first grip part 336, and the second grip part 337 may be arranged along the Y-axis direction.

The +Z-axis direction portion of the second grip part 337 protrudes in the X-axis direction so as to form a second protruding surface 337a, and the −Z-axis direction portion of the second grip part 337 is recessed in the X-axis direction so as to form a second recessed surface 337c. The second grip part 337 forms a second inclined surface 337b connecting the second protruding surface 337a and the second recessed surface 337c. A pair of second grip parts 337 may be provided on both sides of the X-axis contactor 335.

The X-axis flipper unit 300 may include a transfer stopper 340 configured to limit the movement of the object moved by the transfer unit 200. The transfer stopper 340 may be disposed on only one of the pair of X-axis holders 330a and 330b. In this embodiment, the transfer stopper 340 is fixed to a first X-axis holder 330a. The transfer stopper 340 may protrude from the first X-axis holder 330a in the +Z-axis direction so as to form a surface facing the −X-axis direction. The object moved in the X-axis direction by the transfer unit 200 may be engaged with the transfer stopper 340 so that the movement thereof in the X-axis direction can be stopped.

The X-axis flipper unit 300 may include X-axis flipper sliders 350 configured to slide in the Z-axis direction along the X-axis flipper guides 140 of the Y-axis flipper unit 100. A pair of X-axis flipper sliders 350 may be configured to face each other in the X-axis direction.

The X-axis flipper unit 300 may include an X-axis rotation home sensor (not illustrated) configured to detect a position of a predetermined rotation angle of the X-axis holders 330. The X-axis flipper unit 300 may include an X-axis contactor sensor (not illustrated) configured to generate a detection signal when the object comes into contact with the X-axis contactor 335. The X-axis flipper unit 300 may include an X-axis movement sensor (not illustrated) configured to generate a detection signal when the side frames 320 move to a predetermined position with respect to the X-axis flipper base 310. The X-axis movement sensor may detect the state in which the space between the pair of side frames 320a and 320b is narrowed in the X-axis direction and the state in which the space is widened in the X-axis direction.

The X-axis flipper unit 300 may include Z-axis movement sensors 391a and 391b configured to generate a detection signal when the X-axis flipper base 310 moves to a predetermined position with respect to the Y-axis flipper base 110 (see FIG. 3). When the X-axis flipper base 310 is disposed at a predetermined position with respect to the Y-axis flipper base 110, a target (not illustrated) fixed to the X-axis flipper base 310 is detected by the Z-axis movement sensors 391a and 391b.

The flipper apparatus 10 includes an X-axis movement driver 360 configured to provide a driving force for moving the pair of side frames 320a and 320b in the X-axis direction with respect to the X-axis flipper base 310. The X-axis movement driver 360 is supported on the X-axis flipper unit 300. The X-axis movement driver 360 may include a motor 361 and a driving force transmission part 363 configured to transmit the driving force of the motor 361 to the pair of side frames 320a and 320b.

In an embodiment, the driving force transmission part 363 may include a pulley (not illustrated) fixed to the rotation shaft of the motor 361 to rotate, a belt 363b wound around the pulley to receive a rotational force, and a belt 363c engaged with the belt 363b to receive the rotational force. The driving force transmission part 363 may include a lead screw 363d coupled to the pulley 363c to rotate integrally with the pulley 363c. When the lead screw 363d rotates in one direction, the pair of side frames 320a and 320b may move along the lead screw 363d to narrow the space therebetween in the X-axis direction, and when the lead screw 363d rotates in the other direction, the pair of side frames 320a and 320b may move along the lead screw 363d to be spaced apart from each other in the X-axis direction.

The flipper apparatus 10 includes an X-axis holder rotation driver 370 configured to provide a driving force for rotating the X-axis holders 330 with respect to the side frames 320. The X-axis holder rotation driver 370 may provide a driving force for rotating the X-axis shaft 331. The X-axis holder rotation driver 370 is supported on the X-axis flipper unit 300. The X-axis holder rotation driver 370 may include a motor 371 and driving force transmission parts 373a, 373b, and 373c configured to transmit the driving force of the motor 371 to the pair of X-axis holders 330a and 330b.

The driving force transmission parts 373a, 373b, and 373c may include a basic driving force transmission part 373a configured to transmit the rotational force of the motor 371 to the first driving force transmission part 373b and the second driving force transmission part 373c. The driving force transmission parts 373a, 373b, and 373c may include a first driving force transmission part 373b configured to receive a rotational force from the basic driving force transmission part 373a and to transmit the rotational force to the first X-axis holder 330a, and a second driving force transmission part 373c configured to receive a rotational force from the basic driving force transmission part 373a and to transmit the rotational force to the second X-axis holder 330b.

In an embodiment, the basic driving force transmission part 373a may include a pulley 373a1 fixed to the rotation shaft of the motor 371 to rotate, a belt 373a2 wound around the pulley 373a1 to receive a rotational force, and a pulley 373a3 engaged with the belt 373a2 to receive the rotational force. The basic driving force transmission part 373a may include a serrated shaft 373a4 coupled to the pulley 373a3 to rotate integrally with the pulley 373a3. The motor 371 and the basic driving force transmission part 373a may be supported on the X-axis flipper base 310.

In an embodiment, the first driving force transmission part 373b may include a pulley 373b1 coupled to the serrated shaft 373a4 to receive a rotational force and configured to be movable in the X-axis direction along the serrated shaft 373a4. The first driving force transmission part 373b may include a belt 373b2 wound around the pulley 373b1 to receive a rotational force, and a pulley 373b3 engaged with the belt 373b2 to receive the rotational force and to rotate the first X-axis holder 330a. The first driving force transmission part 373b may include a guide pulley 373b4 configured to come into contact with the belt 373b2 so as to guide the position of the belt 373b2. The first driving force transmission part 373b is supported on the first side frame 320a.

In an embodiment, the second driving force transmission part 373c may include a pulley (not illustrated) coupled to the serrated shaft 373a4 to receive a rotational force and configured to be movable in the X-axis direction along the serrated shaft 373a4. The second driving force transmission part 373c is configured in the form of the first driving force transmission part 373b, and may rotate the second X-axis holder 330b. The second driving force transmission part 373c is supported on the second side frame 320b.

Figure 5:
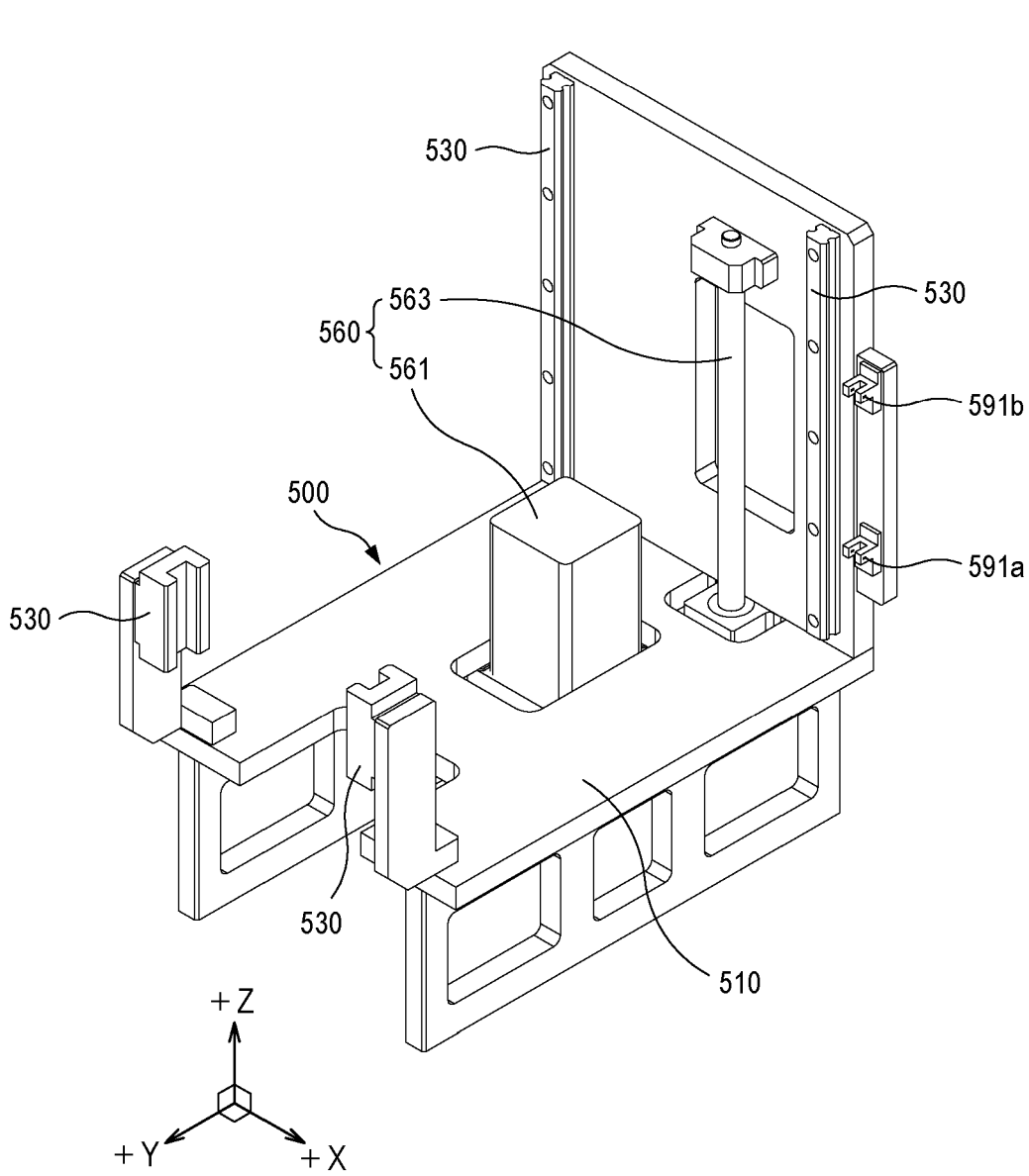
FIGS. 5 and 6 are perspective views illustrating a Z-axis elevation unit 500 and a Z-axis elevation driver 560 of FIG. 1.
Figure 6:
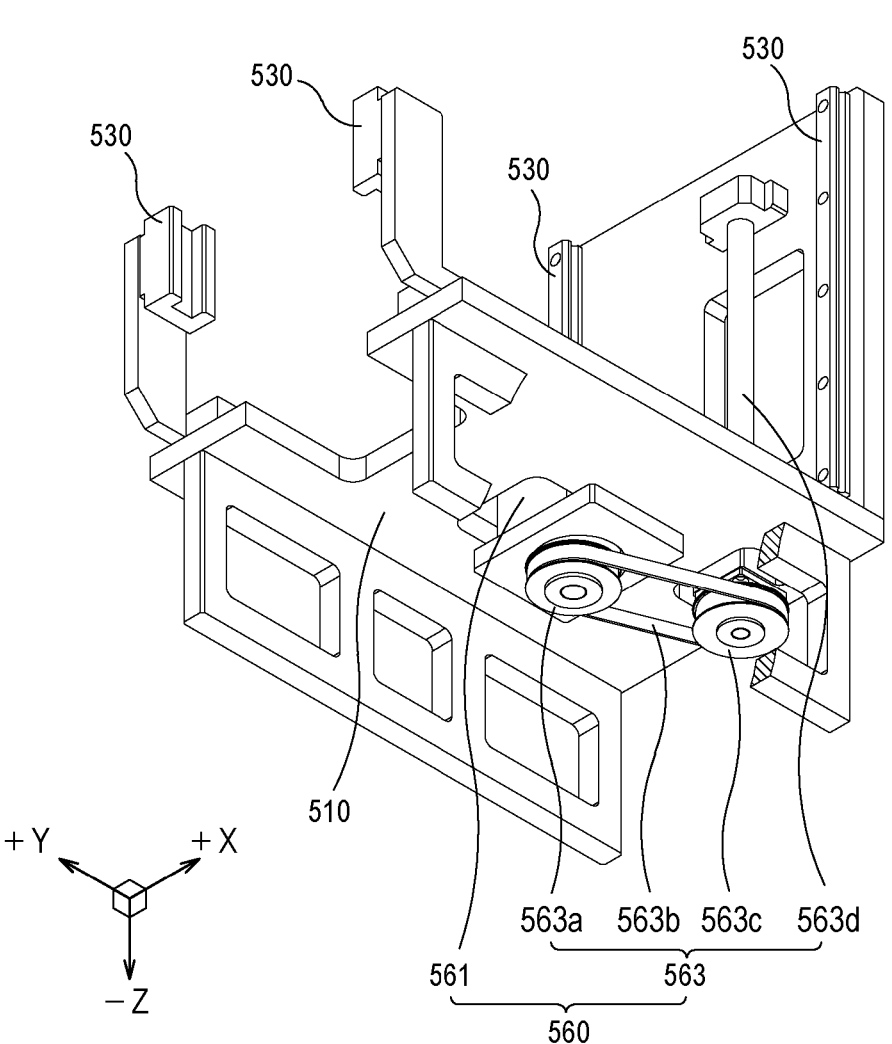

FIGS. 5 and 6 are perspective views illustrating the Z-axis elevation unit 500 and the Z-axis elevation driver 560 in FIG. 1. Referring to FIGS. 5 and 6, the Z-axis elevation unit 500 may be supported in an environment outside the flipper apparatus 10 (e.g., an external floor or wall). The Y-axis flipper unit 100 may be raised and lowered in the Z-axis direction with respect to the Z-axis elevation unit 500.

The Z-axis elevation unit 500 may include a support frame 510 supported by an external environment. The Z-axis elevation unit 500 may include Z-axis guides 530 formed on the support frame 510. The Z-axis guides 530 guide the movement of the Y-axis flipper unit 100 in the Z-axis direction.

The Z-axis elevation unit 500 may include elevation sensors 591a and 591b configured to generate a detection signal when the Y-axis flipper base 110 moves to a predetermined position with respect to the Z-axis elevation unit 500. When the Y-axis flipper base 110 is disposed at a predetermined position relative to the Z-axis elevation unit 500, a target 591t fixed to the Y-axis flipper base 110 is detected by the Z-axis movement sensors 391a and 391b (see FIG. 1).

The flipper apparatus 10 may include a Z-axis elevation driver 560 configured to provide a driving force for moving the Y-axis flipper unit 100 and the X-axis flipper unit 300 in the Z-axis direction with respect to the Z-axis elevation unit 500. The Z-axis elevation driver 560 may be supported on the Z-axis elevation unit 500. The Z-axis elevation driver 560 may include a motor 561 and a driving force transmission part 563 configured to transmit the driving force of the motor 561 to the Y-axis flipper unit 100.

In an embodiment, the driving force transmission part 563 may include a pulley 563a fixed to the rotation shaft of the motor 561 to rotate, a belt 563b wound around the pulley 563a to receive a rotational force, and a pulley 563c engaged with the belt 563b to receive the rotational force. The driving force transmission part 563 may include a lead screw 563d coupled to the pulley 563c to rotate integrally with the pulley 563c. When the lead screw 563d rotates in one direction, the Y-axis flipper base 110 moves in the +Z-axis direction along the lead screw 563d, and when the lead screw 563d rotates in the other direction, the Y-axis flipper base 110 may move in the −Z-axis direction along the lead screw 563d.

FIGS. 7 to 11 are perspective views sequentially illustrating a process of operating the flipper apparatus 10 according to an embodiment, in which, for convenience of description, the X-axis flipper unit 300 and the Z-axis elevation unit 500 are omitted in some drawings.

Figure 7:
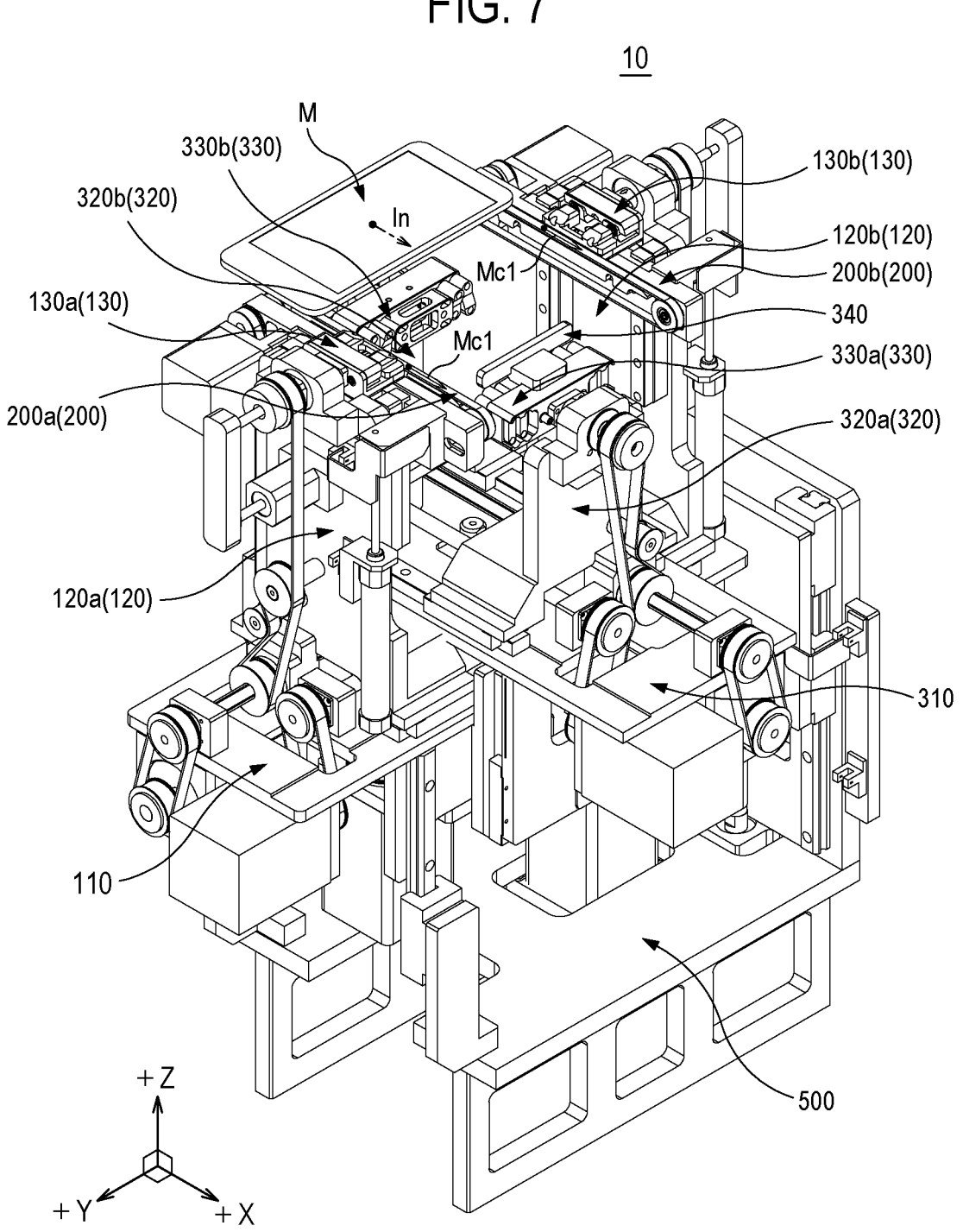
FIGS. 7 to 11 are perspective views sequentially illustrating a process of operating the flipper apparatus 10 according to an embodiment, in which, for convenience of description, the X-axis flipper unit 300 and the Z-axis elevation unit 500 are omitted in some drawings.

Referring to FIG. 7, an object M is introduced into the flipper apparatus 10. The top surface of the transfer belt 210 of the transfer unit 200 moves in the +X-axis direction (see arrows Mc1). Accordingly, the object M placed on the transfer belt 210 moves in the +X-axis-direction (see arrow In).

Figure 8:
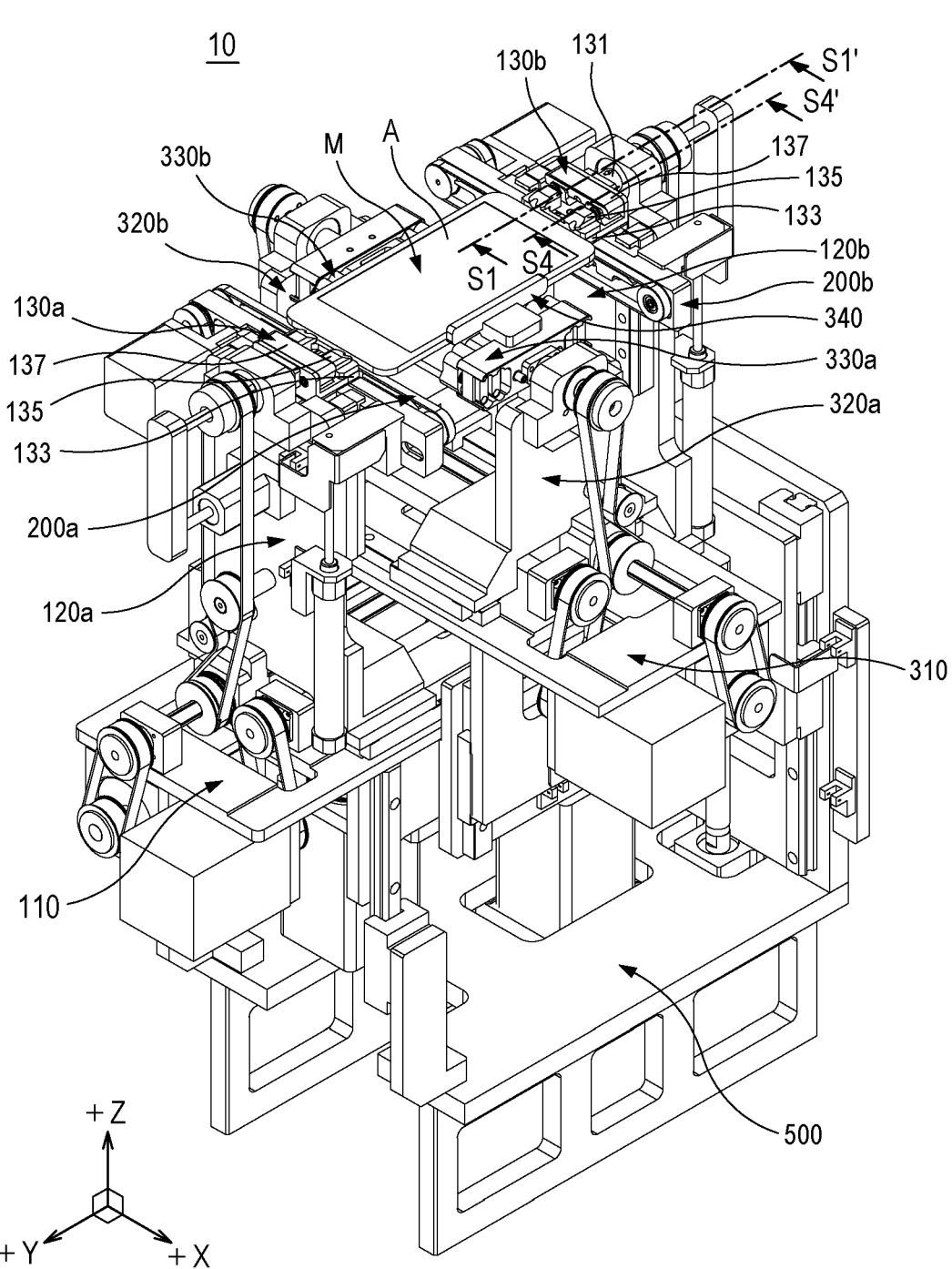

Referring to FIGS. 7 and 8, the X-axis flipper unit 300 is in the state of having been by a predetermined range with respect to the Y-axis flipper unit 100, and the object M is not engaged with the X-axis flipper unit 300 on the path through which the object M is transferred to a correct position in the flipper apparatus 10, and is engaged with the transfer stopper 340 of the X-axis flipper unit 300 when the flipper apparatus 10 reaches the correct position. Referring to FIG. 8, the object M is engaged with the transfer stopper 340 at a predetermined correct position and stopped so that the object M can no longer move in the +X-axis direction. Thereafter, the pair of side frames 320a and 320b are spaced apart from each other in the X-axis direction and move in the +Z-axis direction with respect to the Y-axis flipper unit 100 to maintain the state of being spaced apart from the object M.

Figure 9:
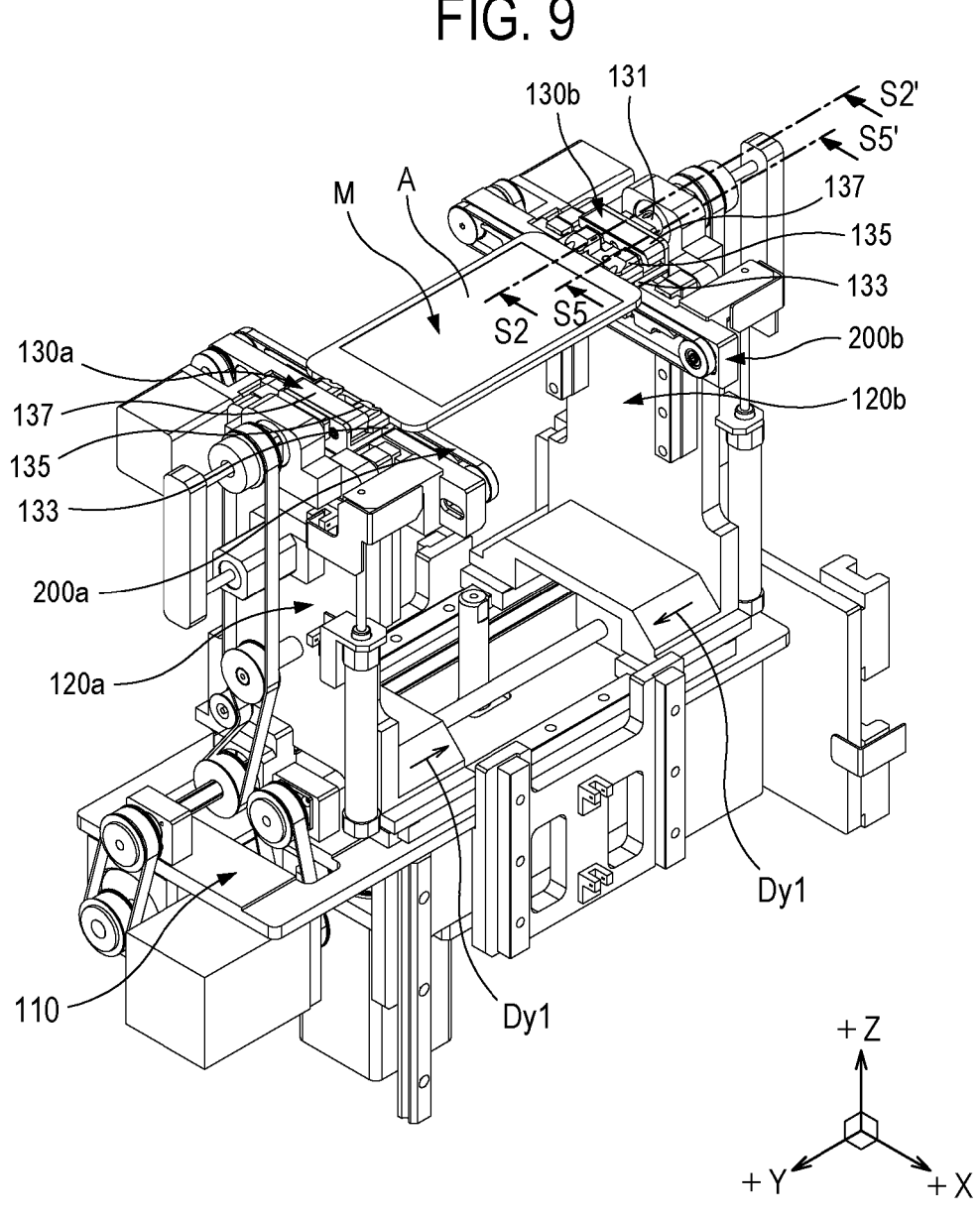

Referring to FIG. 9, the space between the pair of body frames 120a and 120b of the Y-axis flipper unit 100 is narrowed in the Y-axis direction (see arrows Dy1). Here, the support grip parts 133 of the Y-axis holders 130 support the bottom surface of the object M.

Figure 10:
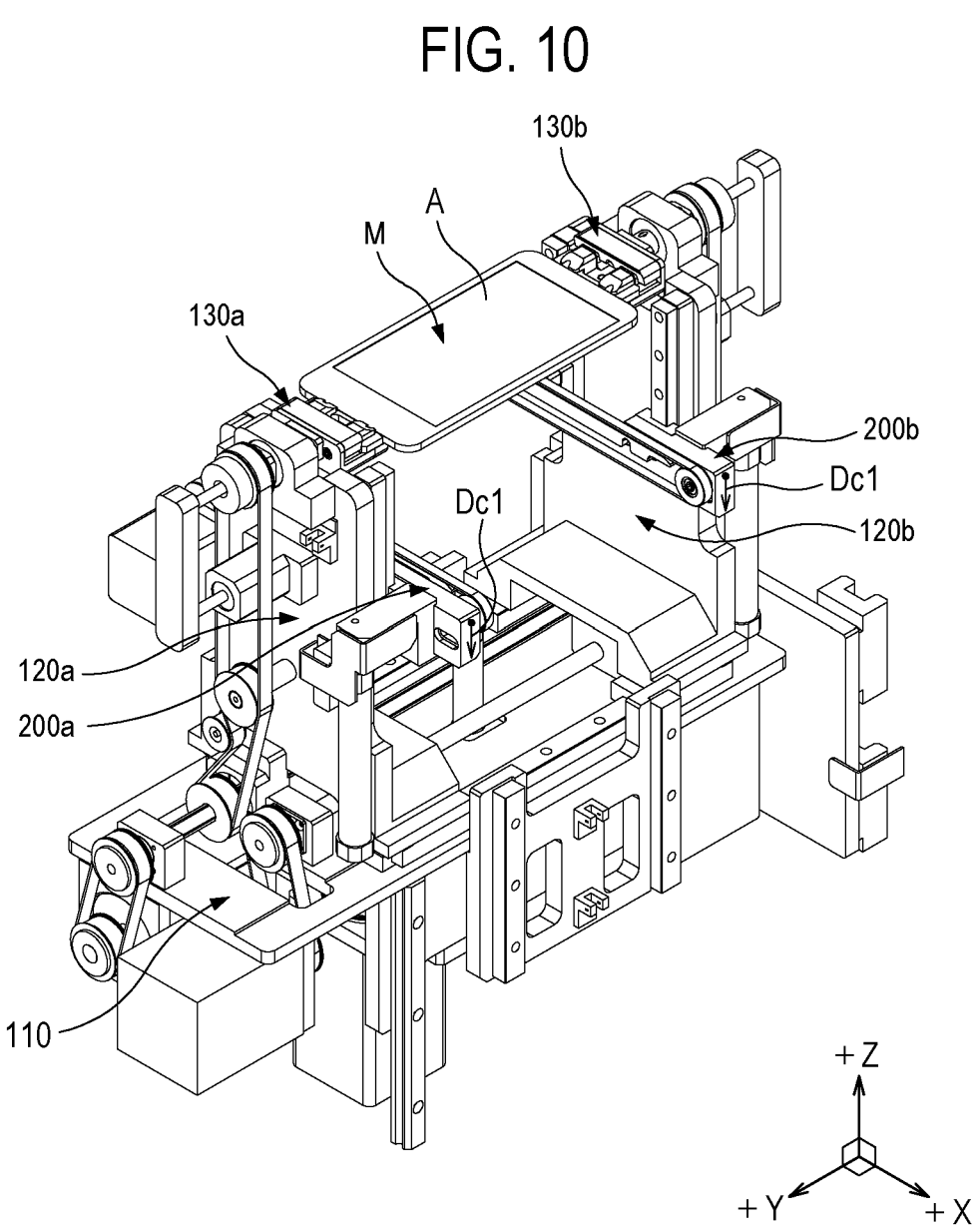

Referring to FIG. 10, the transfer parts 200a and 200b move in the −Z-axis direction along the body frame 120 (see arrows Dc1). Through this, it is possible to prevent the transfer unit 200 from interfering with the object M when the object M rotates.

Referring to FIG. 10, in the state in which the support grip parts 133 of the Y-axis holders 130 support the bottom side of the object M and the Y-axis contactors 135a are in contact with both sides of the object M in the Y-axis direction, an object surface A of the object M facing the +Z-axis direction is inspected by the camera device. Here, a pair of auxiliary grip parts 137 move into the state of being spaced further apart from each other compared to the pair of support grip parts 133, and since the auxiliary grip parts 137 do not block the +Z-axis direction of the object surface A, the entire object surface A can be inspected. The inspection of the object surface A can be performed while the transfer parts 200a and 200b are being lowered in the −Z-axis direction, and in this case, the inspection time can be shortened.

Figure 11:
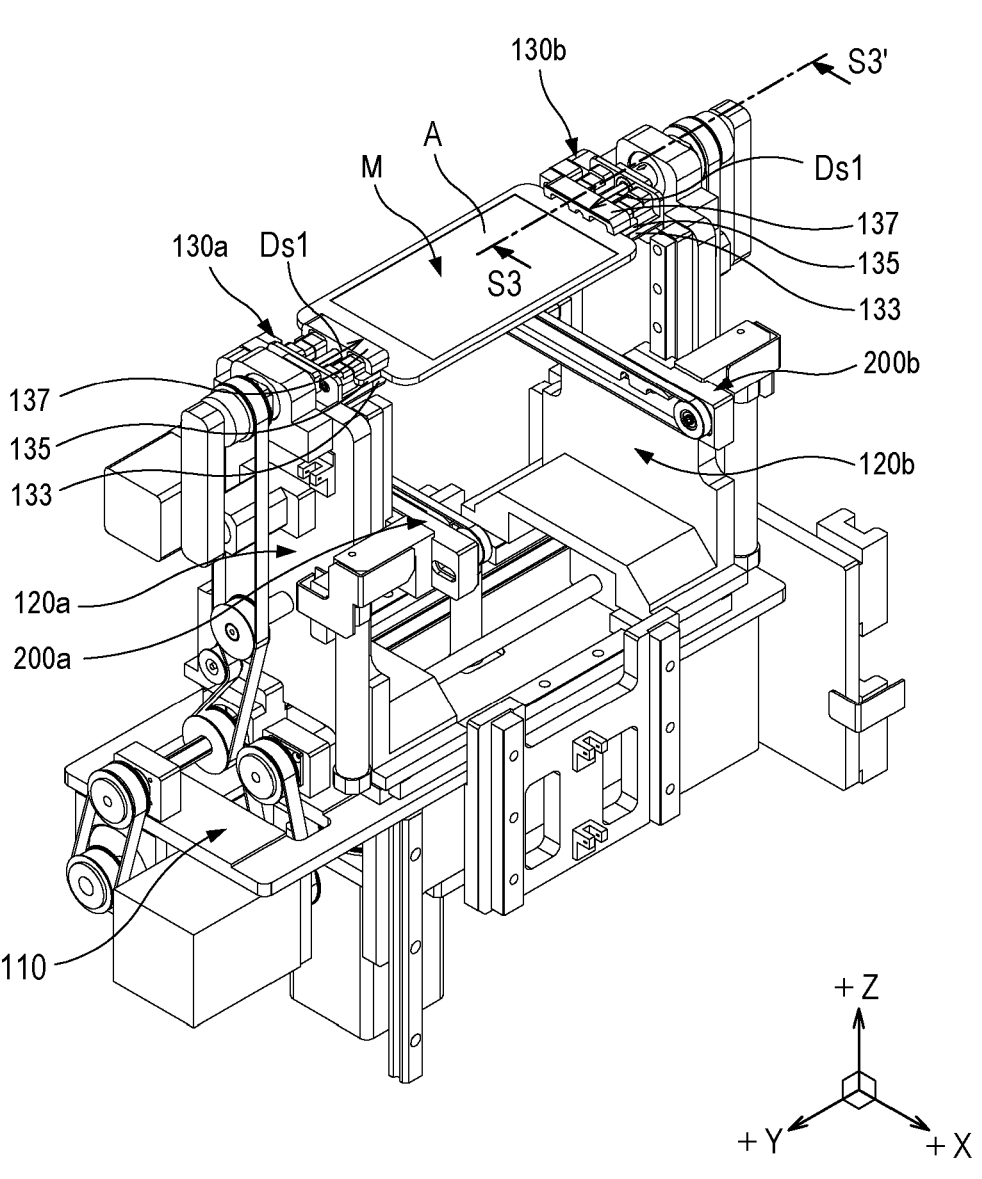

Referring to FIG. 11, for the inspection of object surfaces B1 and B2 after the inspection of the object surface A, the pair of auxiliary grip parts 137 are in the state in which the space therebetween is further narrowed compared to the pair of support grip parts 133 (see arrows Ds1). The support grip parts 133 and the auxiliary grip parts 137 hold the top and bottom sides of the object M so that the object M can be stably rotated.

Figure 12:
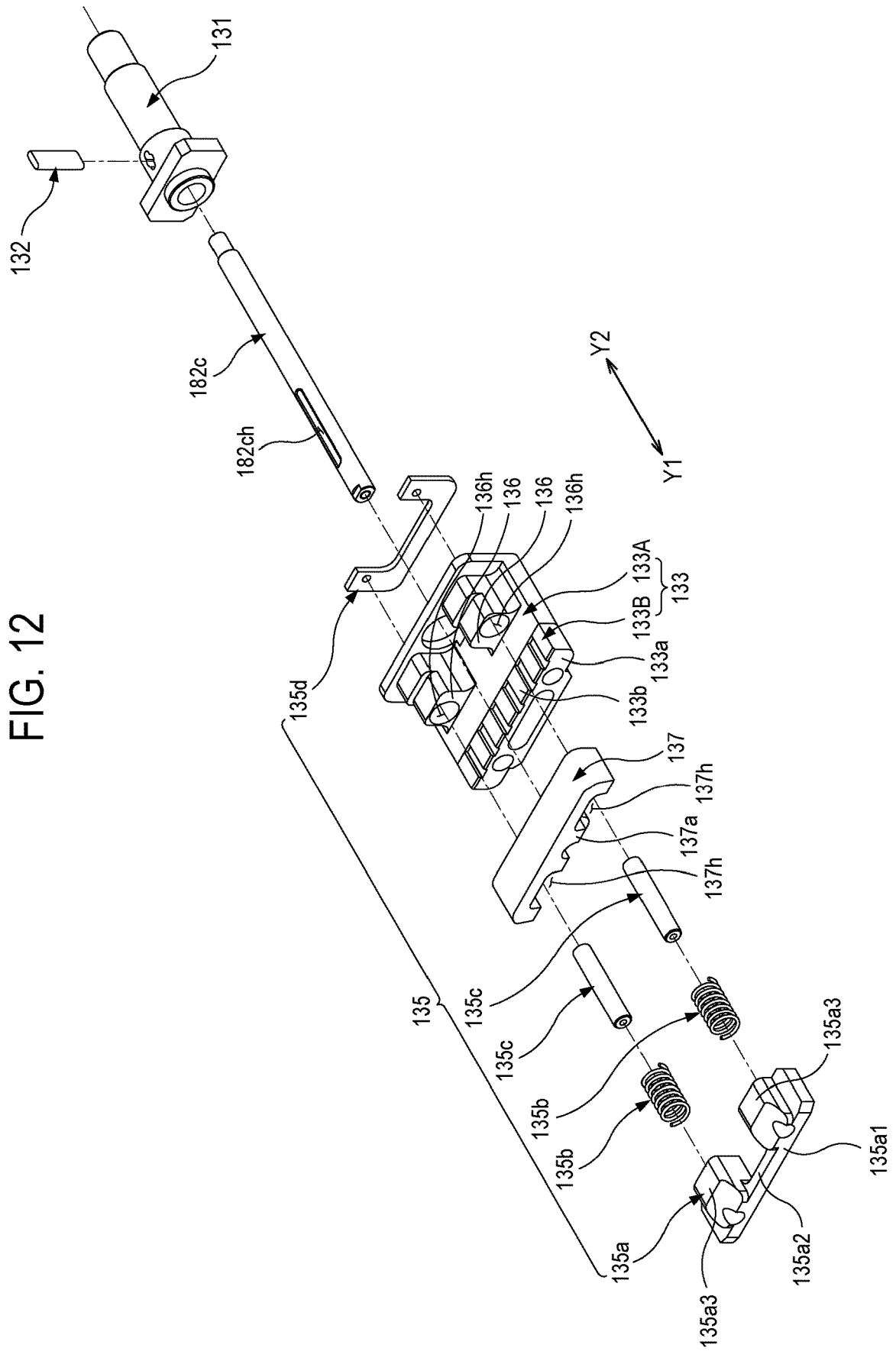
FIG. 12 is an exploded perspective view illustrating a Y-axis holder 130 and a rotation rod 182c of an auxiliary grip part driver 180 of FIG. 2.
Figure 13:
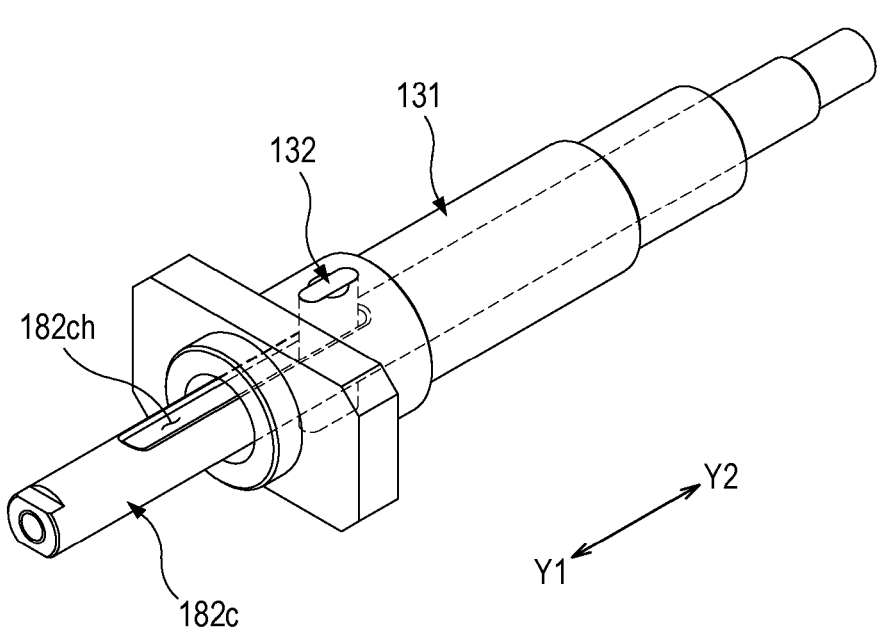
FIG. 13 is a perspective view illustrating the Y-axis rotation rod 182c, a shaft 131, and a rotation pin 132 of FIG. 12 in an assembled state.

FIG. 12 is an exploded perspective view illustrating the Y-axis holder 130 and the rotation rod 182c of the auxiliary grip part driver 180 in FIG. 2. FIG. 13 is a perspective view illustrating the Y-axis rotation rod 182c, the shaft 131, and the rotation pin 132 in FIG. 12 in an assembled state.

With reference to FIGS. 12 and 13, a detailed description will be made with reference to one of the pair of Y-axis holders 130 as follows. In one Y-axis holder 130, a first direction Y1 refers to a direction facing the other Y-axis holder, and a second direction Y2 refers to a direction opposite to the first direction Y1.

The Y-axis holder 130 includes a Y-axis shaft 131 supported on the body frame 120 to be rotatable about the Y-axis. A support grip part 133 may be fixed to the end of the Y-axis shaft 131 in the first direction Y1. The Y-axis shaft 131 is coupled with a rotation rod 182c to be described later. A rotation pin 132 to be described later is coupled to the Y-axis shaft 131.

The Y-axis holder 130 includes the support grip part 133 supported on the Y-axis shaft 131. The support grip part 133 is configured to protrude in the Y-axis direction Y1 to be engaged with one end of the object. The support grip part 133 protrudes in the Y-axis direction on the −Z-axis direction side with reference to the Y-axis contactor 135a to form a support surface 133b capable of coming into contact with the object M in the +Z-axis direction. The support grip part 133 forms a protruding end 133a in the first direction Y1. In the present embodiment, the support grip part 133 is formed by assembling a plurality of parts 133A and 133B, but is not limited thereto.

The Y-axis shaft 131 is fixed to the second direction Y2 side of the support grip part 133. The rotation rod 182c may pass through the support grip part 133 in the Y-axis direction. A limiter 135d may be disposed on the second direction Y2 side of the support grip part 133. The support grip part 133 may guide the moving direction of the elastic grip part 135. The support grip part 133 may guide the moving direction of the auxiliary grip part 137.

The Y-axis holder includes an elastic grip part 135 configured to generate an elastic force when coming into contact with and being pressed by the object M. The elastic grip part 135 includes a Y-axis contactor 135a configured to come into contact with the object M in the Y-axis direction. The Y-axis contactor 135a is configured to compress the elastic member 135b when the Y-axis contactor 135a comes into contact with the object M. The Y-axis contactor 135a is supported on the Y-axis shaft 131. For example, the Y-axis contactor 135a may be supported on the Y-axis shaft 131 via the support grip part 133.

The Y-axis contactor 135a includes a contact surface 135a*l* facing the first direction Y1. The contact surface 135a*l* is configured to be capable of coming into contact with the object M in the first direction Y1. The Y-axis contactor 135a includes the front portion 135a2 forming a portion in the first direction. The contact surface 135a*l* is disposed on the side surface of the front portion 135a2 in the first direction Y1. The Y-axis contactor 135a includes a guide part 135a3 configured to guide the movement of the auxiliary grip part 137 in the Y-axis direction. The guide part 135a3 extends in the Y-axis direction. The guide part 135a3 may be engaged with a groove 137h extending in the Y-axis direction in the auxiliary grip part 137. One Y-axis contactor 135a may include a pair of guide parts 135a3 spaced apart from each other.

The elastic grip part 135 includes at least one elastic member 135b configured to provide an elastic force in the Y-axis direction. The elastic member 135b is configured to be elastically compressed when the Y-axis contactor 135a is in contact with the object M. The at least one elastic member 135b may include a pair of elastic members 135b, with the Y-axis interposed therebetween.

The Y-axis holder 130 includes an elastic member support part 136 configured to support one end of the elastic member 135b. The end of the elastic member 135b in the second direction Y2 is supported by the elastic member support part 136. The other end of the elastic member 135b is connected to the Y-axis contactor 135a. The end of the elastic member 135b in the first direction Y1 is connected to the Y-axis contactor 135a.

The elastic member support part 136 is fixed to the support grip part 133. In this embodiment, the elastic member support part 136 is integrally formed with the support grip part 133, but is not limited thereto.

The Y-axis holder 130 includes a guide part 135c having one end to which the Y-axis contactor 135a is fixed. The Y-axis contactor 135a is fixed to the end of the guide part 135c in the first direction Y1. The guide part 135c is disposed to be movable only in the Y-axis direction on the support grip part 133. A pair of guide parts 135c may be provided. The guide part 135c may be disposed to pass through the support grip part 133 in the Y-axis direction. A hole 136h into which the guide part 135c is inserted in the second direction Y2 may be formed in the support grip part 133. The hole 136h may be formed in the elastic member support part 136. A pair of holes 136h corresponding to the pair of guide parts 135c may be formed.

The Y-axis holder 130 includes a limiter 135d fixed to the guide parts 135c. The limiter 135d is configured to limit the movable range of the guide parts 135c in the first direction Y1, which is the direction of one end of the guide parts 135c, by being engaged with the support grip part 133 or components moving integrally with the support grip part 133. In this embodiment, the limiter 135d is configured to be engaged with the side surface of the support grip part 133 in the second direction Y2. In another embodiment not shown, the limiter 135d may be configured to be engaged with a component such as a Y-axis shaft 131 that moves integrally with the support grip part 133. In the present disclosure, "moving integrally" means that a plurality of components move together without changing their positions relative to each other.

The Y-axis holder 130 includes an auxiliary grip part 137 configured to move from the +Z-axis direction side in the Y-axis direction with reference to the Y-axis contactor 135a. The auxiliary grip part 137 is configured to be movable in the Y-axis direction with respect to the support grip part 133. The auxiliary grip part 137 is configured to rotate integrally with the Y-axis shaft 131. In the present disclosure, "rotating integrally" means that a plurality of components move together without changing their positions relative to each other. The auxiliary grip part 137 forms a protruding end 137a in the first direction Y1.

The auxiliary grip part 137 is configured to move in the Y-axis direction to be engaged with or disengaged from the other end of the object M. The one end of the object M is engaged with the support grip part 133. The "one end" and the "other end" of the object M referred to herein mean ends in opposite directions (in the Z-axis direction) perpendicular to the Y-axis.

Figure 14A:
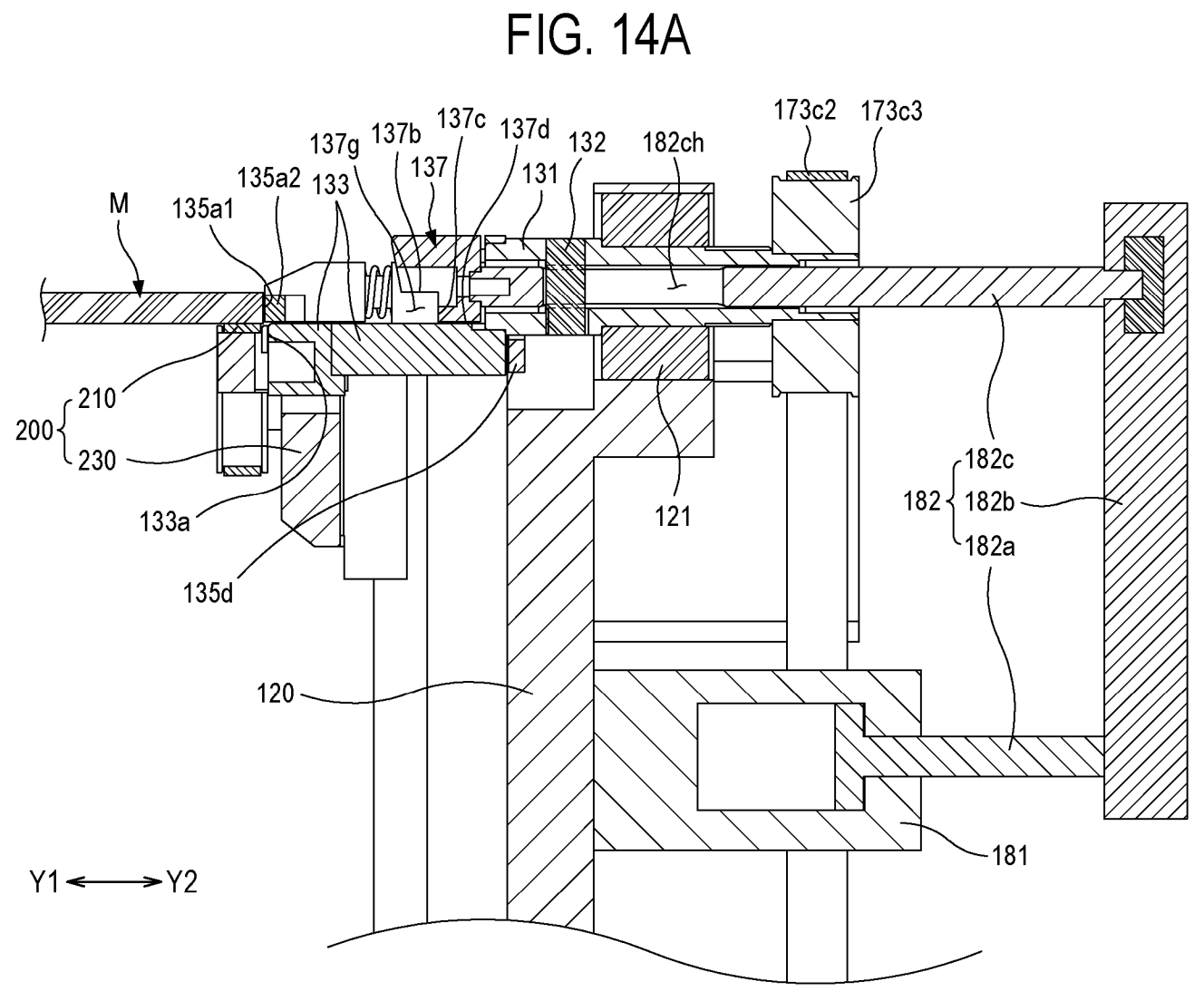
Figure 14B:
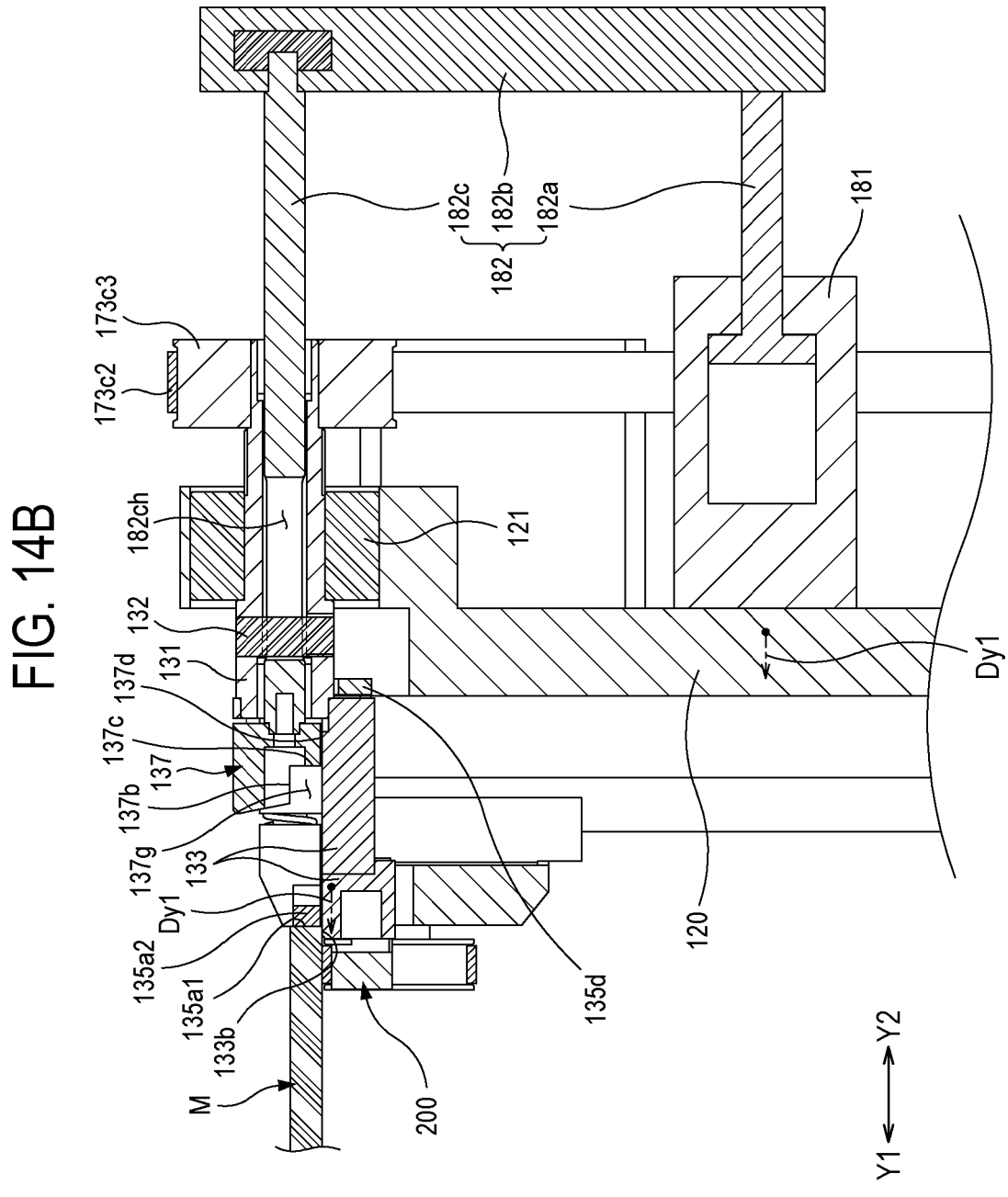
FIG. 14B is a partial cross-sectional view of the flipper apparatus 10 taken along line S2-S2' in FIG. 9.
Figure 14C:
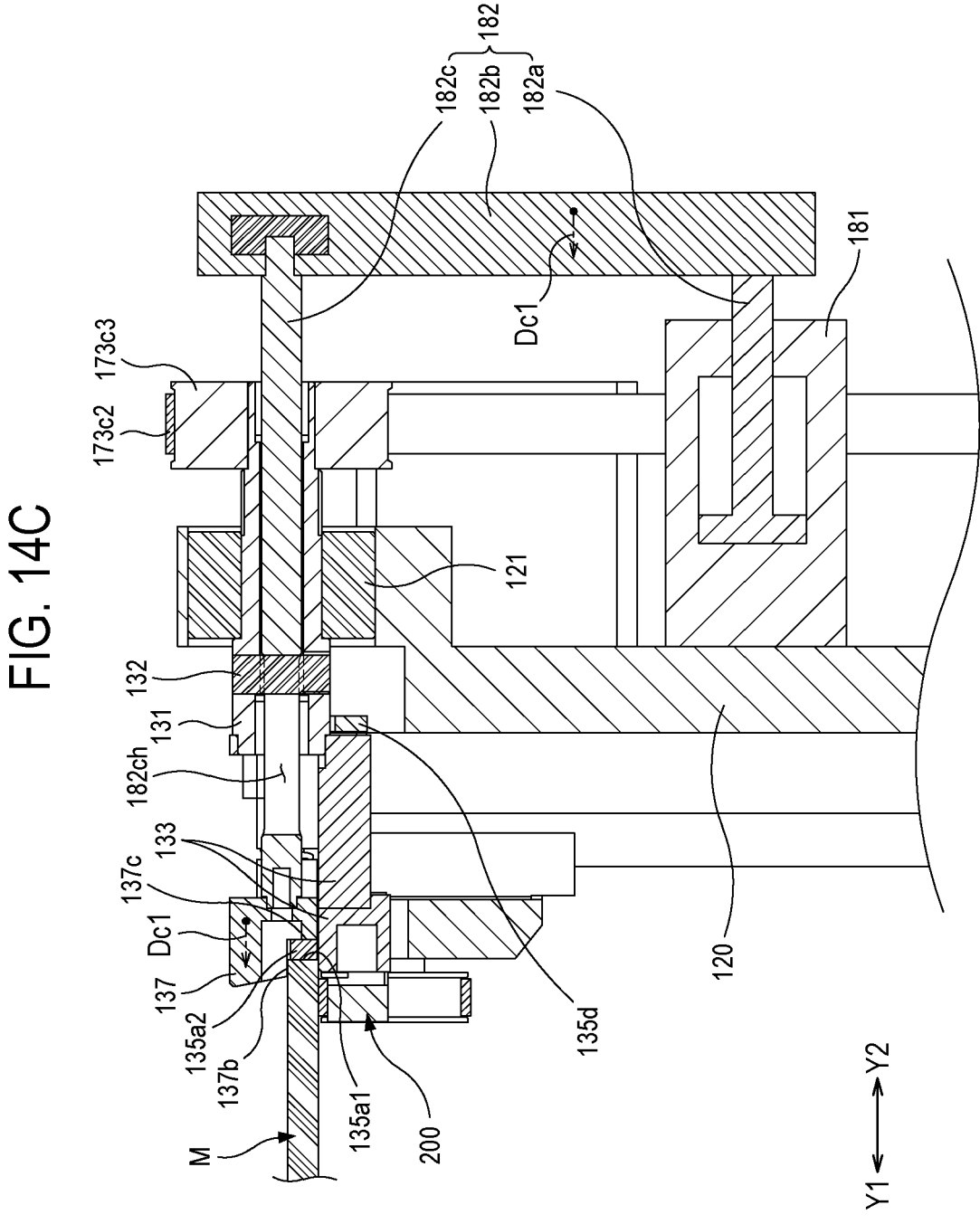
FIG. 14C is a partial cross-sectional view of the flipper apparatus 10 taken along line S3-S3' in FIG. 11.

FIG. 14A is a partial cross-sectional view of the flipper apparatus 10 taken along line S1-S1' in FIG. 8. FIG. 14B is a partial cross-sectional view of the flipper apparatus 10 taken along line S2-S2' in FIG. 9. FIG. 14C is a partial cross-sectional view of the flipper apparatus 10 taken along line S3-S3' in FIG. 11.

Referring to FIGS. 12 to 14C, the auxiliary grip part 137 is configured to have an engaged state in which the auxiliary grip part 137 comes into contact with the object M in the −Z-axis direction by moving in a first direction Y1 of the Y-axis direction (see FIG. 14C) and a disengaged state in which the auxiliary grip part 137 is disengaged from the contact state with the object M in the −Z-axis direction by moving in a second direction Y2, which is opposite to the first direction Y1 (see FIGS. 14A and 14B). The auxiliary grip part 137 is configured such that, with reference to the surface 135al of the Y-axis contactor 135a, which is in contact with the object M in the state in which at least one elastic member 135b is elastically compressed, the protruding end 137a of the auxiliary grip part 137 in the engaged state (see FIG. 14C) is positioned on the first direction Y1 side and the protruding end 137a of the auxiliary grip part 137 in the disengaged state (see FIG. 14B) is positioned on the second direction Y2 side.

With reference to the surface 135al of the Y-axis contactor 135a, which is in contact with the object M in the state in which at least one elastic member 135b is elastically compressed, the protruding end 133a of the support grip part 133 is positioned on the first direction Y1 side (see FIGS. 14B and 14C).

Referring to FIGS. 14A to 14C, in the state in which the auxiliary grip part 137 is moved in the first direction Y1 with respect to the support grip part 133, a gap 137g, into which the front portion 135a2 of the Y-axis contactor 135a is inserted, is formed between the auxiliary grip part 137 and the support grip part 133. The auxiliary grip part 137 includes a grip surface 137b configured to be in contact with the object M in the −Z-axis direction in the state in which the auxiliary grip part 137 is moved in the first direction Y1 with respect to the support grip part 133. The auxiliary grip part 137 includes an engagement surface 137c engaged with the front portion 135a2 of the Y-axis contactor 135a in the state in which the auxiliary grip part 137 is moved in the first direction Y1 with respect to the support grip part 133. The auxiliary grip part 137 includes a sliding surface 137d sliding along the surface of the support grip part 133 when the auxiliary grip part 137 is moved in the Y-axis direction with respect to the support grip part 133.

The flipper apparatus 10 may include an auxiliary grip part driver 180 configured to provide a driving force for moving the auxiliary grip part 137 in the Y-axis direction with respect to the Y-axis shaft 131. The auxiliary grip part driver 180 may include a cylinder 181 configured to provide a driving force and a driving force transmission part 182 configured to transmit the driving force of the cylinder 181 to the Y-axis holder 130.

In an embodiment, the driving force transmission part 182 may include a cylinder rod 182a configured to receive the driving force of the cylinder 181 to move in the Y-axis direction. The driving force transmission part 182 may include a connection rod 182b fixed to the cylinder rod 182a to move integrally with the cylinder rod 182a. The driving force transmission part 182 may include a rotation rod 182c connected to the connection rod 182b. The rotation rod 182c is connected to the connection rod 182*b* to move in the Y-axis direction following the Y-axis direction movement of the connection rod 182*b*, and is connected to the connection rod 182*b* to be rotatable about the Y-axis.

Referring to FIGS. 12 to 14C, the auxiliary grip part driver 180 includes the rotation rod 182*c* having one end to which the auxiliary grip part 137 is fixed. The auxiliary grip part 137 may be fixed to the end of the rotation rod 182*c* in the first direction Y1. The rotation rod 182*c* is configured to transmit the driving force of the auxiliary grip part driver 180 to the auxiliary grip part 137. The rotation rod 182*c* is movable in the Y-axis direction with respect to the support grip part 133 together with the auxiliary grip part 137.

The rotation rod 182*c* is configured to be integrally rotatable with the Y-axis shaft 131 and to be movable in the Y-axis direction with respect to the Y-axis shaft 131. The rotation rod 182*c* may be disposed to pass through the Y-axis shaft 131 in the Y-axis direction. A guide hole 182*ch* penetrates the rotation rod 182*c* in a direction perpendicular to the Y-axis. The guide hole 182*ch* extends along the Y-axis direction.

The Y-axis holder 130 may include a rotation pin 132 fixed to the Y-axis shaft 131. The rotation pin 132 is inserted into the guide hole 182*ch*. The rotation pin 132 is configured to move relatively in the Y-axis direction along the guide hole 182*ch*. When the state of FIGS. 14A and 14B is changed to the state of FIG. 14C, when the rotation rod 182*c* moves in the first direction with respect to the Y-axis shaft 131, the rotation pin 132 moves relatively in the second direction Y2 along the guide hole 182*ch*. Meanwhile, when the Y-axis shaft 131 rotates about the Y-axis, the Y-axis shaft 131 and the rotation rod 182*c* may be integrally rotated by the rotation pin 132.

Referring to FIG. 14A, the bottom surface of the object M is supported by the transfer belts 210 of the transfer unit 200. Referring to FIG. 14B, the body frame 120 moves in the first direction (see arrow Dy1), and the support surfaces 133*b* of the support grip parts 133 support the bottom surface of the object M. Referring to FIG. 14C, the rotation rod 182*c* moves in the first direction Y1 with respect to the Y-axis shafts 131 by the driving force of the auxiliary grip part driver 180 (see arrow Dc), and the grip surfaces 137*b* of the auxiliary grip parts 137 come into contact with the top surface of the object M.

Figure 15A:
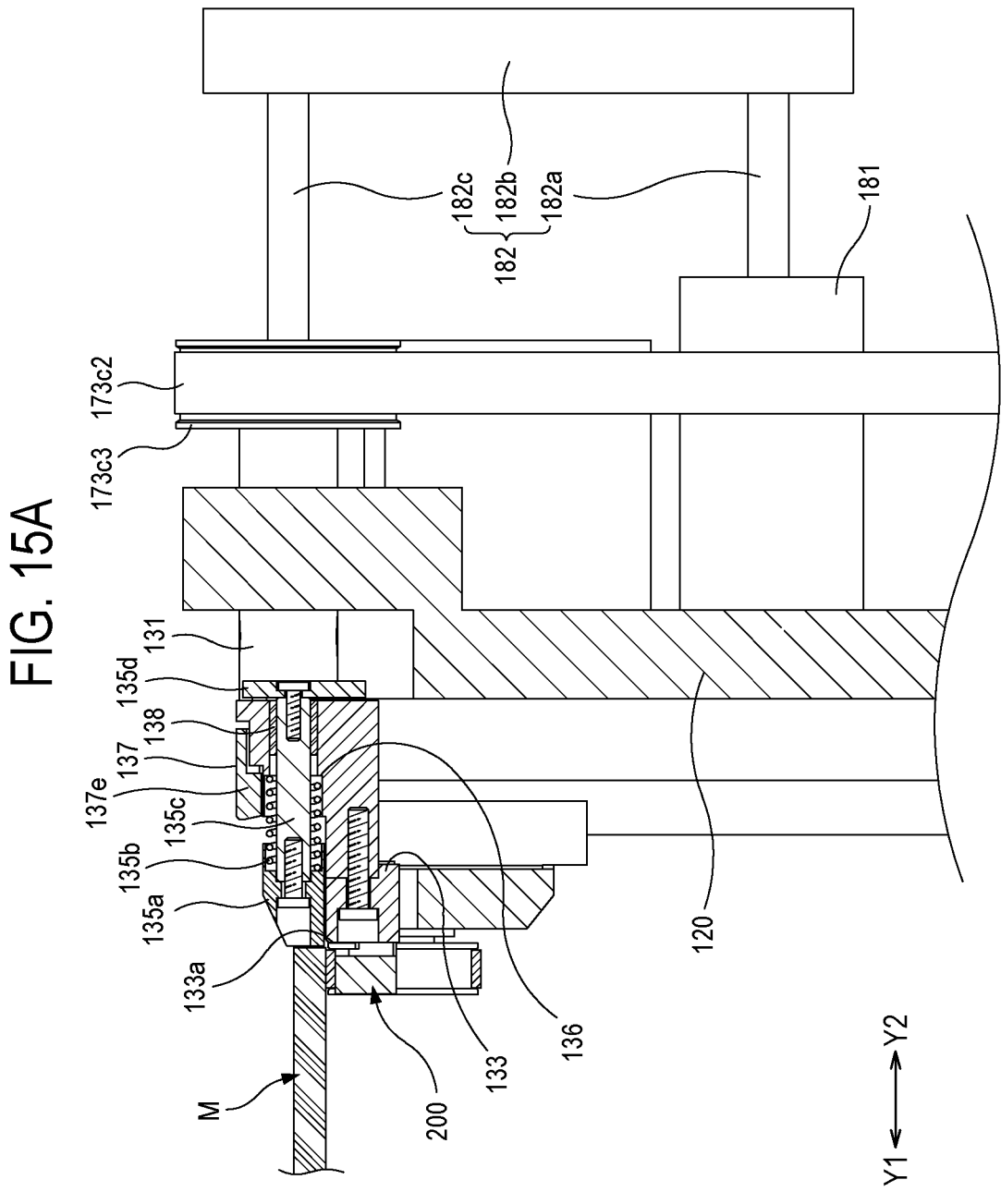
FIG. 15A is a partial cross-sectional view of the flipper apparatus 10 taken along line S4-S4' in FIG. 8.
Figure 15B:
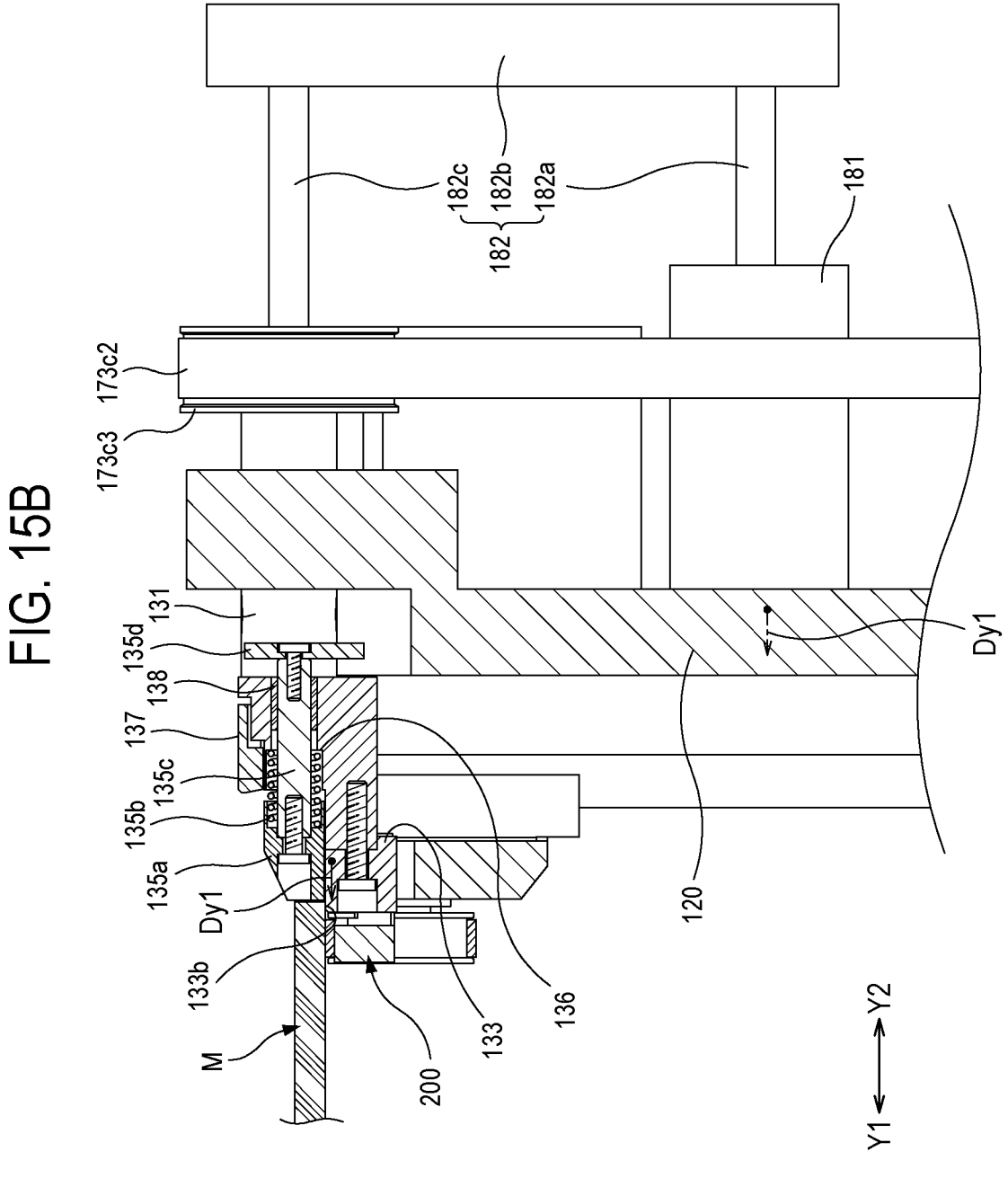
FIG. 15B is a partial cross-sectional view of the flipper apparatus 10 taken along line S5-S5' in FIG. 9.

FIG. 15A is a partial cross-sectional view of the flipper apparatus 10 taken along line S4-S4' in FIG. 8. FIG. 15B is a partial cross-sectional view of the flipper apparatus 10 taken along line S5-S5' in FIG. 9.

Referring to FIGS. 15A and 15B, the auxiliary grip part 137 may include a cover part 137*e* configured to cover at least a portion of the elastic member 135*b*. The cover part 137*e* may cover the elastic member support part 136. The auxiliary grip part 137 may include a sleeve 138 disposed between the guide part 135*c* and the support grip part 133. The guide part 135*c* may slide the sleeve 138 in the Y-axis direction.

Referring to FIG. 15A, the state, in which the object M is in contact with the Y-axis contactor 135*a* but the Y-axis contactor 135*a* is not compressed in the Y-axis direction by the object, is illustrated. Here, the limiter 135*d* is engaged with the support grip part 133, and the Y-axis contactor 135*a* is in the state of being moved to the maximum in the first direction Y1 with respect to the support grip part 133.

Referring to FIG. 15B, the body frame 120 moves in the first direction (see arrow Dy1), the elastic grip part 135 is pressed by the object M in the second direction Y2, and the elastic member 135*b* is compressed. Here, the limiter 135*d* is spaced apart from the support grip part 133 in the second direction Y2.

Figure 16:
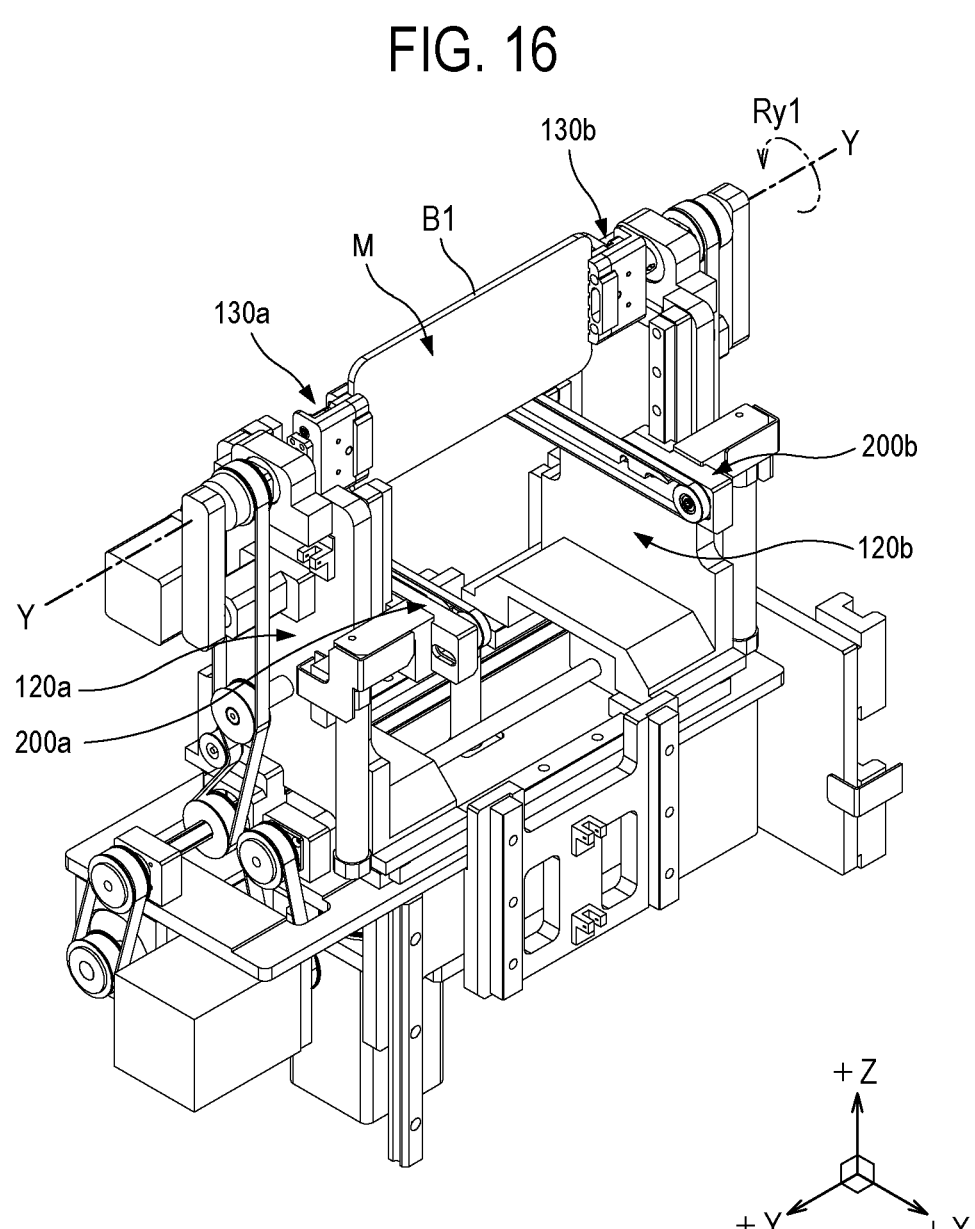
FIGS. 16 to 18 are perspective views sequentially illustrating a process of operating the flipper apparatus 10 according to an embodiment after the state of FIG. 11, in which, for convenience of description, the X-axis flipper unit 300 and the Z-axis elevation unit 500 are omitted in some drawings.
Figure 17A:
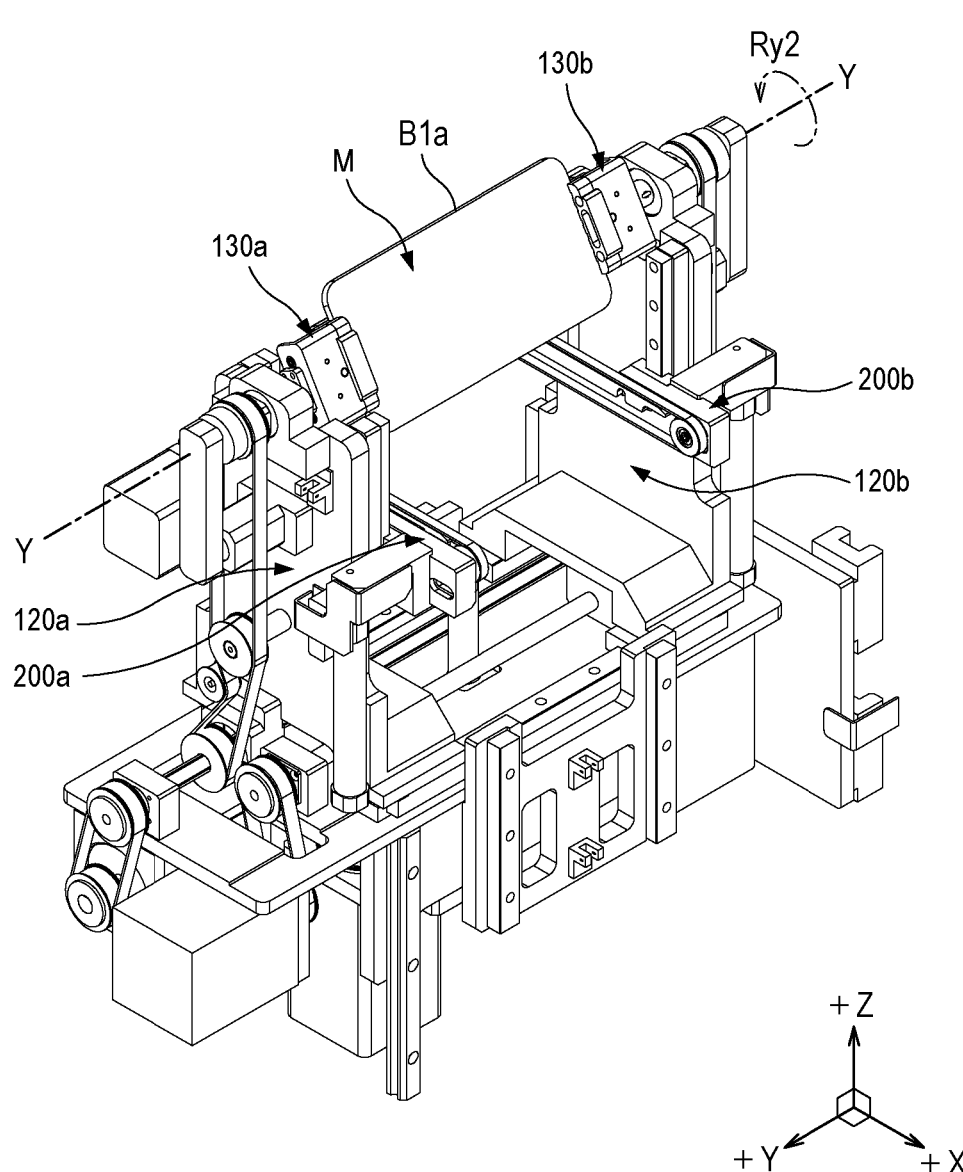
Figure 17B:
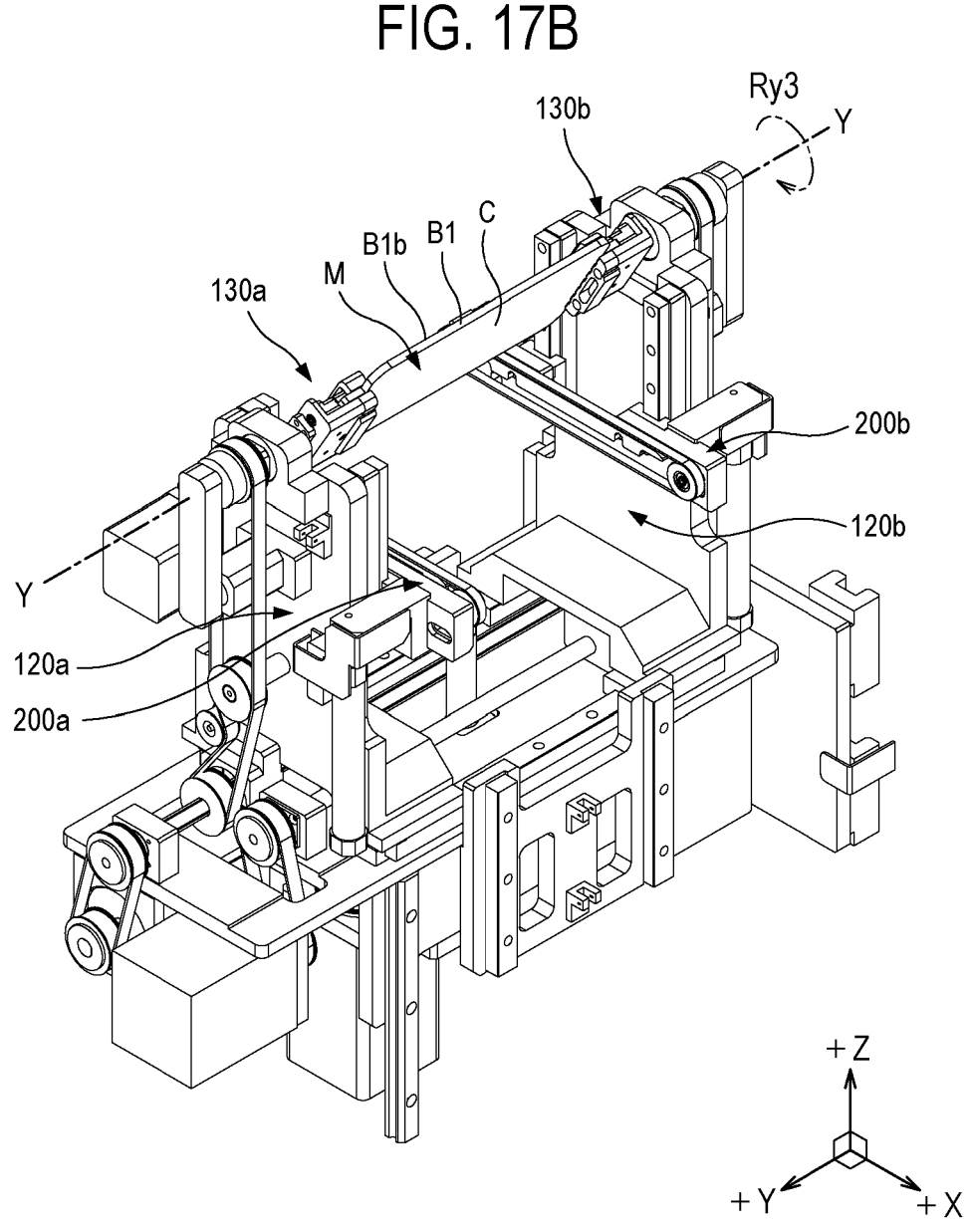
Figure 18:
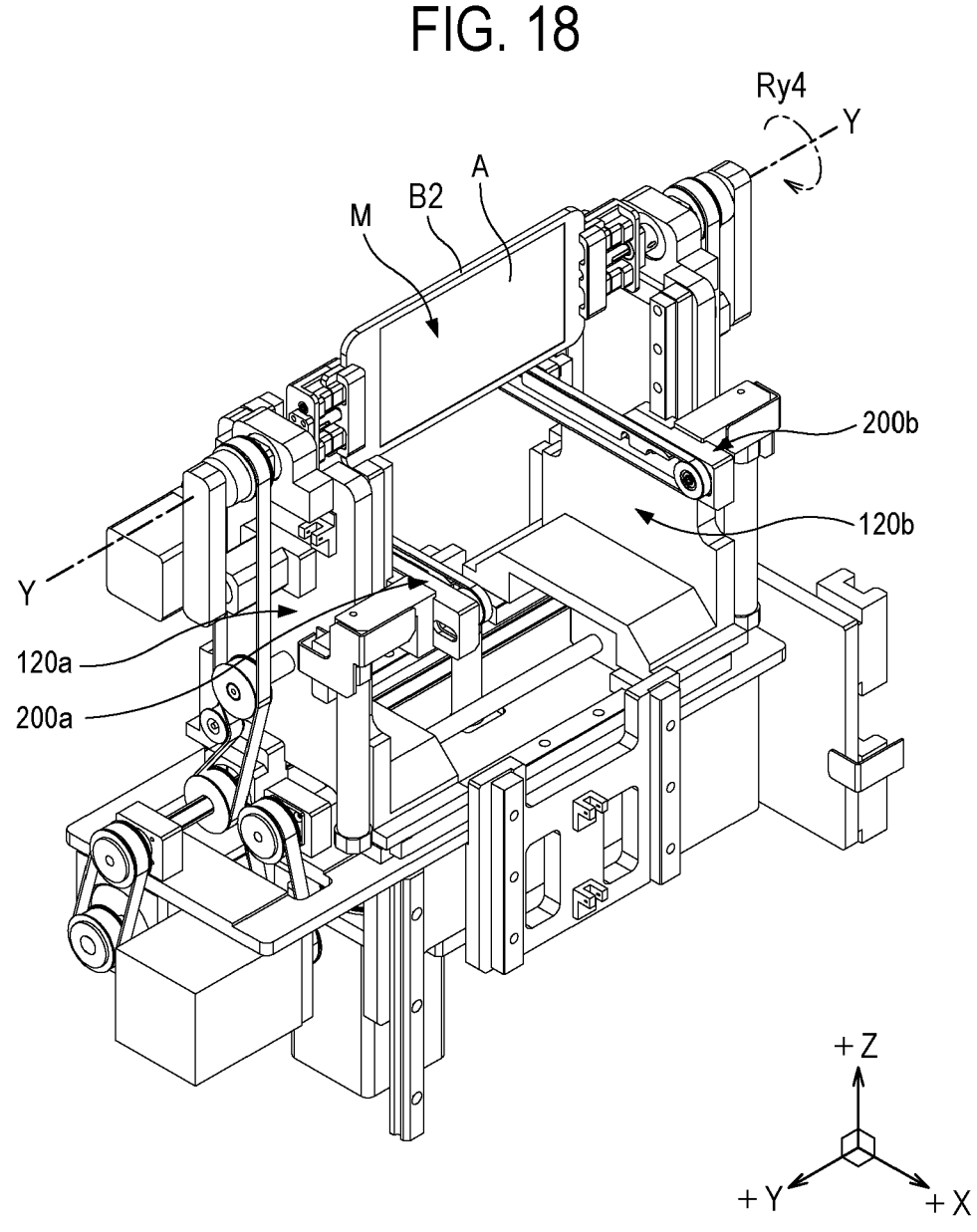

FIGS. 16 to 18 are perspective views sequentially illustrating a process of operating the flipper apparatus 10 according to an embodiment after the state of FIG. 11, in which, for convenience of description, the X-axis flipper unit 300 and the Z-axis elevation unit 500 are omitted in some drawings.

Referring to FIG. 16, by rotating the object M in any one rotation direction Ry1 about the Y-axis in the state in which the Y-axis holders 130 hold the object M, an object surface B1 perpendicular to the object surface A faces the +Z-axis direction. Here, the object surface B1 is inspected by the camera device.

Referring to FIGS. 17A and 17B, the Y-axis holders 130 rotate the object M by an angle of less than 90 degrees about the Y-axis, and object surfaces B1*a* and B1*b*, which are inclined by an angle of less than 90 degrees with respect to the object surface B1, can also be inspected. When the corners of the object M are rounded, this inspection method becomes very useful. For example, referring to FIG. 17A, the object surface B1*a* is inspected by rotating the Y-axis holders 130 in any one rotation direction Ry2, and referring to FIG. 17B, the object surface B1*b* may be inspected by rotating the Y-axis holders 130 in the opposite rotation direction Ry3.

Referring to FIG. 18, when the Y-axis holders 130 rotate the object M in any one rotation direction Ry4 about the Y-axis, the object surface B2, which is opposite to the object surface B1, faces the +Z-axis direction. Here, the object surface B2 is inspected by the camera device.

Figure 19A:
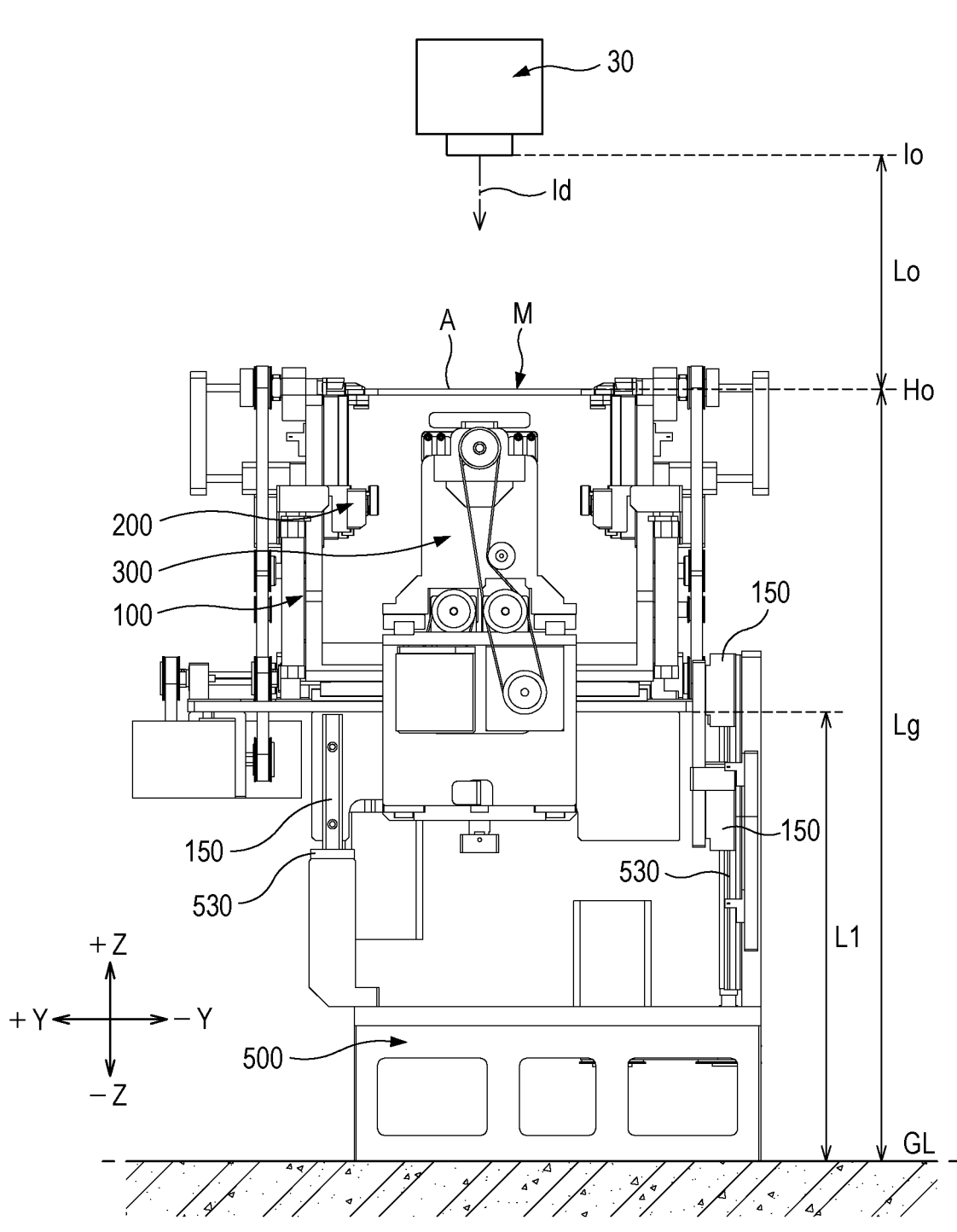
FIG. 19A is an elevation view illustrating the flipper apparatus 10 in the state of FIG. 10 when viewed in the X-axis direction.
Figure 19B:
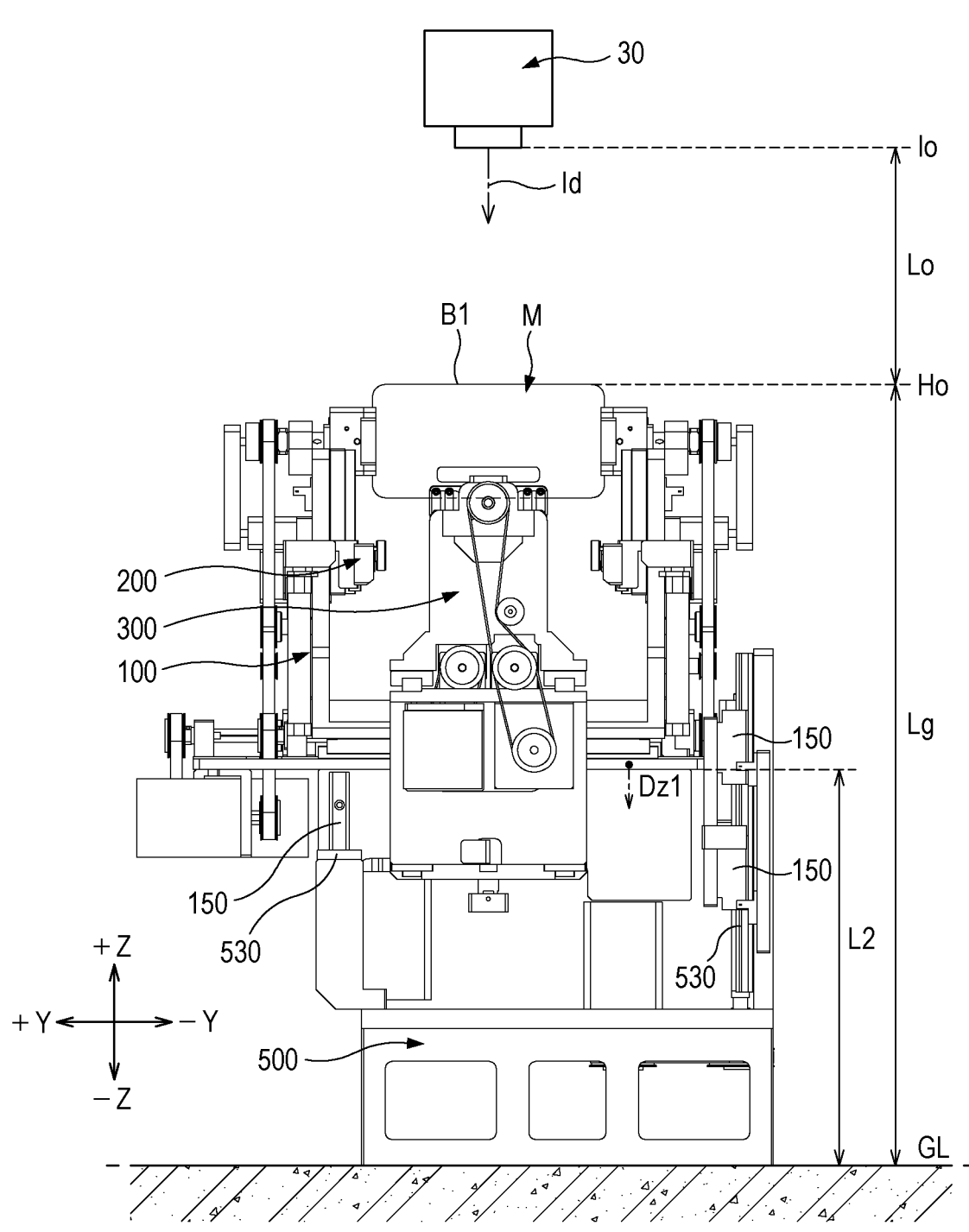
FIG. 19B is an elevation view illustrating the flipper apparatus 10 in the state of FIG. 16 when viewed in the X-axis direction.
Figure 19C:
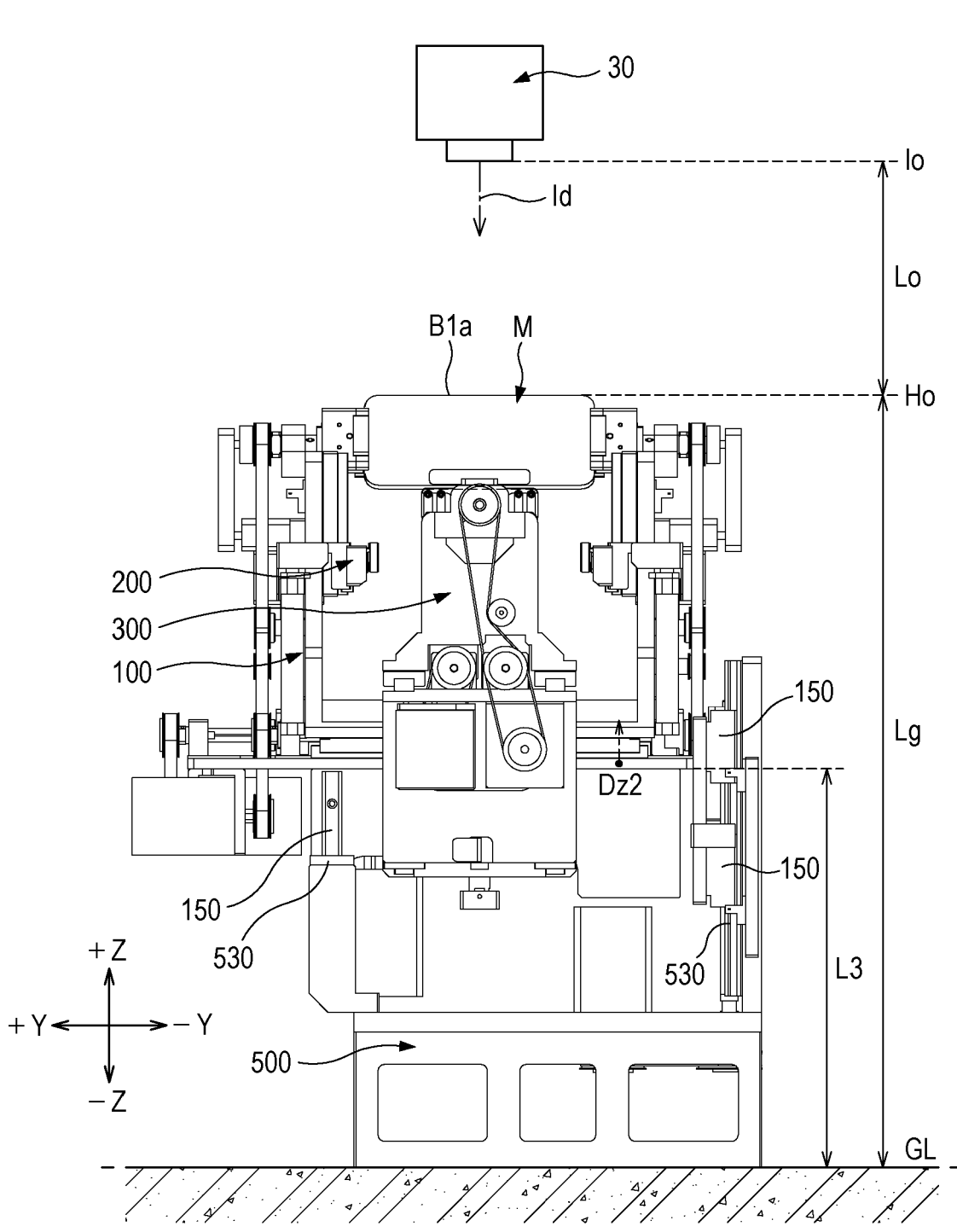
FIG. 19C is an elevation view illustrating the flipper apparatus 10 in the state of FIG. 17A when viewed in the X-axis direction.

FIG. 19A is an elevation view illustrating the flipper apparatus 10 in the state of FIG. 10 when viewed in the X-axis direction. FIG. 19B is an elevation view illustrating the flipper apparatus 10 in the state of FIG. 16 when viewed in the X-axis direction. FIG. 19C is an elevation view illustrating the flipper apparatus 10 in the state of FIG. 17A when viewed in the X-axis direction.

Referring to FIGS. 19A to 19C, the camera device 30 is disposed on a horizontal plane Io separated by a predetermined distance (Lo+Lg) in the Z-axis direction from the ground surface GL, and the inspection direction Id of the camera device 30 becomes the −Z-axis direction. The camera device 30 may inspect the object surface of the object M while moving in the X-axis direction and the Y-axis direction.

The camera device 30 maintains a predetermined distance Lo from the object surface of the object M facing the +Z-axis direction. To this end, the distance between the object surface and the ground surface GL may be maintained at a predetermined distance Lg. The Z-axis elevation unit 500 moves the Y-axis flipper unit 100 in the Z-axis direction so as to maintain the distance Lg constant.

Referring to FIG. 19A, the distance L1 between a reference point of the Y-axis flipper unit 100 and the ground surface GL during inspection of the object surface A is illustrated.

Referring to FIG. 19B, since the position of the object surface B1 relative to the Y-axis flipper unit 100 becomes higher than that of the object surface B1 relative to the Y-axis flipper unit 100, the Z-axis elevation unit 500 may move the Y-axis flipper unit 100 downward by a predetermined distance (see arrow Dz1). Here, the distance L2 between the Y-axis flipper unit 100 and the ground surface GL becomes shorter than the distance L1.

Referring to FIG. 19C, since the position of the object surface B1*a* relative to the Y-axis flipper unit 100 becomes lower than that of the object surface B1 relative to the Y-axis flipper unit 100, the Z-axis elevation unit 500 may move the Y-axis flipper unit 100 upward by a predetermined distance (see arrow Dz2). Here, the distance L3 between the Y-axis flipper unit 100 and the ground surface GL becomes longer than the distance L2, but becomes shorter than the distance L1.

FIGS. 20 to 24 are perspective views sequentially illustrating a process of operating the flipper apparatus 10 according to an embodiment after the state of FIG. 18, in which, for convenience of description, the Y-axis flipper unit 100 and the Z-axis elevation unit 500 are omitted in some drawings.

Figure 20:
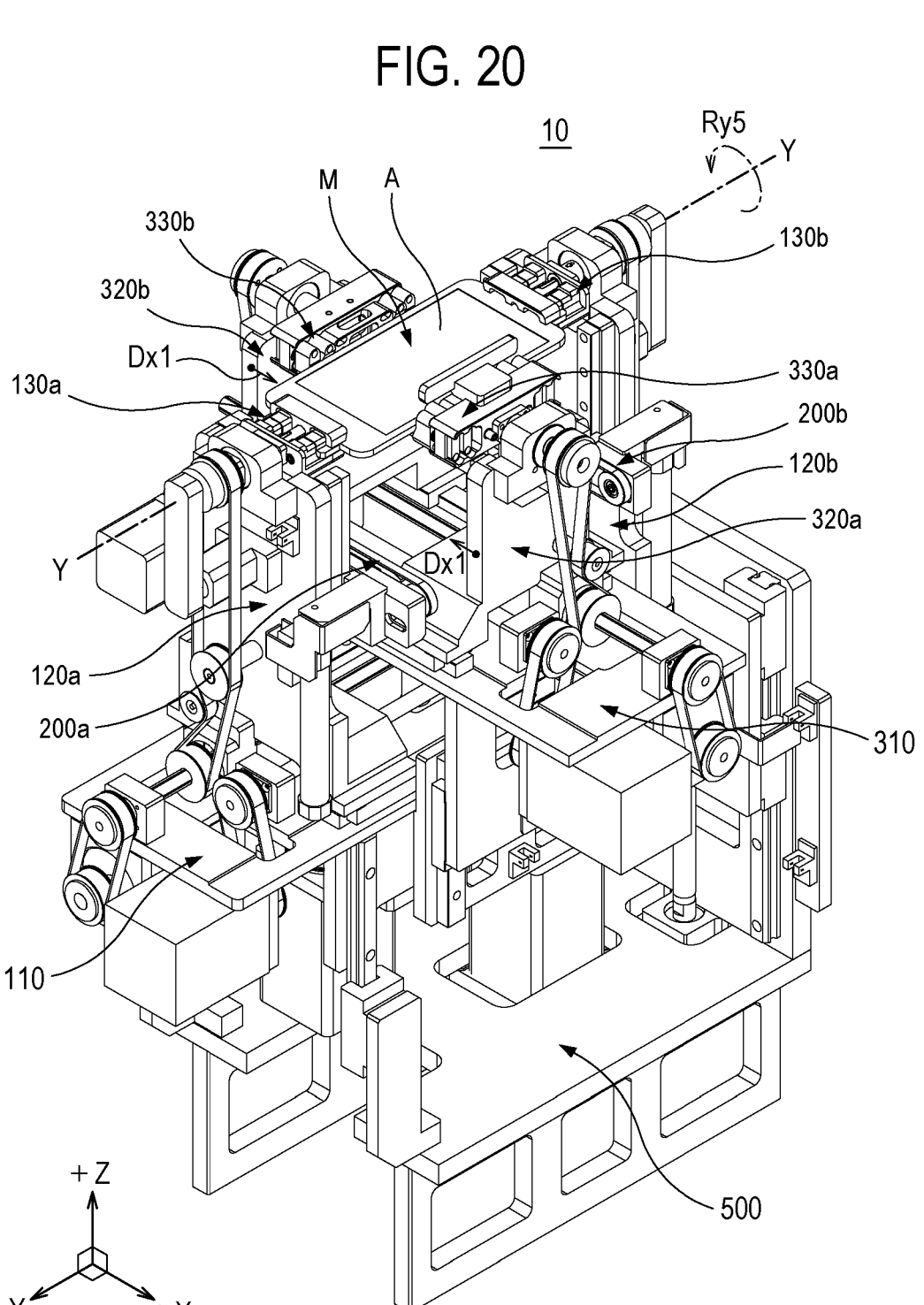
FIGS. 20 to 24 are perspective views sequentially illustrating a process of operating the flipper apparatus 10 according to an embodiment after the state of FIG. 18, in which, for convenience of description, the Y-axis flipper unit 100 and the Z-axis elevation unit 500 are omitted in some drawings.

Referring to FIG. 20, the Y-axis holders 130 rotate the object M (see arrow Ry5), and dispose the object such that the object surface A faces the +Z-axis direction. The pair of side frames 320*a* and 320*b* remain in the state in which the space therebetween is widened in the X-axis direction before that time, and then the space therebetween is narrowed in the X-axis direction such that the pair of X-axis holders 330*a* and 330*b* hold the object M (see arrows Dx1).

Figure 21:
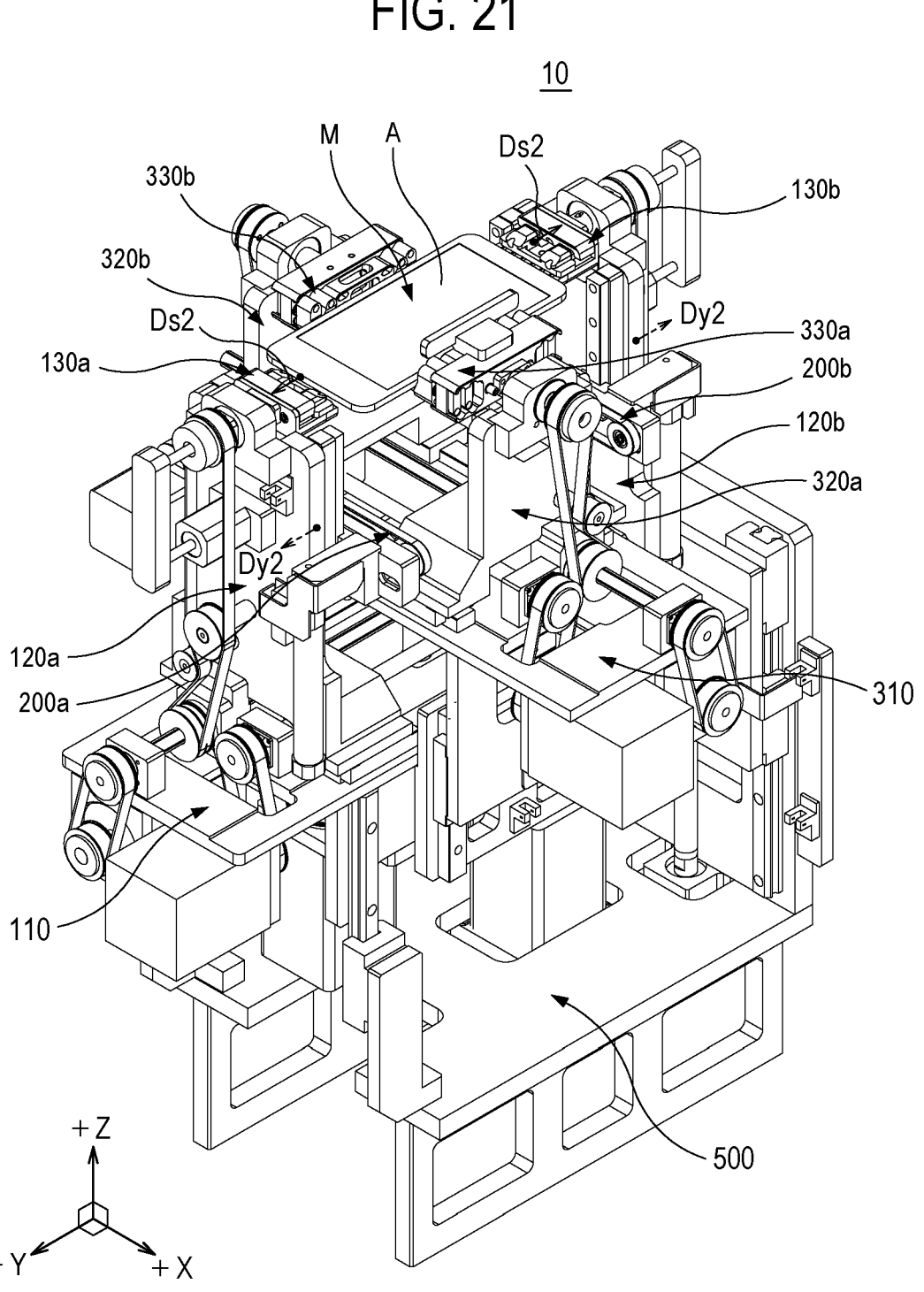

Referring to FIG. 21, the auxiliary grip parts 137 move in the second direction with respect to the support grip parts 133 so as to be in the disengaged state (see arrow Ds2), and the space between the pair of body frames 120*a* and 120*b* is widened so as to cause the pair of Y-axis holders 130*a* and 130*b* to be spaced apart from the object M (see arrows Dy2). Through this, when the X-axis holders 330 rotate the object M, there is no interference with the Y-axis holders 130.

Figure 22:
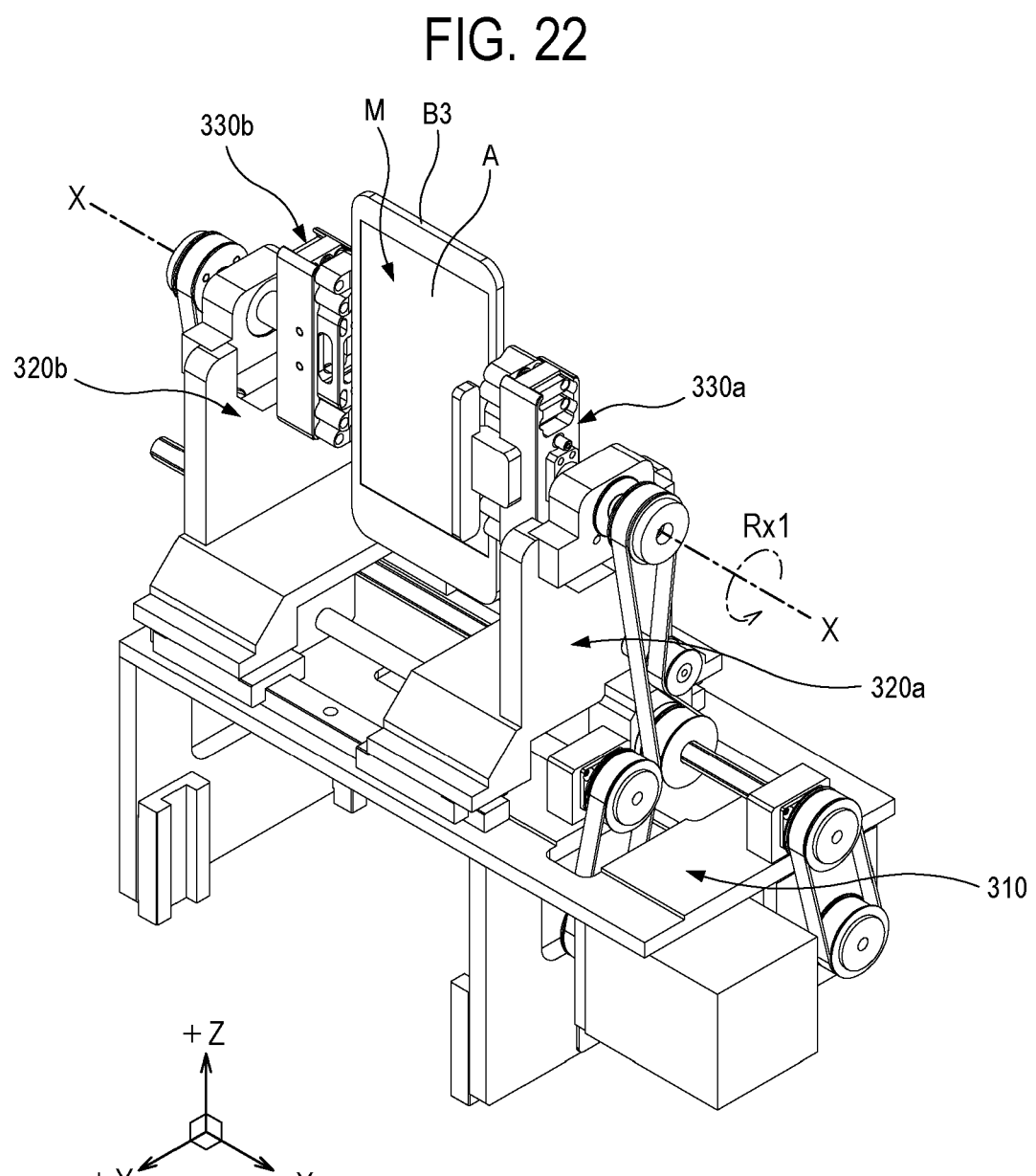

Referring to FIG. 22, by rotating the object M in any one rotation direction Rx1 about the X-axis in the state in which the X-axis holders 330 hold the object M, an object surface B3 perpendicular to the object surface A faces the +Z-axis direction. Here, the object surface B3 is inspected by the camera device.

Figure 23A:
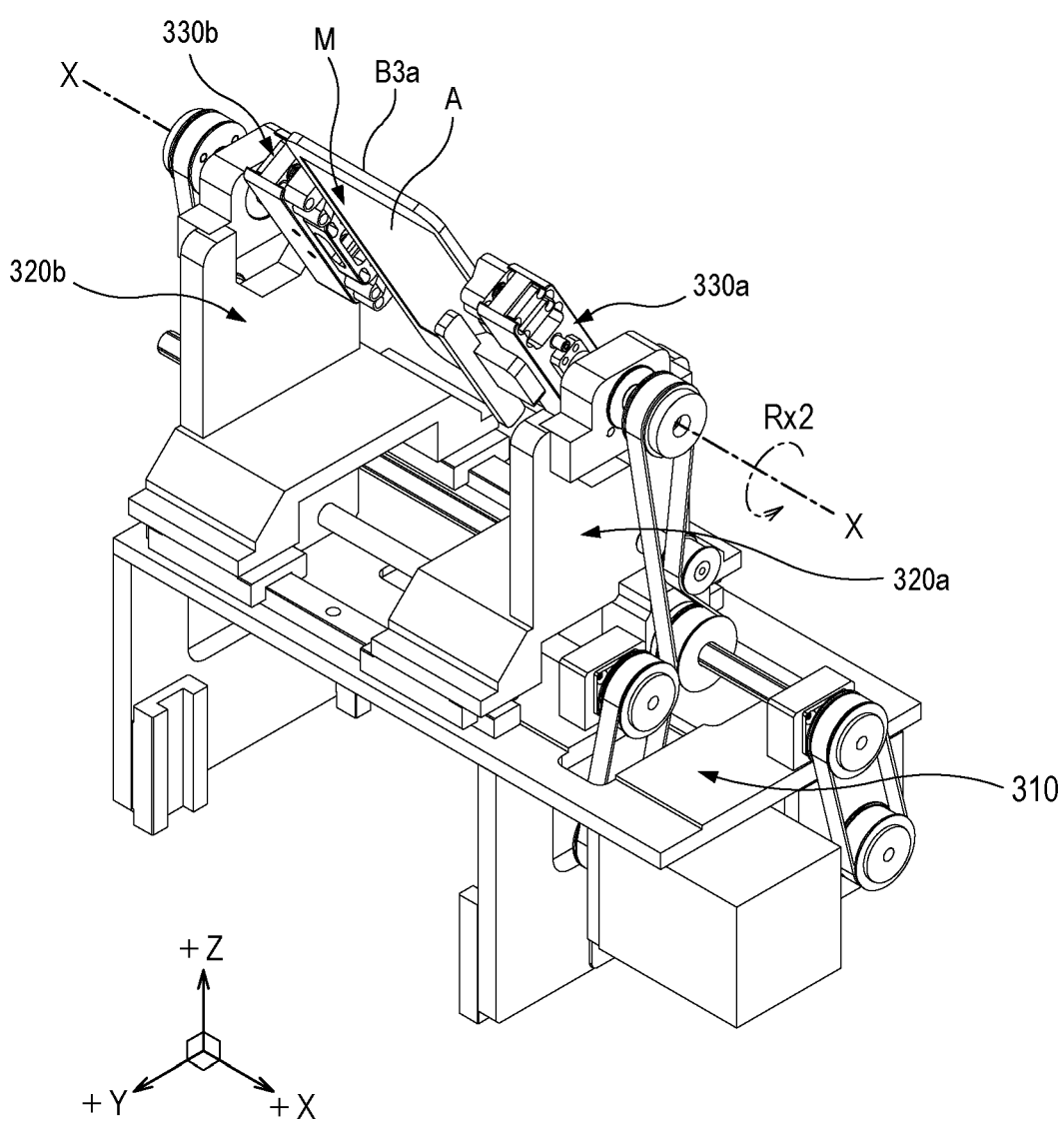
Figure 23B:
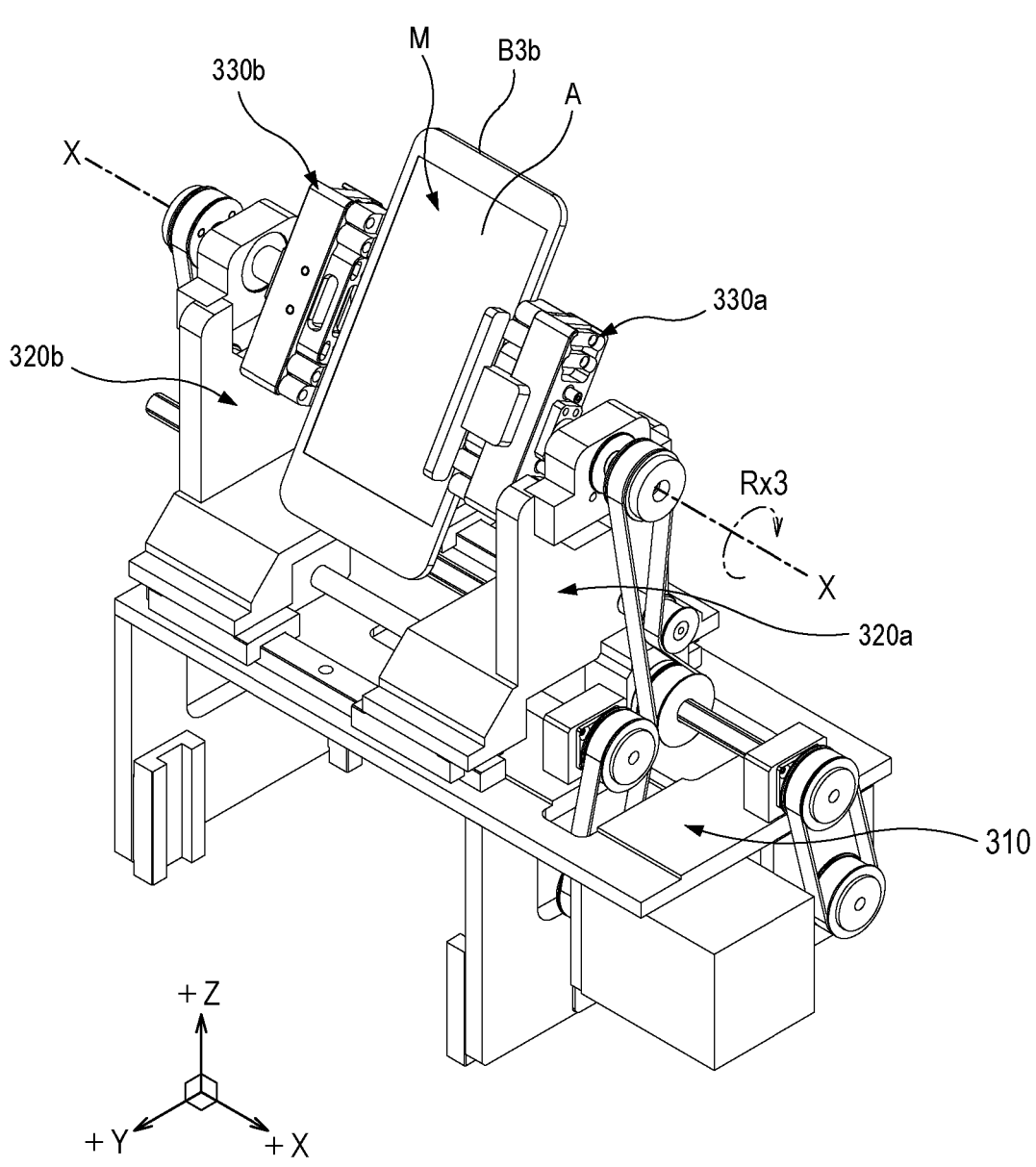

Referring to FIGS. 23A and 23B, the X-axis holders 330 rotate the object M by an angle of less than 90 degrees about the X-axis, and object surfaces B3*a* and B3*b*, which are inclined by an angle of less than 90 degrees with respect to the object surface B3, can also be inspected. When the corners of the object M are rounded, this inspection method becomes very useful. For example, referring to FIG. 23A, the object surface B3*a* is inspected by rotating the X-axis holders 330 in any one rotation direction Rx2, and referring to FIG. 23B, the object surface B3*b* may be inspected by rotating the X-axis holders 330 in the opposite rotation direction Rx3.

Figure 24:
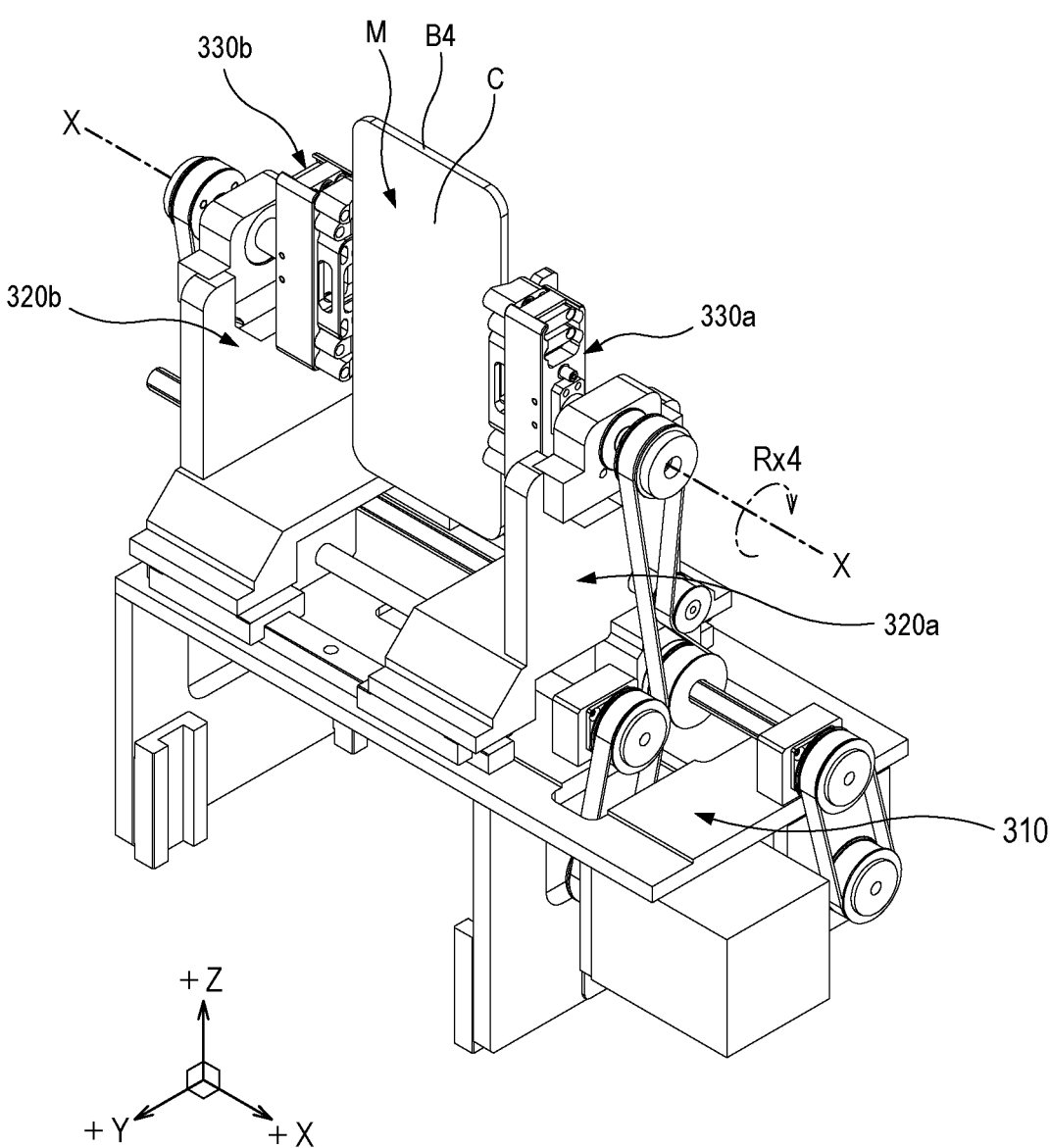

Referring to FIG. 24, when the X-axis holders 330 rotate the object M in any one rotation direction Rx4 about the X-axis, the object surface B4, which is opposite to the object surface B3, faces the +Z-axis direction. Here, the object surface B4 is inspected by the camera device.

Figure 25A:
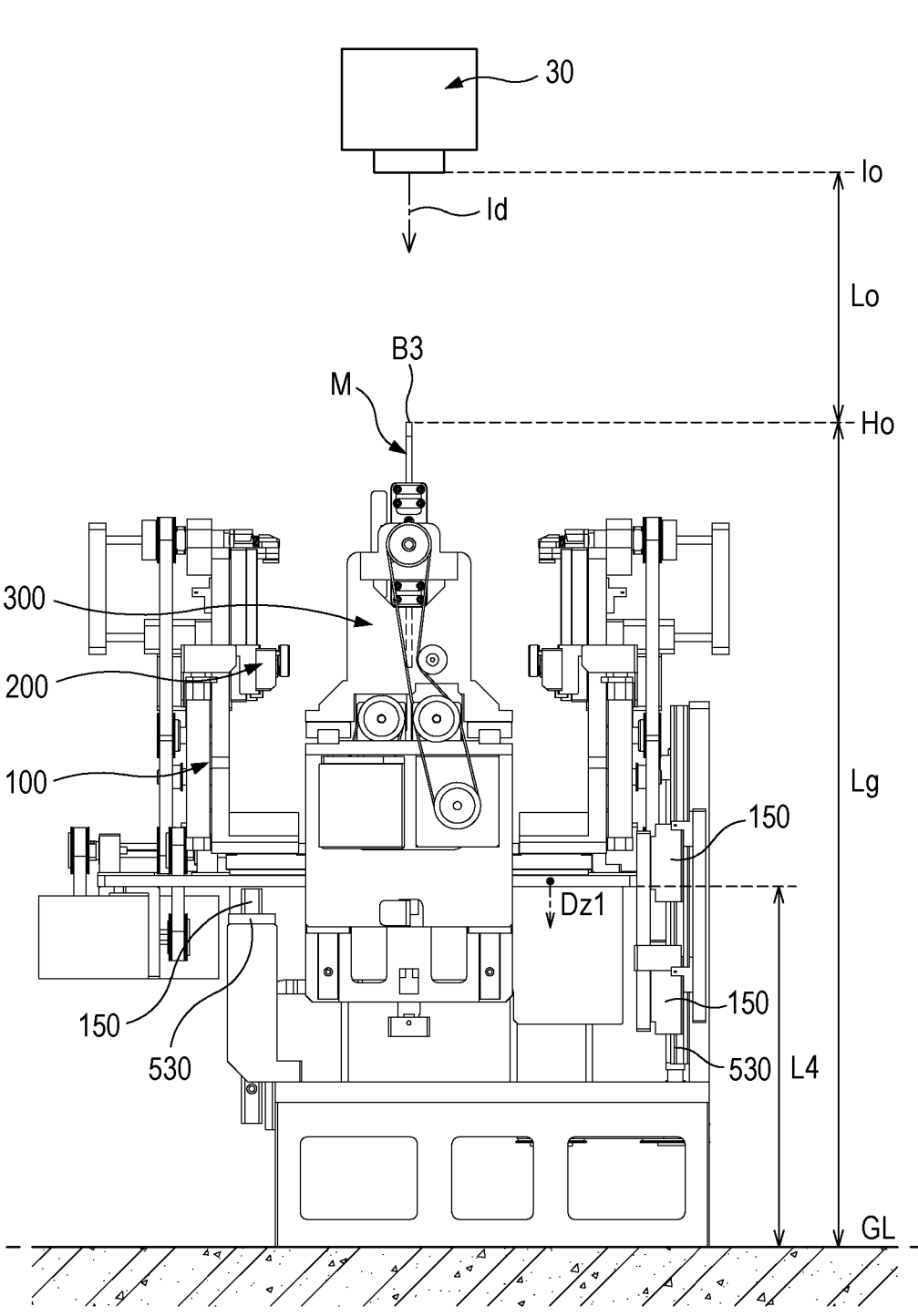
FIG. 25A is an elevation view illustrating the flipper apparatus 10 in the state of FIG. 22 when viewed in the X-axis direction.
Figure 25B:
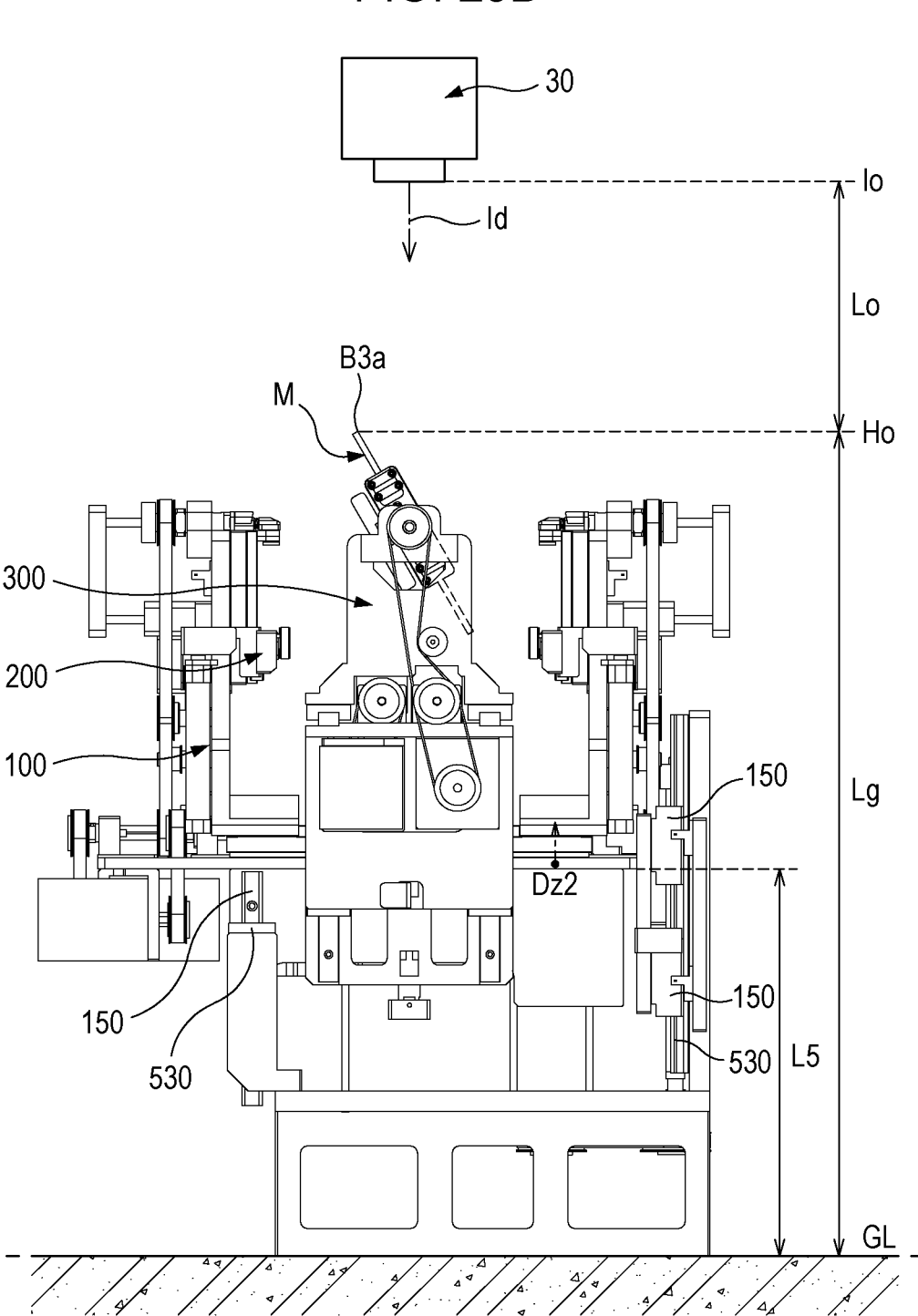
FIG. 25B is an elevation view illustrating the flipper apparatus 10 in the state of FIG. 23A when viewed in the X-axis direction.

FIG. 25A is an elevation view illustrating the flipper apparatus 10 in the state of FIG. 22 when viewed in the X-axis direction. FIG. 25B is an elevation view illustrating the flipper apparatus 10 in the state of FIG. 23A when viewed in the X-axis direction.

Referring to FIGS. 25A and 25B, the camera device 30 maintains a predetermined distance Lo from the object surface of the object M facing the +Z-axis direction. To this end, the distance between the object surface and the ground surface GL may be maintained at a predetermined distance Lg. The Z-axis elevation unit 500 moves the X-axis flipper unit 300 in the Z-axis direction so as to maintain the distance Lg constant. In this embodiment, the Z-axis elevation unit

500 integrally moves the Y-axis flipper unit 100 and the X-axis flipper unit 300 in the Z-axis direction so as to maintain the distance Lg constant.

Referring to FIG. 25A, since the position of the object surface B3 relative to the X-axis flipper unit 300 becomes higher than that of the object surface B3 relative to the X-axis flipper unit 300, the Z-axis elevation unit 500 may move the X-axis flipper unit 300 downward by a predetermined distance (see arrow Dz1).

The distance L4 of FIG. 25A is indicated as the distance between a reference point of the Y-axis flipper unit 100 and the ground surface GL. The distance between the reference point of the Y-axis flipper unit 100 and the Y-axis in FIG. 19A may be equal to the distance between the reference point of the Y-axis flipper unit 100 and the X-axis in FIG. 25A. In this case, the distance L4 becomes shorter than the distance L1.

Referring to FIG. 25B, since the position of the object surface B3*a* relative to the Y-axis flipper unit 100 becomes lower than that of the object surface B3*a* relative to the X-axis flipper unit 300, the Z-axis elevation unit 500 may move the X-axis flipper unit 300 upward by a predetermined distance (see arrow Dz2). Here, the distance L5 becomes longer than the distance L4, but becomes shorter than the distance L1.

FIGS. 26 to 29 are perspective views sequentially illustrating a process of operating the flipper apparatus 10 according to an embodiment after the state of FIG. 24.

Figure 26:
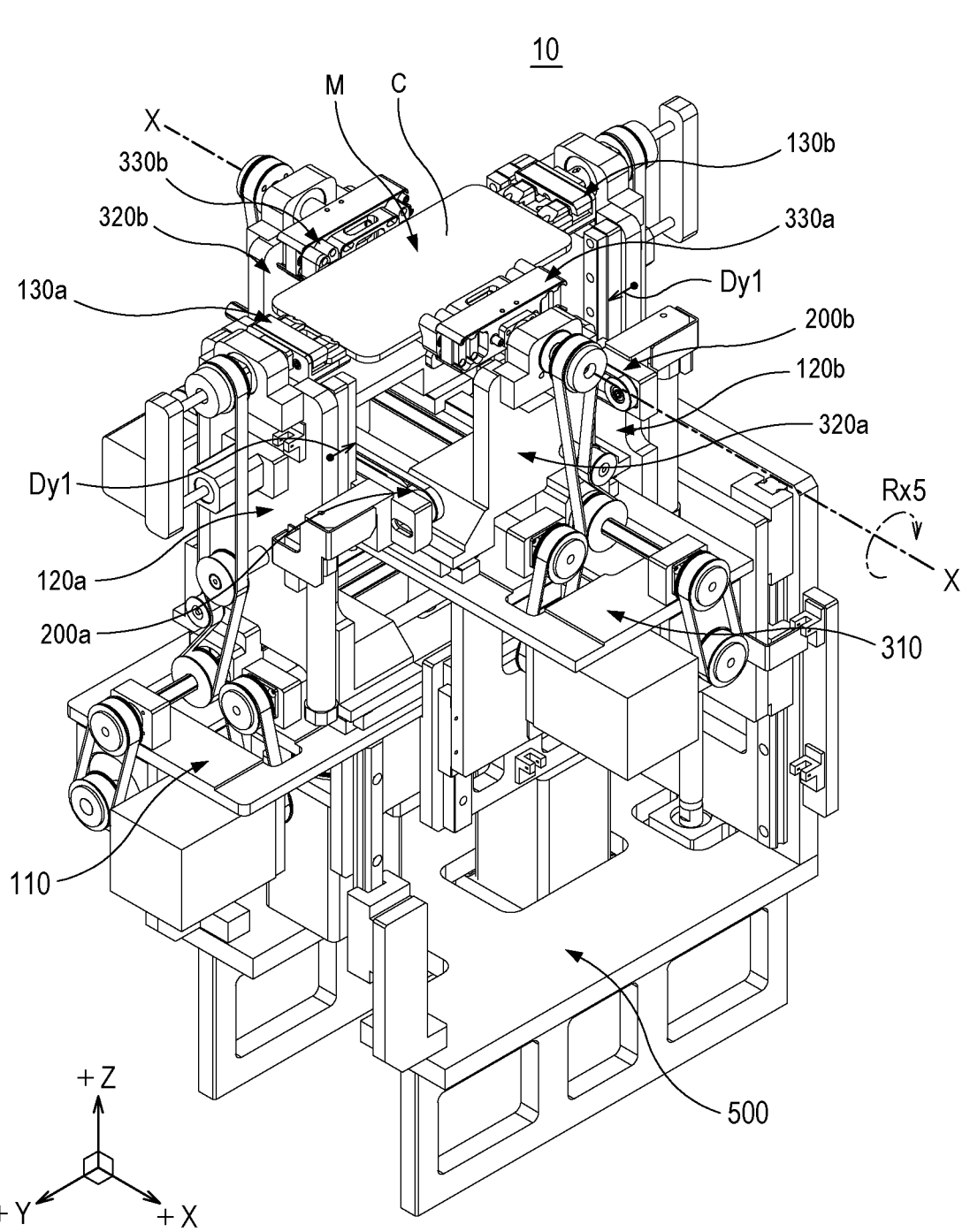

Referring to FIG. 26, the X-axis holders 330 rotate the object M (see arrow Rx5), and dispose the object such that the object surface C, which is opposite to the object surface A, faces the +Z-axis direction. The space between the pair of side frames 320*a* and 320*b* is narrowed in the Y-axis direction, and thus the pair of Y-axis holders 130*a* and 130*b* hold the object M (see arrows Dy1).

Figure 27:
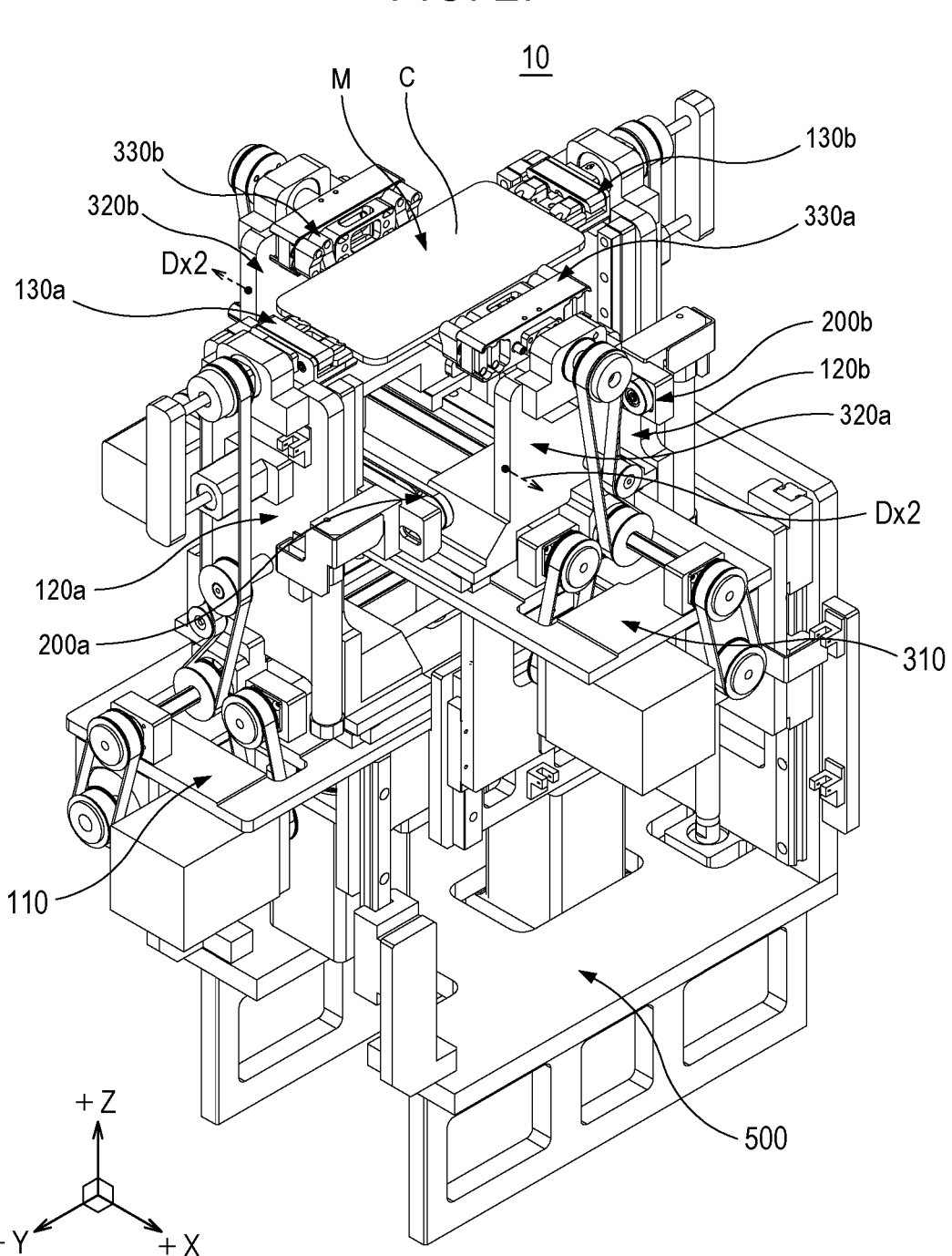

Referring to FIG. 27, the pair of side frames 320*a* and 320*b* are spaced apart from each other, and thus the pair of X-axis holders 330*a* and 330*b* are spaced apart from the object M (see arrows Dx2). Here, the object surface C, which is opposite to the object surface A, may be inspected.

Figure 28:
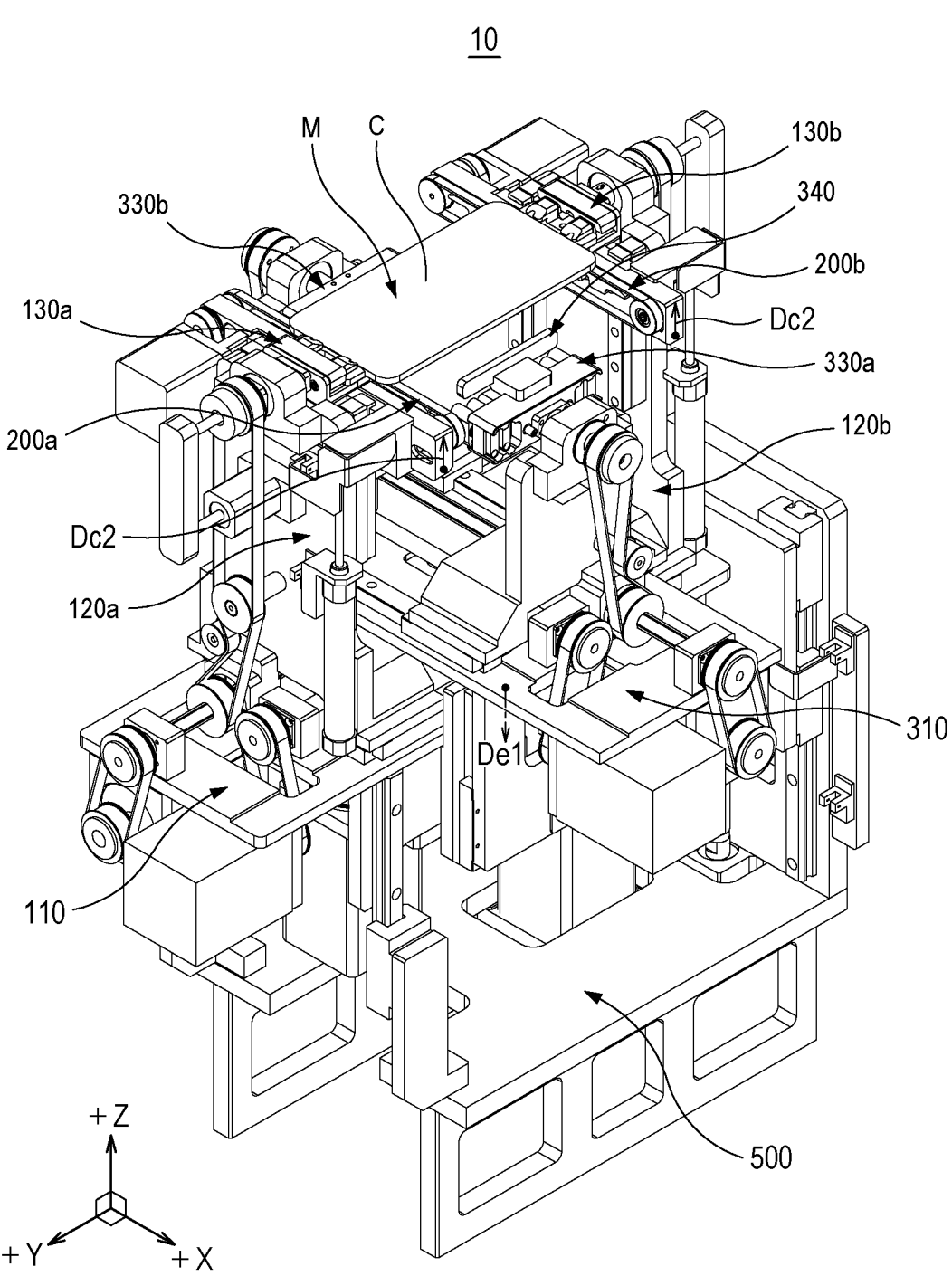

Referring to FIG. 28, the X-axis flipper unit 300 moves a predetermined distance in the −Z-axis direction with respect to the Y-axis flipper unit 100 (see arrow Del). Here, the X-axis flipper unit 300 is sufficiently lowered with respect to the Y-axis flipper unit 100, and thus the transfer stopper 340 is also disposed below the proceeding path of the object. In addition, the transfer unit 200 moves a predetermined distance in the +Z-axis direction with respect to the Y-axis flipper unit 100 (see arrows Dc2). Here, the transfer belts 210 of the transfer unit 200 support the bottom surface of the object M.

Figure 29:
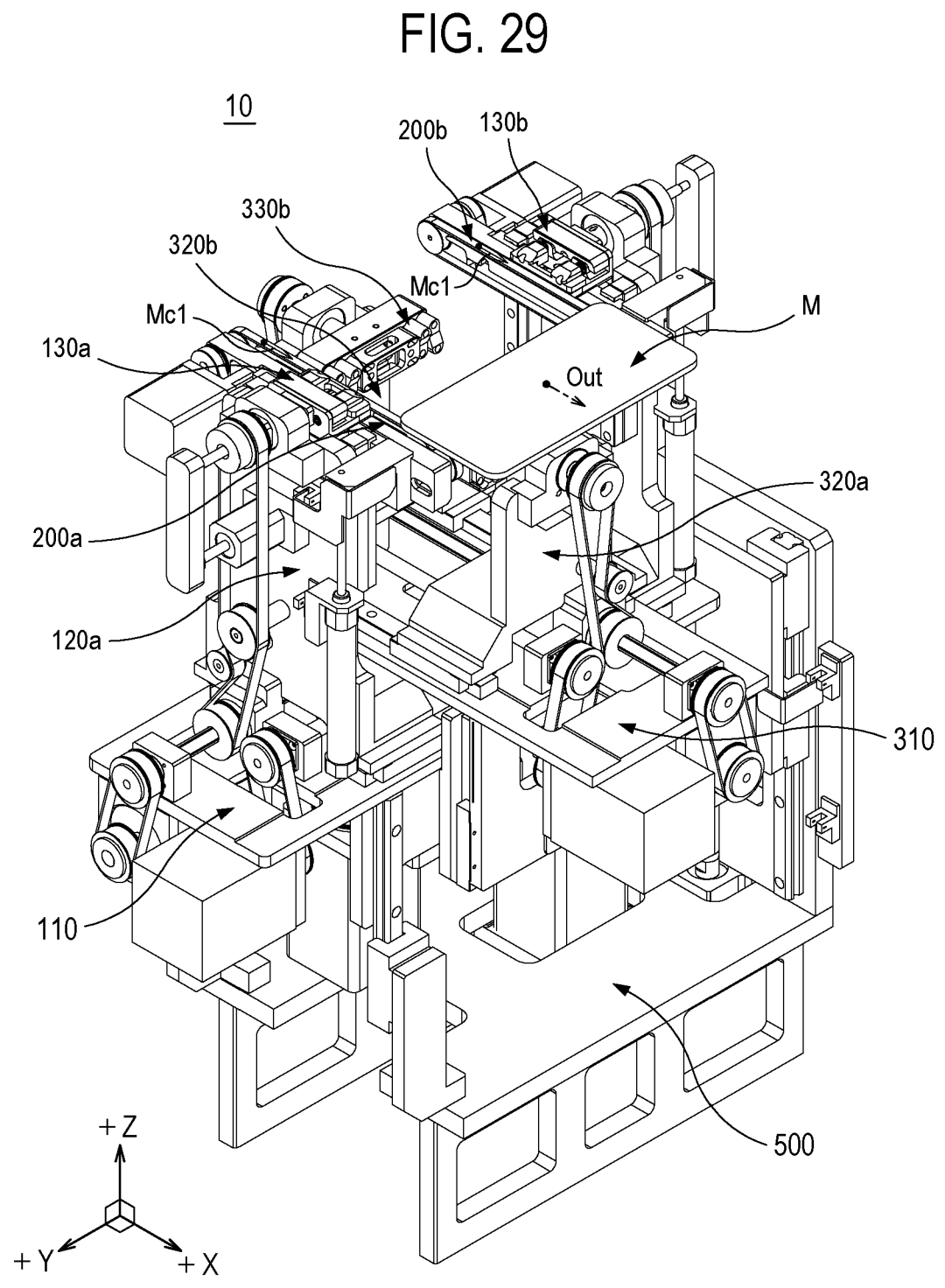

Referring to FIG. 29, the pair of body frames 120*a* and 120*b* are spaced apart from each other in the Y-axis direction, and thus only the transfer unit 200 supports the object M. Here, the top surfaces of the transfer belts 210 of the pair of transfer parts 200*a* and 200*b* move in the +X-axis direction (see arrows Mc1). Accordingly, the object M is discharged from the flipper apparatus 10 by the transfer unit 200 (see arrow Out).

Figure 30:
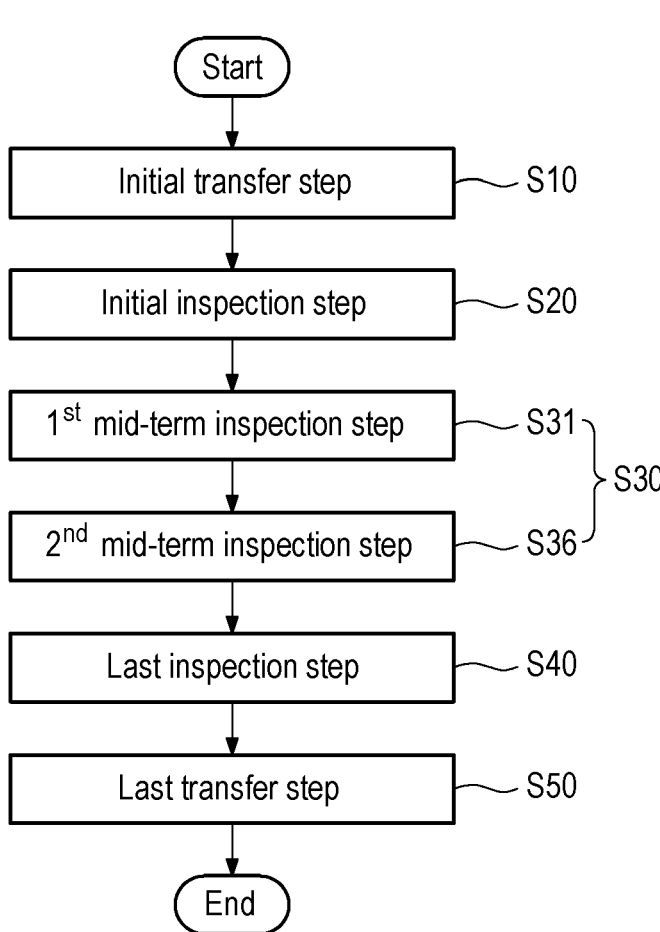
FIG. 30 is a flowchart of an object inspection method using a flipper apparatus according to an embodiment of the present disclosure.

FIG. 30 is a flowchart of an object inspection method using a flipper apparatus according to an embodiment of the present disclosure. Although process steps, method steps, algorithms, and the like are illustrated in sequential order in a flowchart of FIG. 30, such processes, methods, and algorithms may be configured to operate in any suitable order. In other words, the steps of the processes, methods and algorithms described in various embodiments of the present disclosure need not be performed in the order described in this disclosure. In addition, although some steps are described as being performed asynchronously, in other embodiments, these steps may be performed simultaneously. In addition, illustration of a process in a drawing does not imply that the illustrated process excludes other changes and modifications thereto, that the illustrated process or any of steps thereof are essential to one or more of the various embodiments of the present disclosure, or that the illustrated process is desirable.

The object inspection method uses the flipper apparatus 10 configured to hold and rotate an object M on XYZ orthogonal coordinates, and the camera device configured to inspect an object surface of the object facing the +Z-axis direction.

The inspection method includes, before an initial inspection step S20, an initial transfer step S10 in which the object M is transferred in the X-axis direction by the transfer unit 200 of the flipper apparatus 10 (see FIGS. 7 and 8). In the initial transfer step S10, the object M is transferred in the X-axis direction such that the object M is placed at a correct position. Here, the correct position may be a position at which the Y-axis holders 130 are capable of holding the object M in the Y-axis direction. In the initial transfer step S10, the object M may be engaged with the transfer stopper 340 and may be disposed at the correct position. In the initial transfer step S10, the object M may be transferred in the +X-axis direction.

The inspection method includes, after the initial transfer step S10, an initial inspection step S20 in which the Y-axis holders 130 hold the object M in the Y-axis direction and the camera device inspects the object surface A of the object M (see FIGS. 9 and 10). In the initial inspection step S20, the Y-axis holders 130 hold the object M in the state in which the auxiliary grip part 137 is disengaged from the object surface A. Here, the disengaged state means the state in which the auxiliary grip part 137 does not cover a portion of the object surface A. Through this, the camera device is capable of inspecting the entire area of the object surface A without interference. The initial inspection step S20 may be referred to as a first inspection step S20.

In the initial inspection step S20, the transfer unit 200 moves in the −Z-axis direction with respect to the Y-axis flipper unit 100. In the initial inspection step S20, after the Y-axis holders 130 hold the object M, the transfer unit 200 may move in the −Z-axis direction with respect to the Y-axis holders 130. The transfer unit 200 is lowered with respect to the Y-axis flipper unit 100 and does not interfere with the rotational motion of the object M. Here, while the transfer unit 200 is lowered, the camera device may inspect the object surface A.

The inspection method includes, after the initial inspection step S20, an middle inspection step S30 in which an object surface perpendicular to the object surface A is inspected by rotating the object M. In the middle inspection step S30, the Y-axis holders 130 may rotate the object M about the Y-axis, and the camera device may inspect an object surface B1, which is perpendicular to the object surface A, and an object surface B2, which is opposite to the object surface B1. The middle inspection step S30 may be referred to as a second inspection step S30.

In the middle inspection step S30, the Y-axis holders 130 hold the object in the state in which the auxiliary grip part 137 is engaged with the object surface A. Through this, the object M can be stably held by the Y-axis holders 130.

In this embodiment in which the Y-axis flipper unit 100 and the X-axis flipper unit 300 are provided, the middle inspection step S30 includes a first middle inspection step S31 and a second middle inspection step S36. In another embodiment in which the X-axis flipper unit 300 is not provided and the Y-axis flipper unit 100 is provided, the middle inspection step S30 may not include the second middle inspection step S36.

In the first middle inspection step S31, the Y-axis holders 130 rotate the object M about the Y-axis, and the camera device inspects an object surface B1, which is perpendicular to the object surface A, and an object surface B2, which is opposite to the object surface B1 (see FIG. 11 and FIGS. 16 to 18). In the first middle inspection step S31, the auxiliary grip parts 137 may move in the first direction Y1 with respect to the support grip parts 133 to be in the engaged state.

In the first middle inspection step S31, the Y-axis holders 130 may rotate the object M about the Y-axis, and the camera device may inspect at least one of object surfaces B1a and B1b inclined by an angle of less than 90 degrees with respect to the object surface B1 and object surfaces (not illustrated) inclined by an angle of less than 90 degrees with respect to the object surface B2. In the first middle inspection step S31, the Y-axis holders 130 may move in the Z-axis direction such that the object surface B1 and the object surface B2 are positioned at the same height as the object surface A (see FIGS. 19A to 19C). Here, the Y-axis holders 130 are moved in the Z-axis direction by the Z-axis elevation unit 500.

The second middle inspection step S36 may be performed after the first middle inspection step S31. In the second middle inspection step S36, the X-axis holders 330 hold the object M in the X-axis direction and rotate the object M about the X-axis, and the camera device inspects an object surface B3, which is perpendicular to the object surface A, and an object surface B4, which is opposite to the object surface B3 (see FIGS. 20 to 24).

The second middle inspection step S36 includes a step in which the X-axis holders 330 hold the object M, a step in which the Y-axis holders 130 release the object M, and a step in which the X-axis holders 330 rotate the object M. A step in which the space between the pair of side frames 320a and 320b is narrowed in the X-axis direction such that the X-axis holders 330 hold the object M is performed in the state in which the object surface A of the object M is disposed to face the +Z axis by the Y-axis holders 130. In another embodiment (not illustrated), a step in which the space between the pair of side frames 320a and 320b is narrowed in the X-axis direction such that the X-axis holders 330 hold the object M may be performed in the state in which an object surface C of the object M is disposed to face the +Z axis by the Y-axis holders 130. After the step in which the X-axis holders 330 hold the object M, a step in which the pair of body frames 120a and 120b are spaced apart from each other in the Y-axis direction and the auxiliary grip parts 137 are moved in the second direction Y2 with respect to the support grip parts 136 so that the Y-axis holders 130 release the object M is performed. After the step in which the Y-axis holders 130 release the object M, a step in which the X-axis holders 330 rotate the object M is performed.

In the second middle inspection step S36, the X-axis holders 330 may rotate the object M about the X-axis, and the camera device may inspect at least one of object surfaces B3a and B3b inclined by an angle of less than 90 degrees with respect to the object surface B3 and object surfaces (not illustrated) inclined by an angle of less than 90 degrees with respect to the object surface B4. In the second middle inspection step S36, the X-axis holders 330 may move in the Z-axis direction such that the object surface B3 and the object surface B4 are positioned at the same height as the object surface A (see FIGS. 25A and 25B). Here, the X-axis holders 330 are moved in the Z-axis direction by the Z-axis elevation unit 500.

The inspection method may include a last inspection step S40 of inspecting an object surface C after the middle inspection step S30 (see FIGS. 26 to 28). In the last inspection step S40, the Y-axis holders 130 hold the object M in the Y-axis direction, and the camera device inspects the object surface C, which is opposite to the object surface A. The last inspection step S40 may be referred to as a third inspection step S40.

In the last inspection step S40, the Y-axis holders 130 hold the object M in the state in which the auxiliary grip parts 137 are disengaged from the object surface C. Here, the disengaged state means the state in which the auxiliary grip parts 137 do not cover a portion of the object surface C. Through this, the camera device is capable of inspecting the entire area of the object surface C without interference.

The last inspection step S40 includes a step in which the object M is rotated such that the object surface C faces the +Z-axis direction. In the embodiment in which the second middle inspection step S36 is provided, the last inspection step S40 includes a step in which the X-axis holders 330 rotate the object M such that the object surface C faces the +Z-axis direction, and a step in which the Y-axis holders 130 hold the object M.

In the last inspection step S40, the transfer unit 200 moves in the +Z-axis direction with respect to the Y-axis flipper unit 100. In the last inspection step S40, the transfer unit 200 is raised in the +Z-axis direction with respect to the Y-axis holders 130 to support the object M. Here, it is also possible to inspect the object surface C while the transfer unit 200 is being raised.

In the last inspection step S40, after the Y-axis holders 130 hold the object M, the X-axis holders 330 may move in the −Z-axis direction with respect to the Y-axis holder 130. Specifically, after the Y-axis holders 130 hold the object M, the pair of X-axis holders 330 may be spaced apart from each other in the X-axis direction, and may move in the −Z-axis direction with respect to the Y-axis holders 130. When the X-axis holders 330 are sufficiently lowered with respect to the Y-axis flipper unit 100 and the object M is transferred in the last transfer step S50, the transfer stopper 340 may be spaced apart from the object M in the −Z-axis direction. Here, it is also possible to inspect the object surface C while the X-axis holders 330 are being lowered.

The inspection method includes, after the last inspection step S40, a last transfer step S50 in which the object M is transferred in the X-axis direction by the transfer unit 200 (see FIG. 29). In the last transfer step S50, the object M may be transferred in the +X-axis direction.

While the foregoing methods have been described with respect to particular embodiments, these methods may also be implemented as computer-readable codes on a computer-readable recording medium. The computer-readable recoding medium includes any kind of data storage devices that can be read by a computer system. Examples of the computer-readable recording medium include a ROM, RAM, CD-ROM, magnetic tape, floppy disk, optical data storage device and the like. Also, the computer-readable recoding medium can be distributed on computer systems which are connected through a network so that the computer-readable codes can be stored and executed in a distributed manner. Further, the functional programs, codes and code segments for implementing the foregoing embodiments can easily be inferred by programmers in the art to which the present disclosure pertains.

Although the technical spirit of the present disclosure has been described by the examples described in some embodiments and illustrated in the accompanying drawings, it should be noted that various substitutions, modifications, and changes can be made without departing from the scope of the present disclosure which can be understood by those skilled in the art to which the present disclosure pertains. In addition, it should be noted that that such substitutions, modifications and changes are intended to fall within the scope of the appended claims.

What is claimed is:

1. A flipper apparatus configured to be positioned as part of a conveyor belt inspection line and configured for operation with a camera device to inspect an object, the flipper apparatus comprising on XYZ orthogonal coordinates:

a Y-axis flipper unit configured to hold the object in a Y-axis direction and rotate the object about a Y-axis;

an X-axis flipper unit configured to hold the object in an X-axis direction and rotate the object about an X-axis; and a Z-axis elevation unit supporting the Y-axis flipper unit and the X-axis flipper unit and configured to move the Y-axis flipper unit and the X-axis flipper unit up and down in a Z-axis direction, wherein the flipper apparatus is configured to receive the object from the conveyor belt for inspection;

wherein the flipper apparatus is configured to manipulate the object, the manipulation enabling improved inspection of multiple object surfaces through improved positioning and alignment relative to the camera device;

wherein the Y-axis flipper unit includes:

a Y-axis flipper base supported on the Z-axis elevation unit;

a pair of body frames supported on the Y-axis flipper base, and configured to operate to narrow or widen a space between the pair of body frames in the Y-axis direction; and a pair of Y-axis holders supported on the pair of body frames, respectively, the pair of Y-axis holders being configured to hold the object between the pair of Y-axis holders and rotate about the Y-axis with respect to the pair of body frames so as to rotate the object about the Y-axis with respect to the pair of body frames, and wherein the X-axis flipper unit includes:

an X-axis flipper base supported on the Z-axis elevation unit;

a pair of side frames supported on the X-axis flipper base, the pair of side frames being configured to operate to narrow or widen a space between the pair of side frames in the X-axis direction; and a pair of X-axis holders supported on the pair of side frames, respectively, the pair of X-axis holders being configured to hold the object between the pair of X-axis holders and rotate about the X-axis with respect to the pair of side frames so as to rotate the object about the X-axis with respect to the pair of side frames, and wherein each of the pair of Y-axis holders includes:

a support grip part protruding in the Y-axis direction to be engaged with one end of the object in the Z-axis direction; and an auxiliary grip part configured to be movable in the Y-axis direction with respect to the support grip part, and configured to move in the Y-axis direction to be engaged with or disengaged from the other end of the object in the Z-axis direction.

2. The flipper apparatus of claim 1, further comprising:
a transfer unit configured to transfer the object in the X-axis direction.

3. The flipper apparatus of claim 2, wherein the transfer unit is supported on the Y-axis flipper unit and is configured to move in the Z-axis direction with respect to the Y-axis flipper unit.

4. The flipper apparatus of claim 3, wherein the transfer unit includes a transfer belt configured to support the object and transfer the object in the X-axis direction, and
the flipper apparatus further comprises:
a belt driver configured to provide a driving force for operating the transfer belt; and
a transfer unit elevation driver configured to provide a driving force for moving the transfer unit in the Z-axis direction with respect to the Y-axis flipper unit.

5. The flipper apparatus of claim 2, wherein the X-axis flipper unit is configured to move in the Z-axis direction with respect to the Y-axis flipper unit.

6. The flipper apparatus of claim 2, wherein the X-axis flipper unit includes a transfer stopper configured to limit movement of the object which is moved by the transfer unit.

7. The flipper apparatus of claim 1, wherein the Y-axis flipper unit is supported on the Z-axis elevation unit to be movable in the Z-axis direction with respect to the Z-axis elevation unit, and
the X-axis flipper unit is supported on the Y-axis flipper unit to be movable in the Z-axis direction with respect to the Y-axis flipper unit.

8. The flipper apparatus of claim 7, further comprising:
a Z-axis elevation driver configured to provide a driving force for moving the Y-axis flipper unit and the X-axis flipper unit in the Z-axis direction with respect to the Z-axis elevation unit; and
an X-axis flipper elevation driver configured to provide a driving force for moving the X-axis flipper unit in the Z-axis direction with respect to the Y-axis flipper unit.

9. The flipper apparatus of claim 1, further comprising:
a Y-axis movement driver configured to provide a driving force for moving the pair of body frames in the Y-axis direction with respect to the Y-axis flipper base;
a Y-axis holder rotation driver configured to provide a driving force for rotating the Y-axis holder with respect to the body frame;
an X-axis movement driver configured to provide a driving force for moving the pair of side frames with respect to the X-axis flipper base; and
an X-axis holder rotation driver configured to provide a driving force for rotating the X-axis holder with respect to the side frames.

10. The flipper apparatus of claim 1,
wherein the X-axis holder comprises:
an X-axis shaft supported on the side frame to be rotatable about the X-axis;
an X-axis contactor supported on the X-axis shaft and disposed on the X-axis, the X-axis contactor having a contact surface configured to come into contact with the object in the X-axis direction;
a first grip part supported on the X-axis shaft and disposed on one side of the X-axis contactor, wherein a +Z-axis direction portion protrudes along the X-axis direction compared to a-Z-axis direction portion; and
a second grip part supported on the X-axis shaft and disposed on one side of the first grip part, wherein a-Z-axis direction portion protrudes along the X-axis direction compared to a +Z-axis direction portion.

11. The flipper apparatus of claim 1,
wherein the Y-axis holder comprises:
a Y-axis shaft supported on the body frame to be rotatable about the Y-axis;
an elastic member configured to provide an elastic force in the Y-axis direction;
a Y-axis contactor configured to compress the elastic member when coming into contact with the object; and
a support grip part supported on the Y-axis shaft, the support grip part protruding from a-Z-axis direction side in the Y-axis direction with reference to the Y-axis contactor to form a surface that is configured to come into contact with the object in a +Z-axis direction.

12. The flipper apparatus of claim 1,
wherein the Y-axis holder comprises:
a Y-axis shaft supported on the body frame to be rotatable about the Y-axis;
a Y-axis contactor supported on the Y-axis shaft and configured to come into contact with the object in the Y-axis direction;
a support grip part supported on the Y-axis shaft, the support grip part protruding from a-Z-axis direction side in the Y-axis direction with reference to the Y-axis contactor to form a surface that is configured to come into contact with the object in a +Z-axis direction;
an auxiliary grip part configured to rotate integrally with the Y-axis shaft and move from the +Z-axis direction side in the Y-axis direction with reference to the Y-axis contactor; and
an auxiliary grip part driver configured to provide a driving force for moving the auxiliary grip part in the Y-axis direction with respect to the Y-axis shaft.

* * * * *